US008670624B2

(12) United States Patent
Fukuhara et al.

(10) Patent No.: US 8,670,624 B2
(45) Date of Patent: Mar. 11, 2014

(54) INFORMATION PROCESSING APPARATUS AND METHOD

(75) Inventors: Takahiro Fukuhara, Kanagawa (JP); Katsutoshi Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 1171 days.

(21) Appl. No.: 12/605,774

(22) Filed: Oct. 26, 2009

(65) Prior Publication Data

US 2010/0142837 A1 Jun. 10, 2010

(30) Foreign Application Priority Data

Dec. 8, 2008 (JP) .................................. 2008-312180

(51) Int. Cl.
*G06K 9/36* (2006.01)
*G06K 9/40* (2006.01)

(52) U.S. Cl.
USPC ............ 382/232; 382/233; 382/265; 382/248

(58) Field of Classification Search
None
See application file for complete search history.

(56) References Cited

U.S. PATENT DOCUMENTS

| 2007/0013845 | A1 | 1/2007 | Nagata et al. |
| 2007/0269122 | A1 | 11/2007 | Fukuhara et al. |
| 2007/0286510 | A1 | 12/2007 | Fukuhara |
| 2008/0013846 | A1 | 1/2008 | Fukuhara et al. |
| 2008/0284788 | A1 | 11/2008 | Ando et al. |
| 2008/0285865 | A1 | 11/2008 | Fukuhara et al. |
| 2008/0285869 | A1 | 11/2008 | Fukuhara et al. |
| 2008/0285872 | A1 | 11/2008 | Fukuhara et al. |
| 2008/0285874 | A1 | 11/2008 | Fukuhara et al. |
| 2008/0298471 | A1 | 12/2008 | Fukuhara et al. |
| 2008/0304574 | A1 | 12/2008 | Fukuhara et al. |
| 2009/0102686 | A1 | 4/2009 | Fukuhara et al. |

OTHER PUBLICATIONS

NPL—Chao-Tsung Huang, Po-Chih Tseng, and Liang-Gee Chen, Fellow, IEEE," Generic RAM-Based Architectures for Two-Dimensional Discrete Wavelet Transform With Line-Based Method". IEEE Transactions on Circuits and Systems for Video Technology, vol. 15, No. 7, Jul. 2005. pp. 910-920.*
NPL—Michael Weeks, Magdy Bayoumi, "Discrete Wavelet Transform: Architectures, Design and Performance Issues"Journal of VLSI Signal Processing 35, 155-178, 2003, pp. 155-178.*
NPL—Stephen Welstead, Fractal and Wavelet Image Compression Techniques, Print ISBN13: 9780819435033, published 1999, 25 pages.*

(Continued)

*Primary Examiner* — David Zarka
*Assistant Examiner* — Ha Le
(74) *Attorney, Agent, or Firm* — Oblon, Spivak, McClelland, Maier & Neustadt, L.L.P.

(57) ABSTRACT

Analysis filter processing is recursively repeated on horizontal and vertical low frequency component coefficients obtained as a result of the analysis filter processing, until a predetermined decomposition level is reached. Coefficients obtained during a process of computation in the analysis filter processing and, except for a preset decomposition level, horizontal and vertical low frequency component coefficients obtained as a result of the computation in the analysis filter processing are stored in a first storage section independently for each decomposition level. The coefficients stored in the first storage section are read as appropriate and the read coefficients are supplied for the analysis filter processing. The horizontal and vertical low frequency component coefficients of the preset decomposition level are stored in a second storage section. The coefficients stored in the second storage section are read as appropriate. The read coefficients are supplied for the analysis filter processing.

16 Claims, 37 Drawing Sheets

(56) References Cited

OTHER PUBLICATIONS

Wim Sweldens, "The Lifting Scheme: A Custom-Design Construction of Biorthogonal Wavelets." Applied and Computational Harmonic Analysis, vol. 3, No. 2, 1996, pp. 186-200.

Christos Chrysafis et al., "Line Based, Reduced Memory, Wavelet Image Compression." IEEE Transactions on Image Processing, vol. 9, No. 3, Mar. 2000, pp. 378-389.

U.S. Appl. No. 12/712,597, filed Feb. 25, 2010, Fukuhara, et al.

* cited by examiner

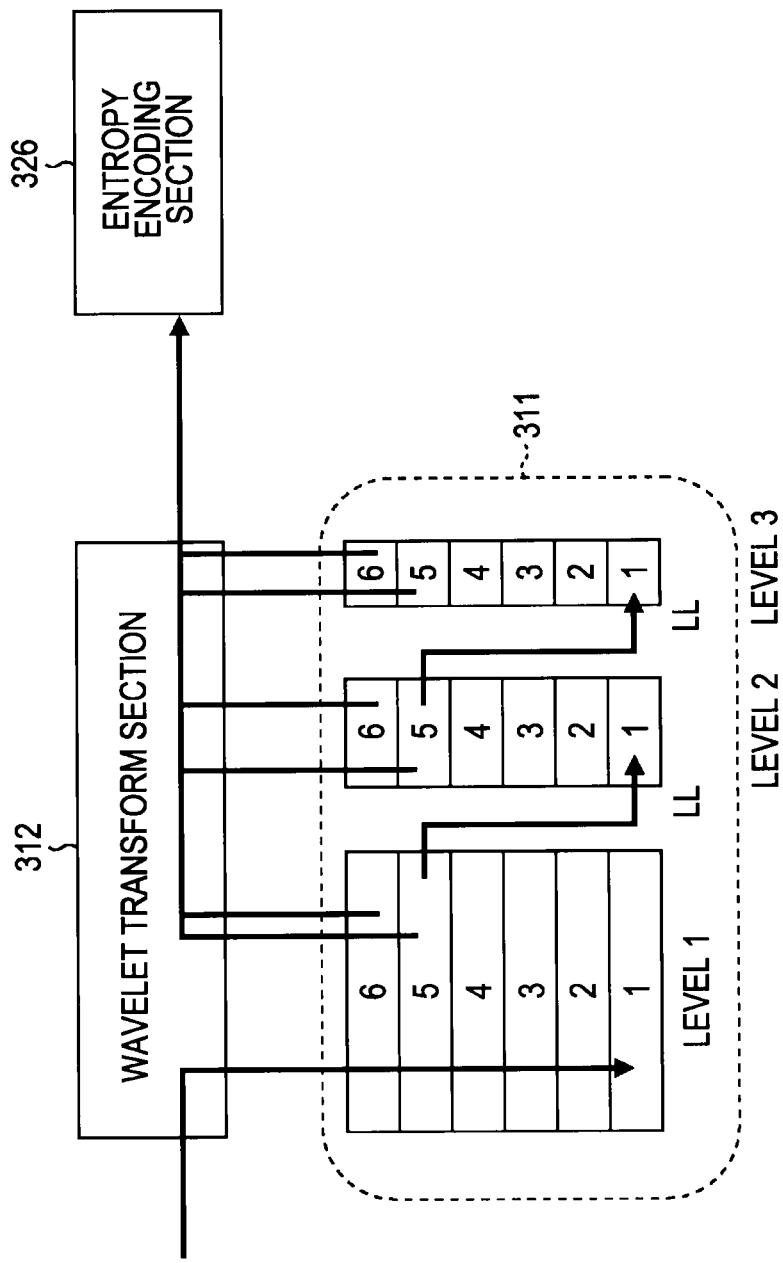

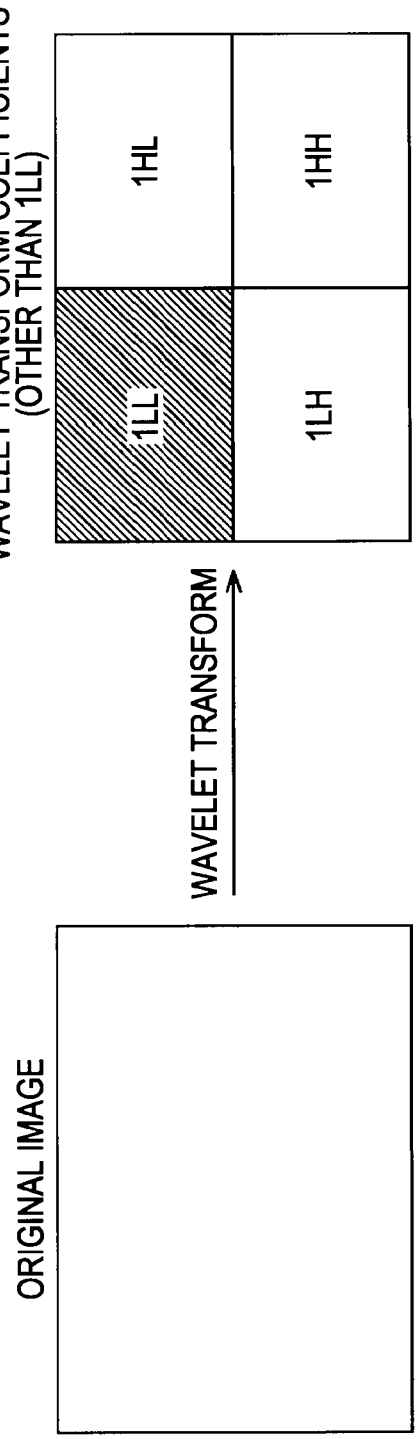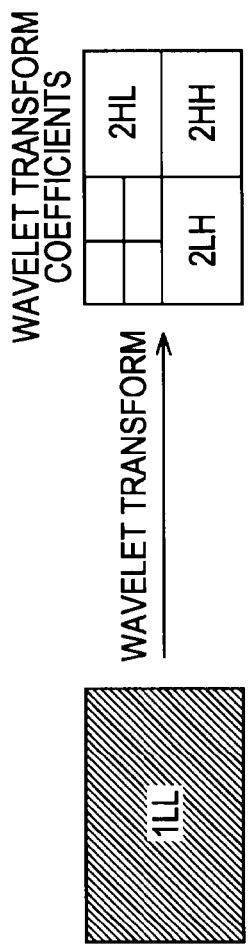
FIG. 13A
FIG. 13B

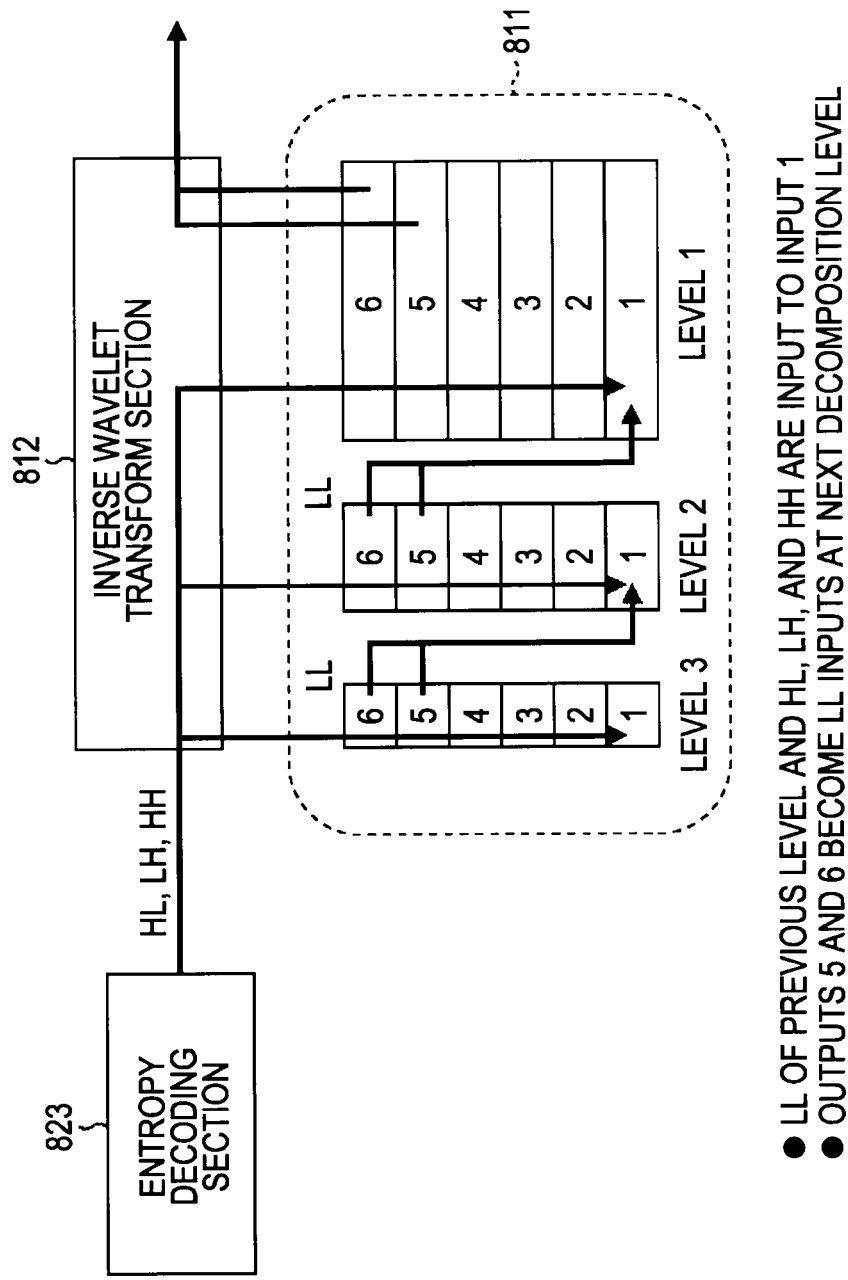

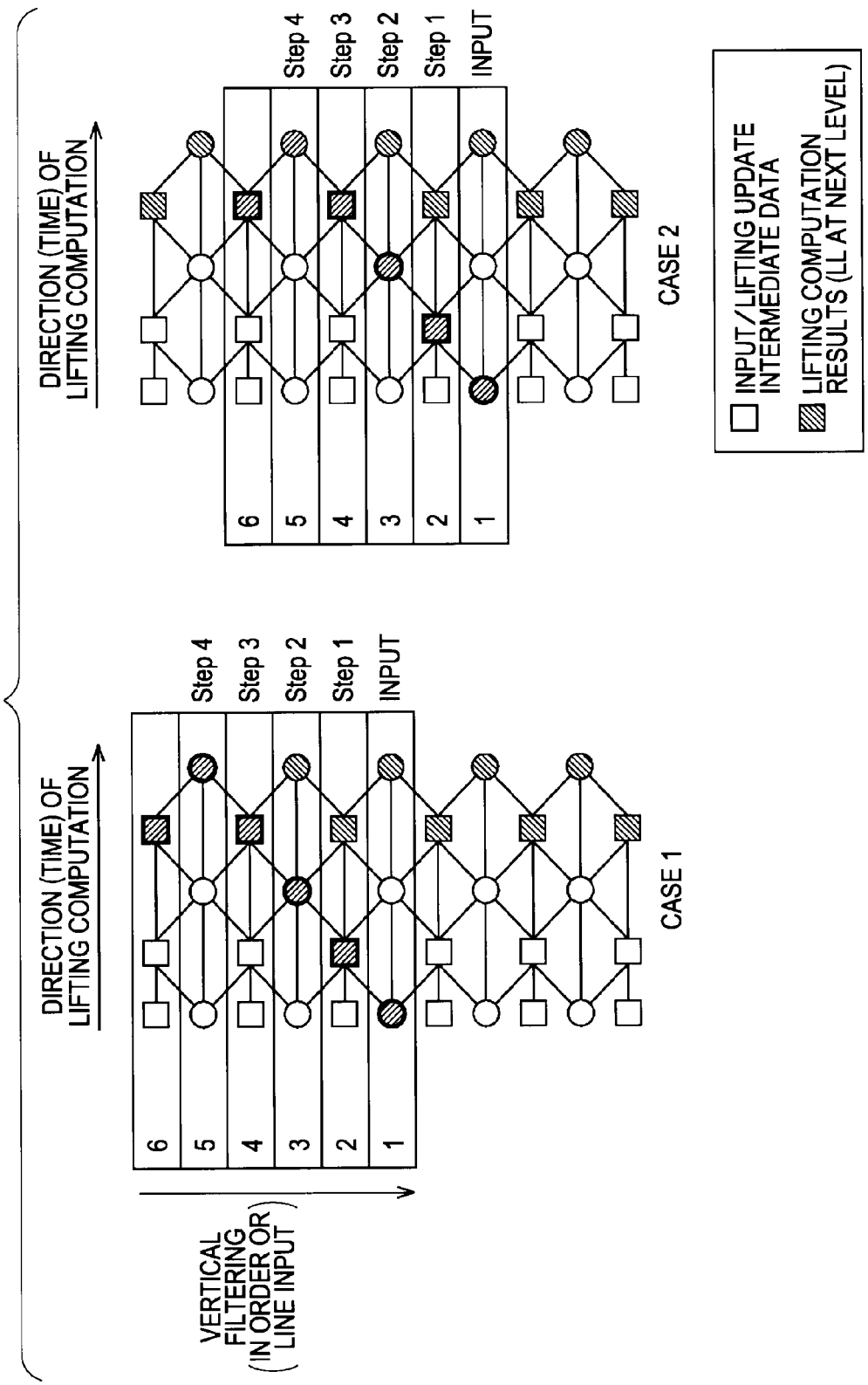

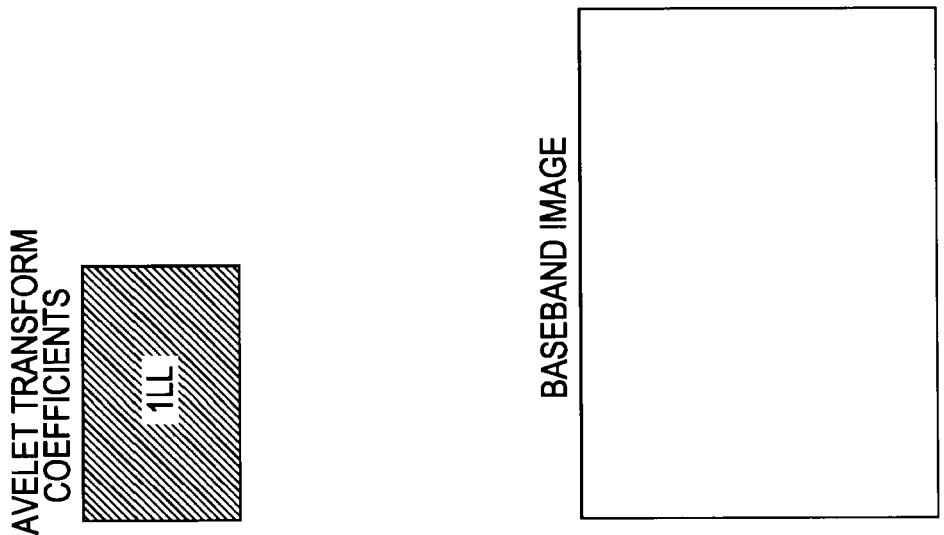
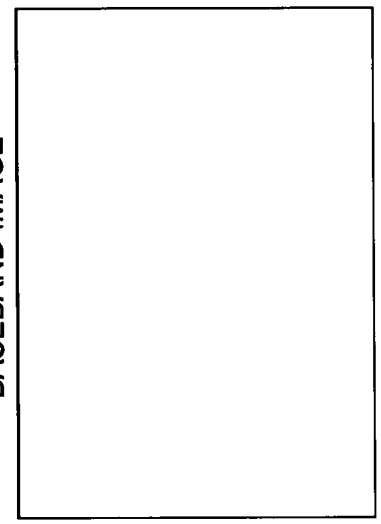
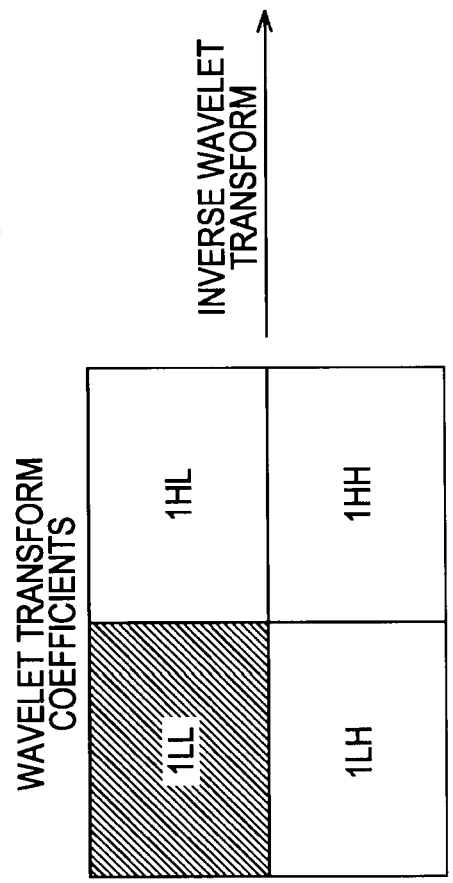
FIG. 30A
FIG. 30B

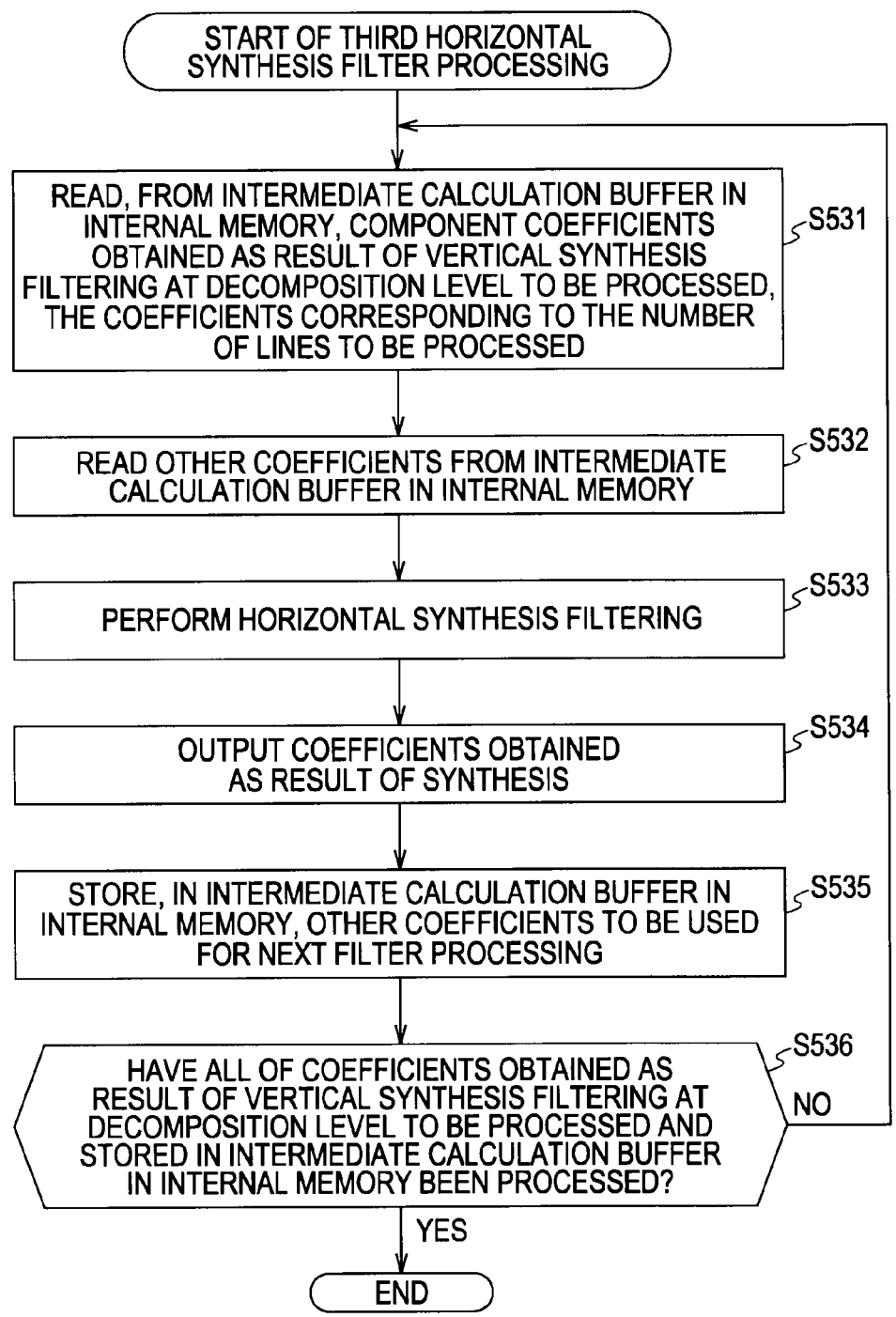

INFORMATION PROCESSING APPARATUS AND METHOD

BACKGROUND OF THE INVENTION

1. Field of the Invention

The present invention relates to information processing apparatuses and methods. In particular, the present invention relates to an information processing apparatus and method that are capable of enhancing the efficiency of using hardware resources in encoding processing and decoding processing.

2. Description of the Related Art

In recent years, with increasing sizes of images, video of Full HDTV (High Definition Television: 1920 pixels×108 pixels) can be enjoyed even at home. Digital cinemas use images having a resolution of 4 K×2K (4,096×2,160 pixels), which is four times the resolution of HDTV images.

For applications of digital cinemas, a DCI (digital cinema initiatives) standard specifies a compression format for motion-picture distribution. According to the DCI standard, JPEG (Joint Photographic Experts Group) 2000 Part-1 based on the ISO (International Organization for Standardization) standard is employed as a compression/decompression technology, and the peak bit rate is 250 Mbps for an XYZ 12 bits (a frame rate of 24 Hz) moving-image sequence having an image size of a 4096×2160. Thus, in digital cinemas, baseband master images are encoded into encoded data with that bit rate, are distributed, and are put on the screen.

In applications other than digital cinemas, needs for compressing, for example, medical images and satellite picture images by using JPEG 2000 are expected to increase in the future. What is common to any of those cases is that image data handled have significantly high resolutions. JPEG 2000 employs wavelet transform as a technology for converting frequencies of image signals. The wavelet transform is a superior signal analysis technology for decomposing image signals into multiple frequency bands and is also applied to image recognition, seismic wave analysis, and so on, in addition to image compression, such as JPEG 2000 compression. In the wavelet transform, filtering processing is performed in each of vertical and horizontal directions, and during the processing, coefficient data are frequently stored in a buffer (e.g., refer to Japanese Unexamined Patent Application Publication No. 2008-022403).

Image encoding processing using such wavelet transform may be realized by dedicated hardware or may also be realized by a software program that is executed by, for example, a personal computer or the like.

FIG. 1 is a diagram showing an example in which a software program for realizing image encoding processing using wavelet transform is executed by a computer. As shown in FIG. 1, a software program on a typical computer is executed by a general-purpose processor 1, such as a CPU (central processing unit). The general-purpose processor 1 is provided with an internal memory 11, which is generally called a cache memory.

The internal memory 11 is a storage area that has a small capacity and that features the capability to allow high-speed reading and writing, compared to an external memory provided outside the processor 1, and is used for only processing executed within the processor 1. As a result of the software execution within the processor 1, wavelet transform, entropy encoding, and so on are executed. In FIG. 1, a wavelet transform section 12 and an entropy encoding section 26 are functional blocks that represent functions of the wavelet transform and the entropy encoding.

An original image 51 is externally supplied to the processor 1 through an external bus having a low data transfer rate, as indicated by arrow 61, and is temporarily stored in an input buffer 21 provided in the internal memory 11. The original image 51 stored in the input buffer 21 is read by an input controller 22 in the wavelet transform section 12 through an internal bus having a high data transfer rate, as indicated by arrow 62, and is supplied to a filter processing section 23, as indicted by arrow 63. The filter processing section 23 has a horizontal analysis filter section 31 and a vertical analysis filter section 32, which perform filter processing in the horizontal direction and the vertical direction to decompose input data into low frequency components and high frequency components. In this case, the filter processing section 23 performs the processing while temporarily storing, in an intermediate calculation buffer 25 provided in the internal memory 11, data to be used for computation. Data inputting to and outputting from the intermediate calculation buffer 25 are performed via an intermediate calculation buffer controller 24. Upon receiving data from the filter processing section 23, as indicated by arrow 64, the intermediate calculation buffer controller 24 supplies the data to the intermediate calculation buffer 25 through the internal bus, as indicated by arrow 65, and causes the data to be stored in the intermediate calculation buffer 25. The intermediate calculation buffer controller 24 reads data from the intermediate calculation buffer 25 through the internal bus, as indicated by arrow 66, and supplies the read data to the filter processing section 23, as indicated by arrow 67.

The filter processing section 23 generates coefficients of HL components, LH components, HH components, and lowest-frequency components at each decomposition level and sequentially supplies the generated component coefficients to the entropy encoding section 26, as indicated by arrow 68. The entropy encoding section 26 encodes the supplied coefficient data and supplies the resultant encoded data to an output controller 27, as indicated by arrow 69. The output controller 27 supplies the encoded data to an output buffer 28, provided in the internal memory 11, through the internal bus, as indicated by arrow 70, and causes the encoded data to be temporarily stored in the output buffer 28. The output controller 27 causes the output buffer 28 to output, as an encoded codestream 53, the encoded data at a predetermined timing. The encoded code stream 53 output from the output buffer 28 is output from the processor 1 through the external bus, as indicated by arrow 71.

As described above, the typical encoding processing of the related art uses the internal memory 11 to store data in order to execute processing at high speed.

SUMMARY OF THE INVENTION

However, the internal memory 11 is typically more expensive than the external memory and also occupies a large installation area in the processor 1. Thus, in order to reduce the manufacturing cost of the processor 1, the capacity of the internal memory 11 is generally limited to be smaller than that of the external memory. More specifically, in many cases, the external memory is configured by the gigabyte and the internal memory is configured to have a capacity of at most several megabytes or the like. For example, in a Cell™ processor, a single core processor is provided with an internal memory having only 256 Kbytes). Since programs and so on are also stored, space that is actually usable for data storage may be about half of the memory capacity.

Thus, in terms of the manufacturing cost, an increase in the capacity of the internal memory 11 is limited. In contrast, the resolutions of images handled are increasing year by year. In the wavelet transform, a memory capacity corresponding to the size of "the horizontal size of the original image"×"the number of vertical lines"×"the number of wavelet transform decomposition levels" is typically required even with a line-based wavelet transform that is an high-efficiency, memory-saving wavelet transform. Thus, in conjunction with the increasing image resolutions, the amount of data temporarily stored during the wavelet transform also increases. Consequently, the memory capacity becomes insufficient with the use of only the internal memory 11, and thus a need for using the external memory arises.

However, in the case of the external memory, although a sufficient capacity can be ensured at low cost, the amount of time taken for inputting/outputting data increases significantly compared to a case in which the internal memory 11 is used. That is, the use of the external memory may result in an increase in the amount of time for wavelet transform and entropy encoding processing as described above.

When such encoding processing is realized by dedicated hardware, it is also desirable to use a high-speed memory, such as the above-described internal memory 11, as a data buffer, but it is difficult to ensure a sufficient capacity in terms of the manufacturing cost. Conversely, the use of a low-cost memory, such as the above-described external memory, results in a decrease in the processing speed, as described above.

In order to overcome the above-described problems, it is desirable to achieve high-speed encoding processing or decoding processing at low cost while enhancing the efficiency of using hardware resources in the encoding processing and the decoding processing, by systematically performing data buffering using both a high-speed memory and a low-cost memory.

According to a first embodiment of the present invention, there is provided an information processing apparatus. The information processing apparatus includes: a first storage section and a second storage section, the first storage section having a smaller capacity and allowing higher speed access than the second storage section; filtering means for recursively repeating analysis filter processing, the analysis filter processing being processing in which analysis filtering for decomposing frequency components of image signals into low frequency components and high frequency components is performed in both a horizontal direction and a vertical direction, on horizontal and vertical low frequency component coefficients obtained as a result of the analysis filter processing, until a predetermined decomposition level is reached; first controlling means for causing coefficients obtained during a process of computation in the analysis filter processing and, except for a preset decomposition level, horizontal and vertical low frequency component coefficients obtained as a result of the computation in the analysis filter processing to be stored in the first storage section independently for each decomposition level, reading the coefficients stored in the first storage section, as appropriate, and supplying the read coefficients for the analysis filter processing; and second controlling means for causing the horizontal and vertical low frequency component coefficients of the preset decomposition level, the coefficients being obtained as a result of the computation in the analysis filter processing, to be stored in the second storage section, reading the coefficients stored in the second storage section, as appropriate, and supplying the read coefficients for the analysis filter processing.

According to the first embodiment of the present invention, there is also provided an information processing method for an information processing apparatus having a first storage section and a second storage section. The first storage section has a smaller capacity and allows higher speed access than the second storage section. The information processing method includes the steps of: causing first controlling means to recursively repeat analysis filter processing, the analysis filter processing being processing in which analysis filtering for decomposing frequency components of image signals into low frequency components and high frequency components is performed in both a horizontal direction and a vertical direction, a first predetermined number of times on horizontal and vertical low frequency component coefficients obtained as a result of computation of the analysis filter processing, by temporarily storing, in the first storage section, coefficients obtained during a process of the computation in the analysis filter processing and horizontal and vertical low frequency component coefficients obtained as a result of the computation in the analysis filter processing and reusing the coefficients obtained during the process of the computation and the horizontal and vertical low frequency component coefficients obtained as a result of the computation; causing second controlling means to cause the horizontal and vertical low frequency component coefficients, obtained as a result of the computation in the analysis filter processing performed the first predetermined number of times, to be stored in the second storage section; causing third controlling means to read the coefficients stored in the second storage section, after the analysis filter processing is performed the first predetermined number of times; and causing fourth controlling means to input the coefficients stored in the second storage section and to recursively repeat the analysis filter processing a second predetermined number of times on the horizontal and vertical low frequency component coefficients obtained as a result of the computation in the analysis filter processing, by temporarily storing, in the first storage section, the coefficients obtained during the process of the computation in the analysis filter processing and the horizontal and vertical low frequency component coefficients obtained as a result of the computation in the analysis filter processing and reusing the coefficients obtained during the process of the computation and the horizontal and vertical low frequency component coefficients obtained as a result of the computation.

According to a second embodiment of the present invention, there is provided an information processing apparatus. The information processing apparatus includes: a first storage section and a second storage section, the first storage section having a smaller capacity and allowing higher speed access than the second storage section; filtering means for recursively repeating synthesis filter processing, the synthesis filter processing being processing in which synthesis filtering for combining low frequency components and high frequency components of frequency components of image signals is performed in both a vertical direction and a horizontal direction, by using coefficients, obtained as a result of the synthesis filter processing, as horizontal and vertical low frequency component coefficients of a decomposition level that is higher by one level; first controlling means for causing coefficients obtained during a process of computation in the synthesis filter processing and, except for a preset decomposition level, the coefficients obtained as a result of the computation in the synthesis filter processing to be stored in the first storage section independently for each decomposition level, reading the coefficients stored in the first storage section, as appropriate, and supplying the read coefficients for the synthesis filter processing; and second controlling means for causing the coefficients of the preset decomposition level, the coefficients being obtained as a result of the computation in the synthesis filter processing, to be stored in the second storage section, reading the coefficients stored in the second storage section, as appropriate, and supplying the read coefficients for the synthesis filter processing.

According to the second embodiment of the present invention, there is also provided an information processing method for an information processing apparatus having a first storage section and a second storage section. The first storage section has a smaller capacity and allows higher speed access than the second storage section. The information processing method includes the steps of: causing first controlling means to recursively repeat synthesis filter processing, the synthesis filter processing being processing in which synthesis filtering for combining low frequency components and high frequency components of frequency components of image signals is performed in both a vertical direction and a horizontal direction, a first predetermined number of times by using coefficients, obtained as a result of computation of the synthesis filter processing, as horizontal and vertical low frequency component coefficients of a decomposition level that is higher by one level, by temporarily storing, in the first storage section, coefficients obtained during a process of the computation in the synthesis filter processing and the coefficients obtained as a result of the computation in the synthesis filter processing and reusing the coefficients obtained during the process of the computation and the coefficients obtained as a result of the computation; causing second controlling means to cause the coefficients, obtained as a result of the computation in the synthesis filter processing performed the first predetermined number of times, to be stored in the second storage section; causing third controlling means to read the coefficients stored in the second storage section, after the synthesis filter processing is performed the first predetermined number of times; and causing fourth controlling means to input the coefficients stored in the second storage section and to recursively repeat the synthesis filter processing a second predetermined number of times, by using the coefficients, obtained as a result of the computation in the synthesis filter processing, as horizontal and vertical low frequency component coefficients of a decomposition level that is higher by one level, by temporarily storing, in the first storage section, the coefficients obtained during the process of the computation in the synthesis filter processing and the coefficients obtained as a result of the computation in the synthesis filter processing and reusing the coefficients obtained during the process of the computation and the coefficients obtained as a result of the computation.

According to the first embodiment of the present invention, analysis filter processing, which is processing in which analysis filtering for decomposing frequency components of image signals into low frequency components and high frequency components, is recursively repeated in both a horizontal direction and a vertical direction, performed on horizontal and vertical low frequency component coefficients obtained as a result of the analysis filter processing, until a predetermined decomposition level is reached. Coefficients obtained during a process of computation in the analysis filter processing and, except for a preset decomposition level, horizontal and vertical low frequency component coefficients obtained as a result of the computation in the analysis filter processing are stored in the first storage section, which has a smaller capacity and allows higher speed access that the second storage section, independently for each decomposition level. The coefficients stored in the first storage section are read as appropriate and the read coefficients are supplied for the analysis filter processing. The horizontal and vertical low frequency component coefficients of the preset decomposition level, the coefficients being obtained as a result of the computation in the analysis filter processing, are stored in the second storage section. The coefficients stored in the second storage section are read as appropriate. The read coefficients are supplied for the analysis filter processing.

According to the second embodiment of the present invention, synthesis filter processing, which is processing in which synthesis filtering for combining low frequency components and high frequency components of frequency components of image signals is performed in both a vertical direction and a horizontal direction, is recursively performed by using coefficients, obtained as a result of the synthesis filter processing, as horizontal and vertical low frequency component coefficients of a decomposition level that is higher by one level. Coefficients obtained during a process of computation in the synthesis filter processing and, except for a preset decomposition level, the coefficients obtained as a result of the computation in the synthesis filter processing are stored in the first storage section, which has a smaller capacity and allows higher speed access that the second storage section, independently for each decomposition level. The coefficients stored in the first storage section are read as appropriate. The read coefficients are supplied for the synthesis filter processing. The coefficients of the preset decomposition level, the coefficients being obtained as a result of the computation in the synthesis filter processing, are stored in the second storage section. The coefficients stored in the second storage section are read as appropriate. The read coefficients are supplied for the synthesis filter processing.

According to the present invention, it is possible to perform data encoding or decoding. In particular, it is possible to enhance the efficiency of using hardware resources in encoding processing and decoding processing.

BRIEF DESCRIPTION OF THE DRAWINGS

FIG. 12 is a diagram illustrating coefficients stored in an internal memory during wavelet transform;

FIGS. 13A and 13B are diagrams illustrating overviews of the wavelet transform according to the embodiment of the present invention;

FIGS. 25A, 253, and 25C are diagrams illustrating a process in which information is read from the external memory when the input/output buffer used for reading information from the external memory has a two-bank configuration;

FIG. 28 is a diagram illustrating coefficients stored in an internal memory during inverse wavelet transform;

FIG. 29 is a diagram illustrating an example of lifting computation in synthesis filtering;

FIGS. 30A and 30B are diagrams illustrating overviews of the inverse wavelet transform according to the embodiment of the present invention;

FIG. 37 is a flowchart illustrating an example of a flow of third horizontal synthesis filter processing.

DESCRIPTION OF THE PREFERRED EMBODIMENTS

Best modes (hereinafter referred to as "embodiments") for carrying out the present invention will be described below. A description below is given in the following sequence:

1. First Embodiment (Device: Configuration Example of Device for performing Encoding Processing or Decoding Processing)
2. Second Embodiment (Configuration Example of Encoder)
3. Third Embodiment (Configuration Example of Input/Output Buffer)
4. Fourth Embodiment (Configuration Example of Decoder)<

1. First Embodiment

Configuration Example of Device

Figure 1:
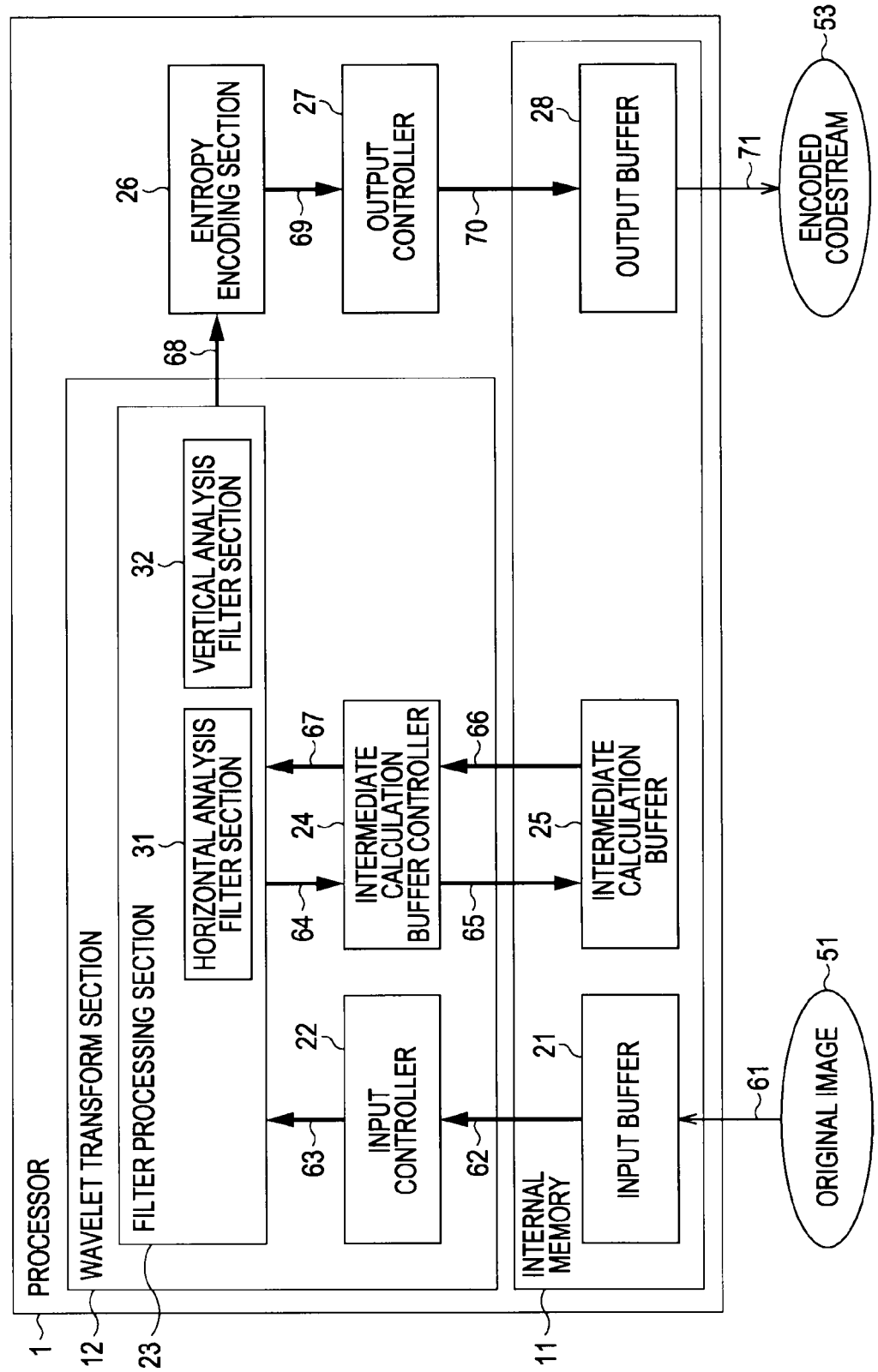
FIG. 1 is a block diagram showing a major configuration example of an encoder of related art.
Figure 2:
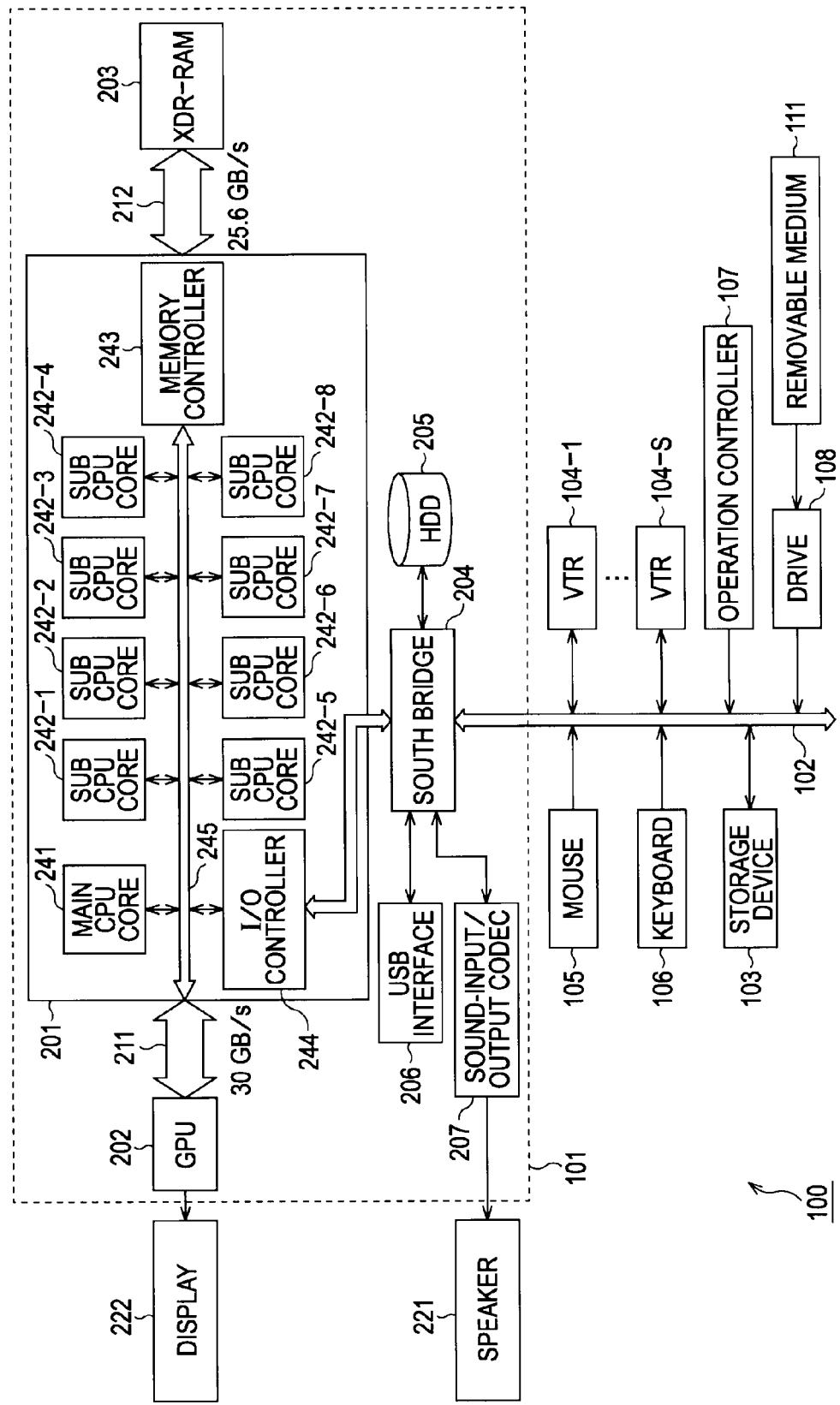
FIG. 2 is a block diagram showing a major configuration example of hardware for realizing an encoder and a decoder according to an embodiment of the present invention.

FIG. 2 is a block diagram showing a configuration example of a device that executes encoding processing and decoding processing according to an embodiment of the present invention. An information processing system 100 shown in FIG. 2 is an example of hardware resources that execute a software program for an encoder and a decoder.

As shown in FIG. 2, the information processing system 100 has an information processing apparatus 101 that realizes an encoder and an a decoder. Various devices are connected to the information processing apparatus 101 through a PCI (peripheral component interconnect) bus 102. Examples of the devices connected to the information processing apparatus 101 include a large-capacity storage device 103 and video-tape recorder (VTRs) 104-1 to 104-S, as well as a mouse 105, a keyboard 106, and an operation controller 107 which are used by a user to perform an operation input on the large-capacity storage device 103 and the VTRs 104-1 to 104-S. The information processing system 100 is a system that is constituted by the above-described devices and performs image encoding processing, image decoding processing, and so in cooperation with an installed program.

For example, the information processing apparatus 101 in the information processing system 100 can read moving-image content stored in the storage device 103, encode the read moving-image content, and write the resultant encoded data back to the storage device 103. For example, the information processing apparatus 101 can read encoded data stored in the storage device 103, decode the read encoded data, and write the resultant decoded image data (moving-image content) back to the storage device 103. In addition, the information processing apparatus 101 can record, to video tapes via the VTRs 104-1 to 104-S, encoded data resulting from the encoding processing and the decoded image data resulting from the decoding processing. The information processing apparatus 101 can also capture moving-image content, recorded on video tapes in the VTRs 104-1 to 104-S, into the storage device 103. During the capture, the information processing apparatus 101 may encode the moving-image content.

The information processing apparatus 101 has a microprocessor 201, a GPU (graphics processing unit) 202, an XDR-RAM (extreme data rate-random access memory) 203, and a south bridge 204. The information processing apparatus 101 further has a HDD (hard disk drive) 205, a USE (universal serial bus) interface 206, and a sound-input/output codec 207.

The GPU 202 is connected to the microprocessor 201 through a dedicated bus 211. The XDR-RAM 203 is connected to the microprocessor 201 through a dedicated bus 212. The south bridge 204 is connected to an I/O (input-output) controller 244 in the microprocessor 201 through a dedicated bus. The HDD 205, the USB interface 206, and the sound-input/output codec 207 are also connected to the south bridge 204. A speaker 221 is connected to the sound-input/output codec 207. A display 222 is also connected to the GPU 202. The mouse 105, the keyboard 106, the VTRs 104-1 to 104-S, the storage device 103, and the operation controller 107 are further connected to the south bridge 204 through the PCI bus 102.

In response to a user operation input, the mouse 105 and the keyboard 106 supply a signal indicating the contents of the user operation input to the microprocessor 201 through the PCI bus 102 and the south bridge 204. The storage device 103 and the VTRs 104-1 to 104-S are adapted to allow recording or playback of predetermined data. A drive 108 is further connected to the PCI bus 102, as appropriate. A removable media 111, such as a magnetic disk, an optical disk, a magneto-optical disk, or a semiconductor memory, is loaded into the drive 108, as appropriate, and a computer program read therefrom is installed on the HDD 205, as appropriate.

The microprocessor 201 has a general-purpose main CPU core 241 for executing a basic program, such as an OS (operating system). Sub CPU cores 242-1 to 242-8 (in this case, eight sub CPU cores), which are RISC (reduced instruction set computer) signal processors, are connected to the main CPU core 241 through a shared bus 245. A memory controller 243 for performing memory-control on the XDR-RAM 203 having a capacity of, for example, 256 Mbytes is also connected to the shared bus 245. The I/O controller 244 for controlling inputting/outputting of data to/from the south bridge 204 is further connected to the shared bus 245. The microprocessor 201 is a multi-core-architecture processor in which the above-described elements are integrated into a single chip. The operating frequency of the microprocessor 201 is, for example, 4 GHz.

During startup, the microprocessor 201 reads an application program stored on the HDD 205 and loads the application program into the XDR-RAM 203, on the basis of a control program stored on the HDD 205. Thereafter, the microprocessor 201 executes given control processing on the basis of the application program and an operator operation. The microprocessor 201 executes encoding processing and decoding processing by executing software. For example, the microprocessor 201 can supply an encoded stream resulting from encoding to the HDD 205 via the south bridge 204, so as to allow the encoded stream to be stored on the HDD 205. The microprocessor 201 can also transfer data of playback video of moving-image content resulting from decoding to the GPU 202, so as to allow the data to be displayed on the display 222.

The CPU cores in the microprocessor 201 can be used in an arbitrary way. For example, the main CPU core 241 may perform processing for controlling image encoding processing and image decoding processing and each of the eight sub CPU cores 242-1 to 242-8 may perform encoding processing or decoding processing. Each of the eight sub CPU cores 242-1 to 242-8 in the microprocessor 201 in the information processing system 100 has a built-in cache memory. That is, each of the eight sub CPU cores 242-1 to 242-8 can use both the corresponding internal cache memory, which is its own internal memory, and the XDR-RAM 203, which is an external memory.

Each cache memory can be exclusively used by the corresponding one of the sub CPU cores 242-1 to 242-8, and allows data to be read and written without going through the shared bus 245. Each cache memory operates at higher speed than the XDR-RAM 203. That is, the cache memory allows data reading and writing at higher speed than the XDR-RAM 203. Since the unit cost of cache memory per capacity, however, is higher than that of the XDR-RAM 203, and the cache memory has a smaller capacity than the XDR-RAM 203. Thus, a description below is given of the case of a limited cash memory and a method for more efficiently using the limited capacity of the cache memory in the encoding processing and decoding processing.

In practice, however, the capacity of the XDR-RAM 203 is also limited. In the case of the XDR-RAM 203, however, an overwhelmingly larger capacity than free space generally required in encoding processing or decoding processing can be realized at low cost. Thus, a description below is given assuming that the XDR-RAM 203 has a sufficiently large capacity (i.e., has no particular limitation in the capacity).

The sub CPU cores 242-1 to 242-8 are hereinafter referred to as "sub CPU cores 242", unless they should be distinguished from each other in the description. Although the eight sub CPU cores 242 are illustrated in FIG. 2, the number thereof is arbitrary in practice. A software program for causing the main CPU core 241 to perform encoding processing and decoding processing is allocated to each sub CPU core 242 (i.e., is loaded into the cache memory thereof). Each of the sub CPU cores 242 executes the allocated software program to realize the encoding processing and the decoding processing.

2. Second Embodiment

Configuration Example of Encoder

Figure 3:
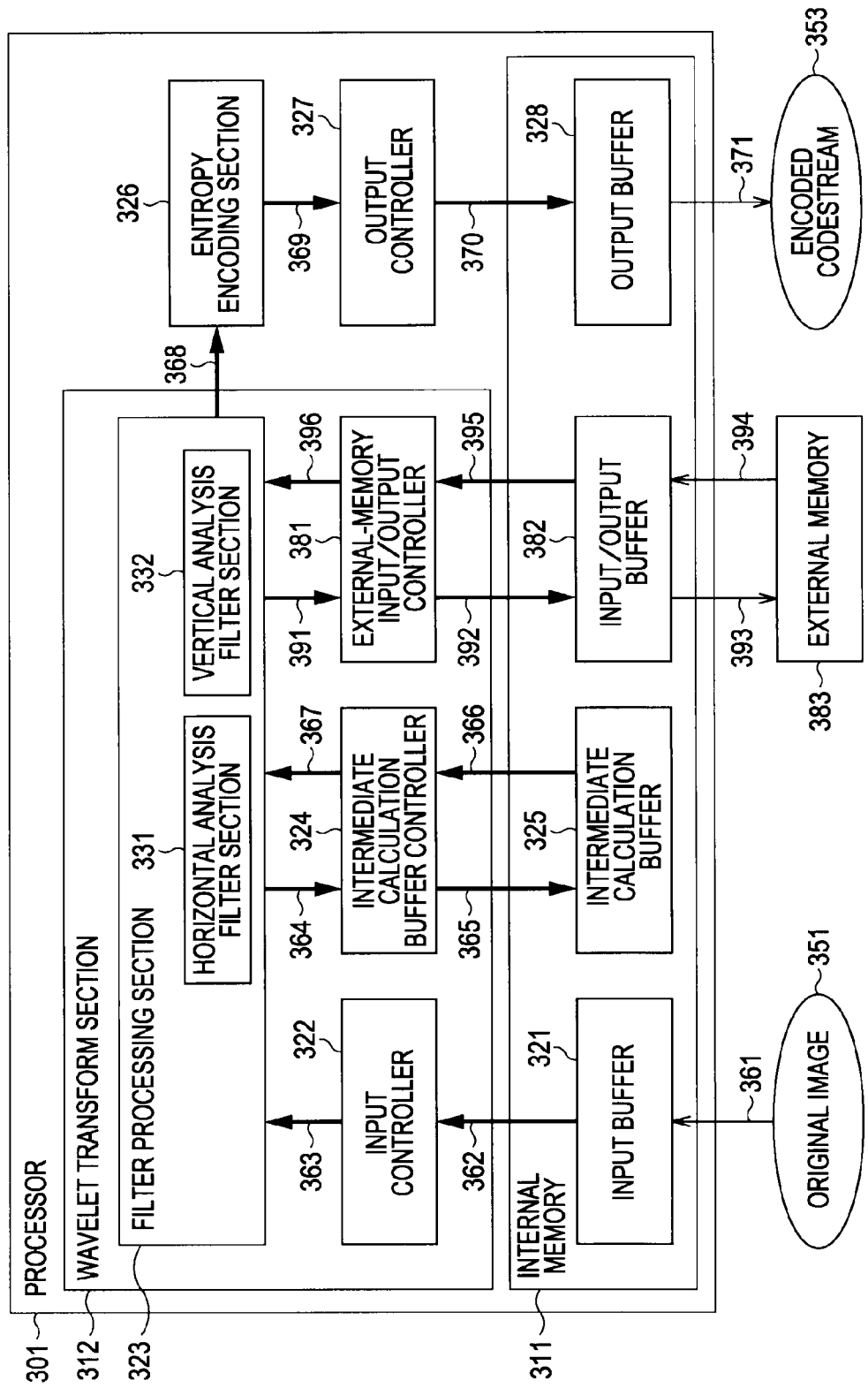
FIG. 3 is a block diagram showing a major configuration example of an encoder according to an embodiment of the present invention.

FIG. 3 is a block diagram showing a configuration example of an encoder (an encoding device) realized by such a sub CPU core 242.

In FIG. 3, a processor 301 is a single computation processing section that operates interpedently from other sections and corresponds to one of the sub CPU cores 242 in the microprocessor 201 shown in FIG. 2. As shown in FIG. 3, the processor 301 has an internal memory 311. The internal memory 311 is implemented by, for example, an SRAM (static random access memory) and is built into the processor 301. The internal memory 311 has characteristics in that, compared to an external memory 383 described below, the circuit scale is large to make it difficult to increase the packaging density, the power consumption is large, high-speed operation is possible, and the reading/writing procedure is simple. That is, the internal memory 311 has a small capacity and allows high-speed data reading and writing, compared to the external memory 383 (i.e., the internal memory 311 has a smaller capacity and allows higher speed access than the external memory 383).

The internal memory 311 may have any capacity. However, the larger the capacity is, the higher the cost of the processor 301 is. A description below is given of an example in that the internal memory 311 has a capacity of 256 Kbytes. The internal memory 311 stores not only data processed by the processor 301 but also a program executed by the processor 301. Consequently, free space of the internal memory 311, the free space being usable for data storage, is further reduced. A description below is given of an example in which the free space of the internal memory 311 is 128 Kbytes, which is half of the entire capacity.

Figure 4:
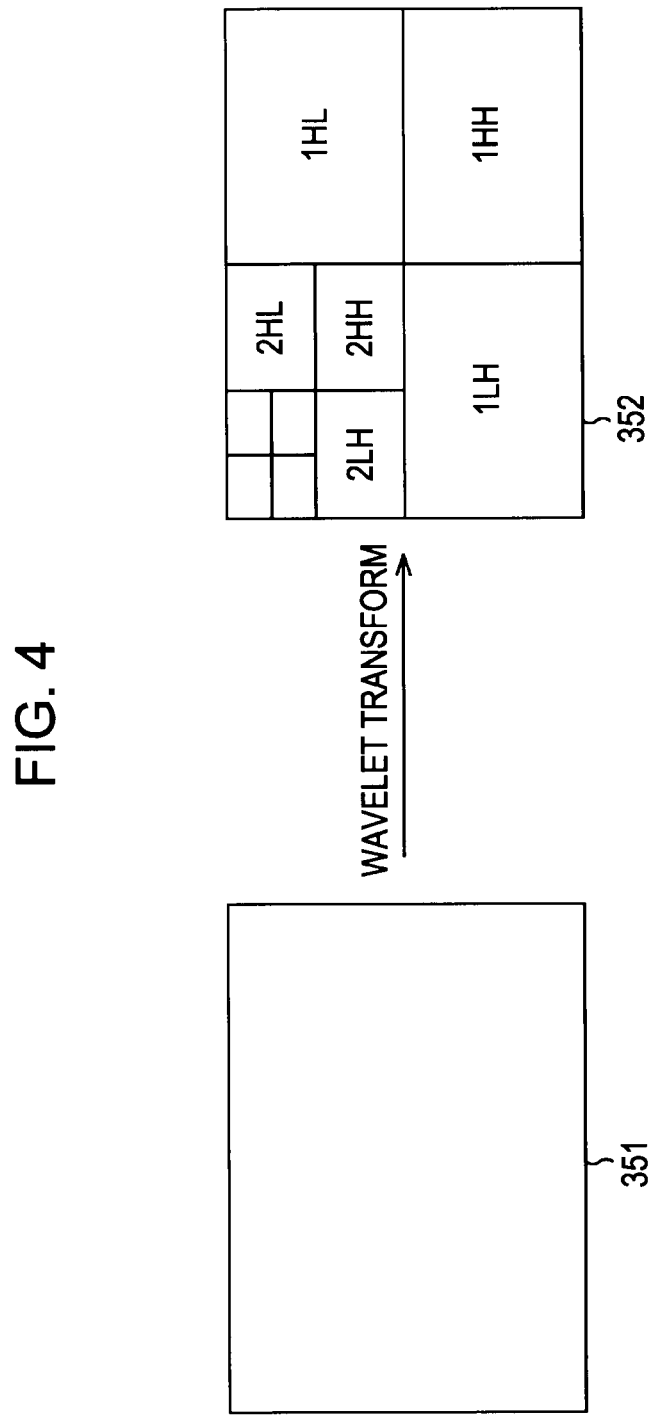
FIG. 4 is a diagram illustrating an overview of wavelet transform.

The processor 301 executes a program, stored in the internal memory 311, to realize the functions of a wavelet transform section 312, an entropy encoding section 326, and an output controller 327. The wavelet transform section 312 performs wavelet transform on baseband image data, input from outside of the processor 301, to decompose the image data into low frequency components and high frequency components until a predetermined decomposition level is reached. The wavelet transform is processing in which filter processing for decomposing input data into low frequency components and high frequency components is performed in both a horizontal direction and a vertical direction. In wavelet transform processing, such filter processing is recursively repeated on horizontal and vertical low frequency components (LL components) obtained as a result of the filter processing. FIG. 4 is a schematic diagram illustrating the wavelet transform. As shown in the example in FIG. 4, as a result of the wavelet transform (the filter processing recursively performed on LL components), a baseband original image 351 is converted into wavelet transform coefficients 352 of decomposed low frequency components and high frequency components up to a predetermined decomposition level. The wavelet transform section 312 has a filter processing section 323 for performing such filter processing. The filter processing section 323 has a horizontal analysis filter section 331 and a vertical analysis filter section 332.

Figure 5:
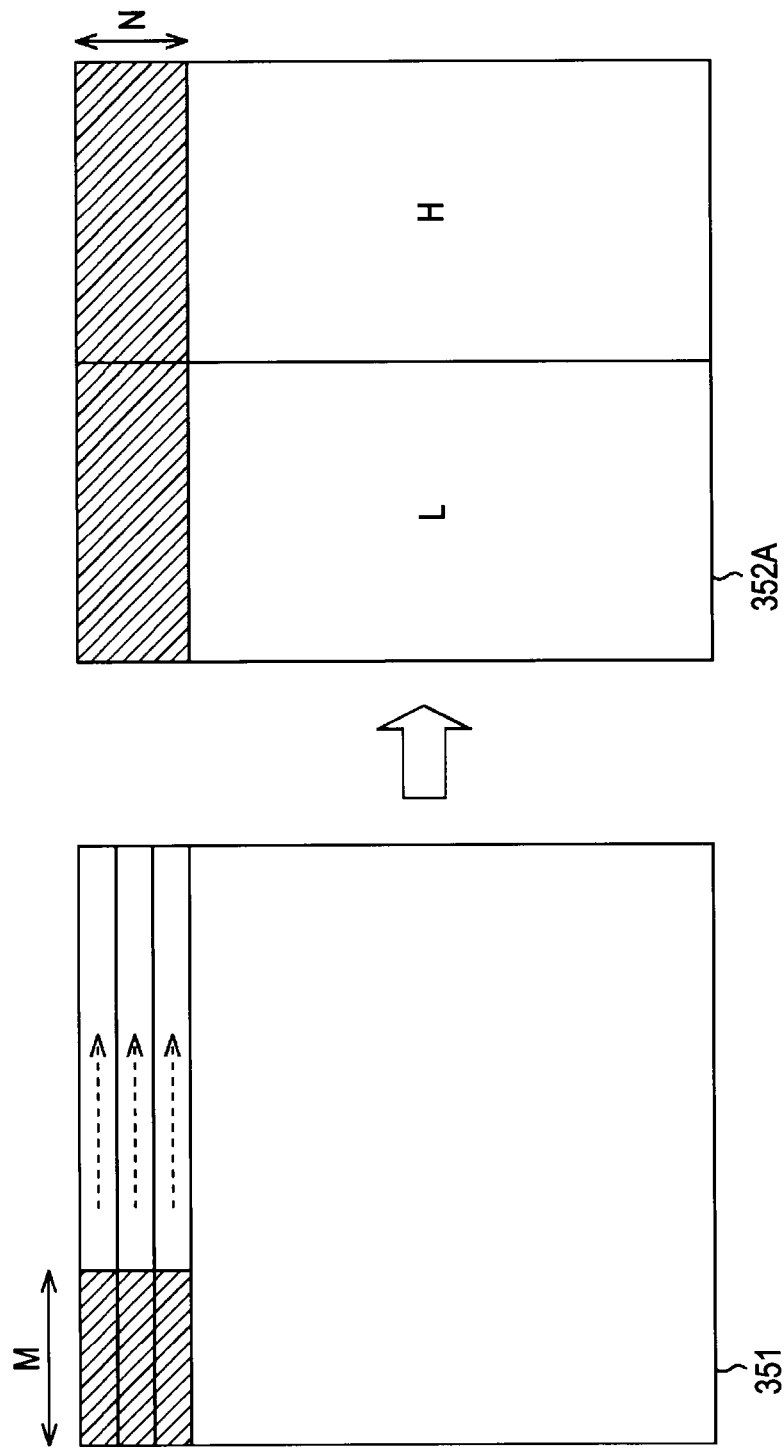
FIG. 5 is a diagram illustrating an overview of analysis filtering.
Figure 6:
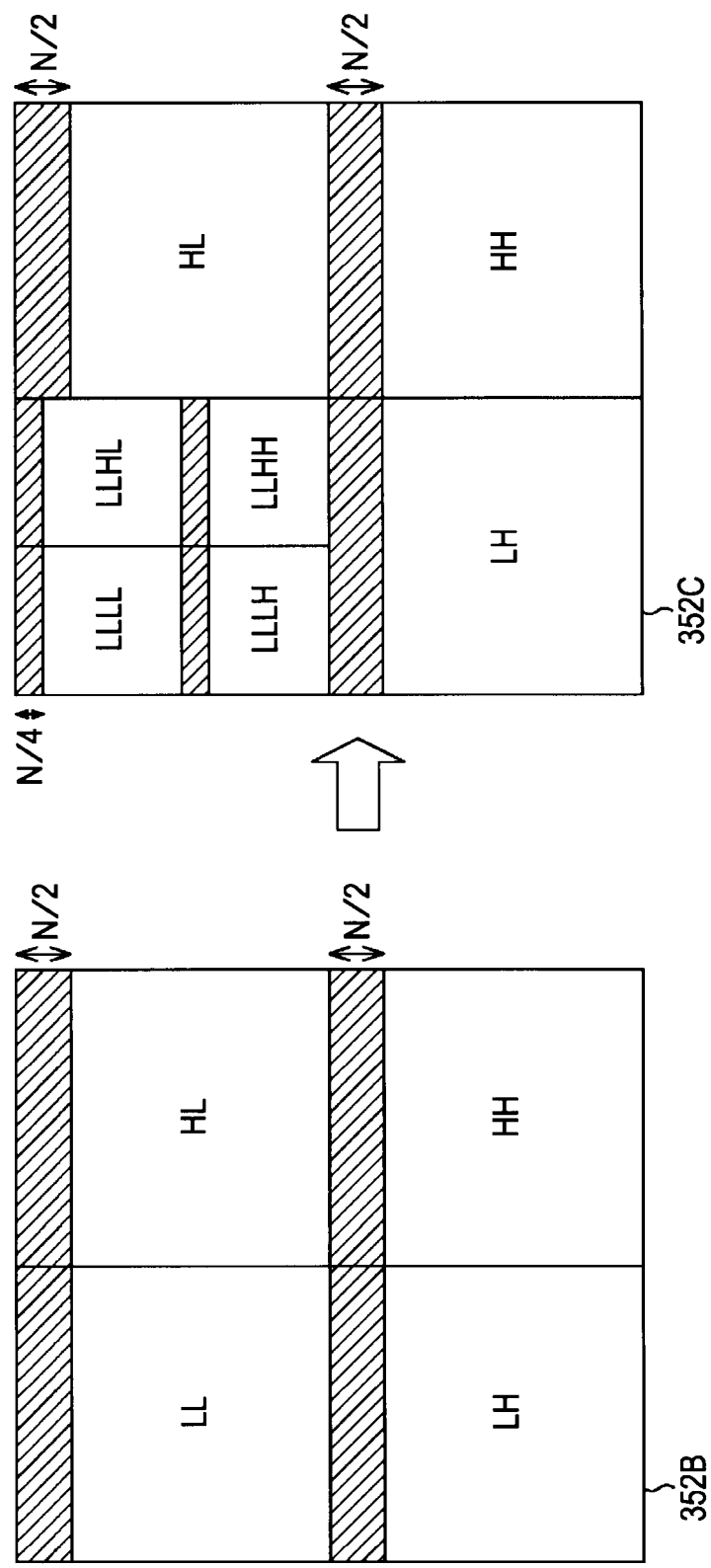
FIG. 6 is a diagram illustrating an overview of analysis filtering subsequent to the analysis processing shown in FIG. 5.

The horizontal analysis filter section 331 performs horizontal analysis filter processing for decomposing input image data into low frequency components and high frequency components in the screen horizontal direction. FIGS. 5 and 6 are schematic diagrams illustrating an example of the analysis filter processing in the horizontal and vertical directions. As shown at the left side in FIG. 5, the baseband original image 351 is input for each line, and horizontal analysis filtering is executed as soon as a sample of M columns to be used for executing the horizontal filtering is prepared. As a result of the horizontal filtering in this manner, the image data is decomposed into horizontal low frequency components (L) and horizontal high frequency components (H) (as indicated by horizontal analysis filter processing results 352A), as shown at the right side in FIG. 5. The horizontal filtering processing is performed for each line.

The vertical analysis filter section 332 performs vertical analysis filter processing for decomposing the horizontal analysis filter processing results 352A into low frequency components and high frequency components in the screen vertical direction. The vertical analysis filter section 332 executes vertical analysis filtering, as soon as the horizontal analysis filter processing is performed for each line and a sample of N lines (the horizontal analysis filter processing results 352A) to be used for executing the vertical filtering is prepared (see the right side in FIG. 5). The vertical analysis filtering is performed on the horizontal low frequency components and the horizontal high frequency components. Consequently, as shown at the left side in FIG. 6, the horizontal analysis filter processing results 352A are decomposed into wavelet transform coefficients 352B at decomposition level 1, i.e., into wavelet transform coefficients (hereinafter referred to as "coefficients") of four types of components, namely, horizontal and vertical low frequency components (LL components), horizontal high and vertical low frequency components (HL components), horizontal low and vertical high components (LH components), and horizontal and vertical high frequency components (HH components).

The horizontal analysis filter section 331 and the vertical analysis filter section 332 then perform analysis filter processing on the horizontal and vertical low frequency components (LL components) of the horizontal coefficients 352B at decomposition level 1 to thereby generate coefficients 352C (of LLLL, LLHL, LLLH, and LLHH components) at decomposition level 2, as shown at the right side in FIG. 6. As described above, the horizontal analysis filter section 331 and the vertical analysis filter section 332 recursively repeat the analysis filter processing on the coefficients of the LL components, i.e., the horizontal and vertical low frequency components, to decompose the original image 351 until a desired decomposition level is reached.

Figure 7:
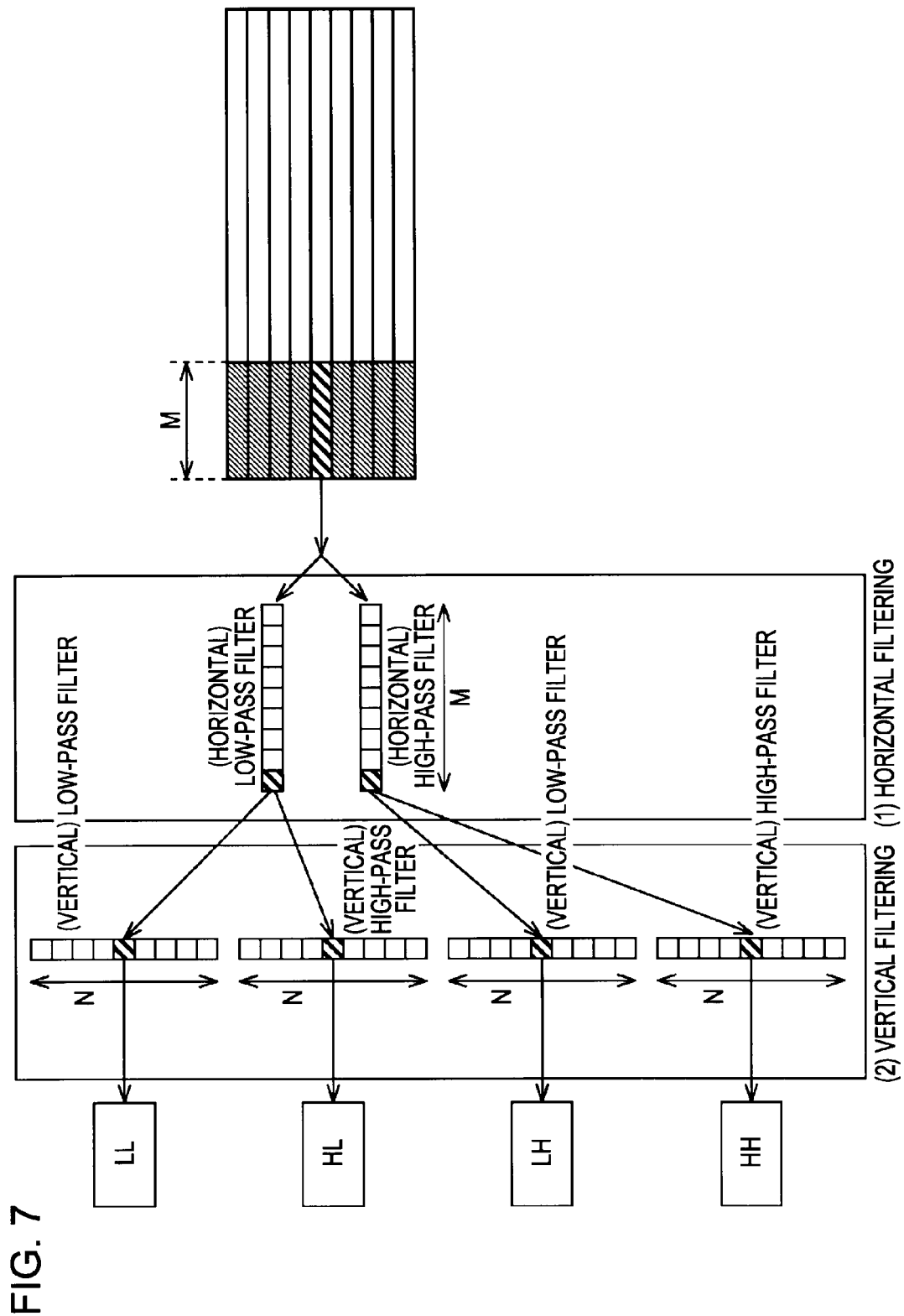
FIG. 7 is a diagram illustrating an example of a sequence of the analysis filtering.
Figure 8:
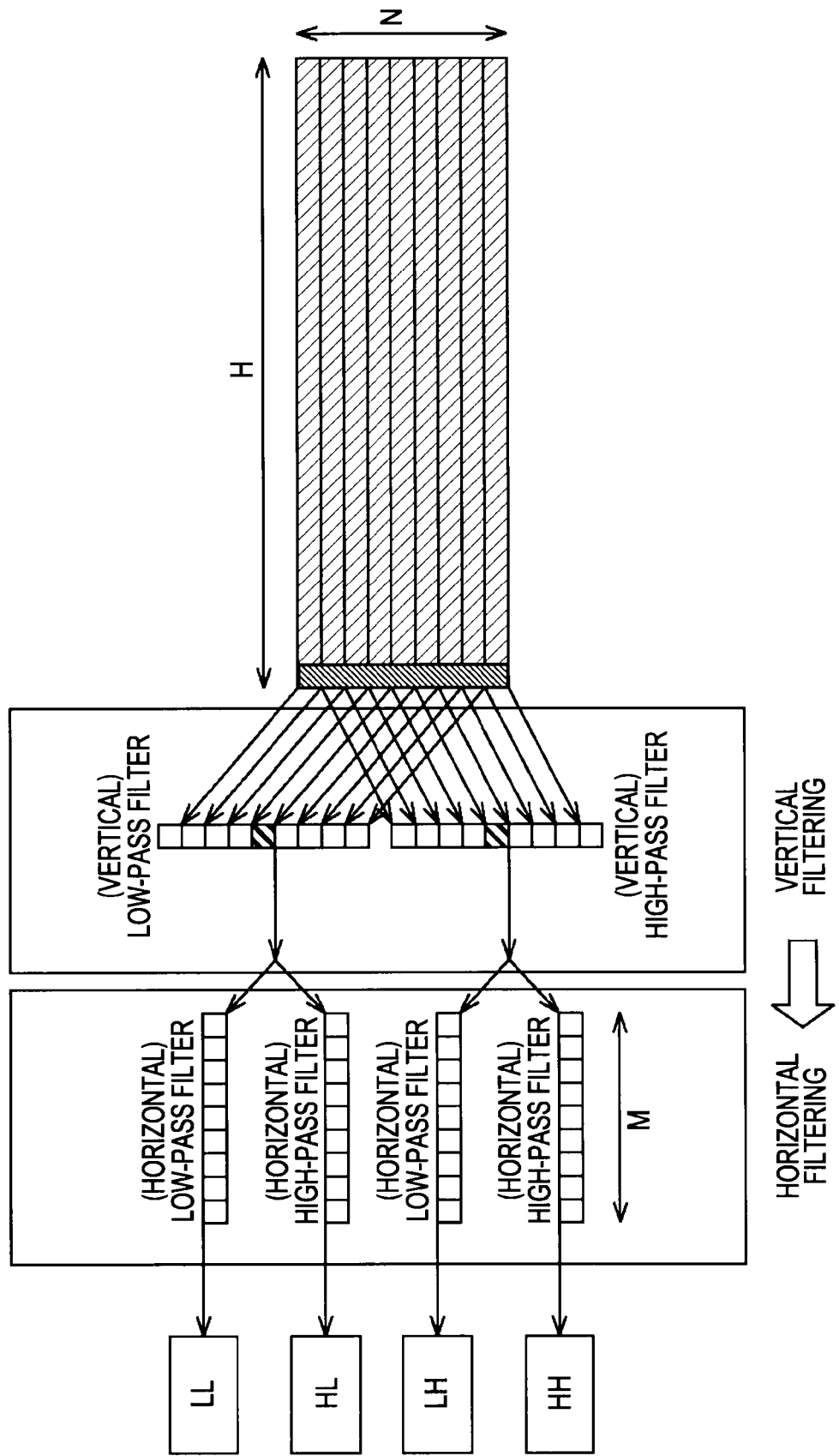
FIG. 8 is a diagram illustrating an example of a sequence of the analysis filtering.

As shown in FIG. 7, the above-described two types of filter processing are performed in the order of the horizontal filtering and the vertical filtering. Conversely, as shown in FIG. 8, even when the filter processing is performed in the order of the vertical filtering and the horizontal filtering, results (coefficient data) obtained therefrom are the same as (i.e., completely agree with) the results obtained in the case of FIG. 7. That is, either of the horizontal filtering and the vertical filtering may be performed first. In general, however, image data of the original image 351 is time-sequentially supplied for each picture. The pictures are supplied line by line from top to bottom. The pictures for the individual lines are sequentially supplied pixel by pixel from left to right. As a result, each time data for one line is stored in the input buffer 321, processing can be performed. Thus, performing the horizontal filtering processing first makes it possible to reduce the amount of storage in the input buffer 321 (i.e., the amount of delay time).

Figure 9:
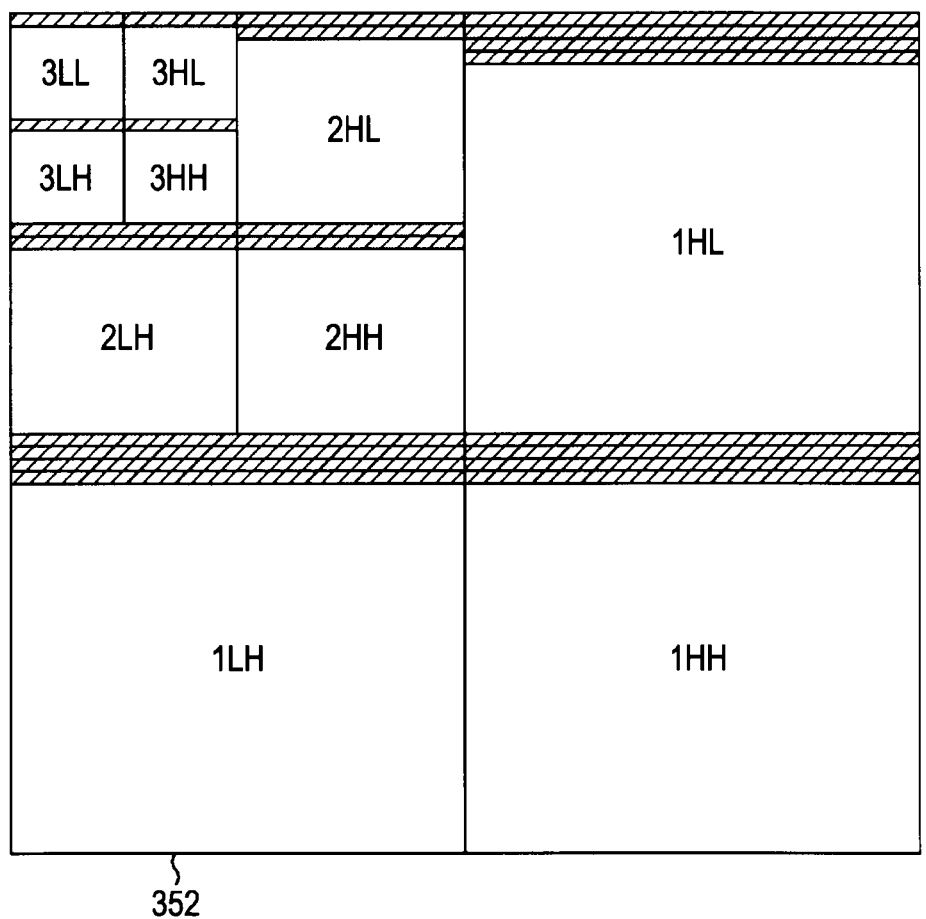
FIG. 9 is a diagram illustrating line blocks.

As shown in FIGS. 5 and 6, the number of lines of coefficients at decomposition level 1, the coefficients being generated from image data for N lines of the baseband original image 351, is N/2. The number of lines of coefficients at decomposition level 2, the coefficients being generated by further performing the filter processing on the coefficients obtained at decomposition level 1, is N/4. In this manner, each time the wavelet transform is repeated (i.e., the decomposition level advances by one), the number of lines of coefficients generated decreases by a power of ½. The number of baseband lines (i.e., a minimum value of N) used for generating coefficients for one line at a last decomposition level is determined by how many times the filtering processing is repeated (i.e., by the number of hierarchical levels up to the last decomposition level). In general, the number of hierarchical levels is predetermined. Baseband image data used for generating coefficients for one line at the last decomposition level (i.e., image data for multiple lines) or coefficients of each hierarchical level are collectively referred to as a line block (or a precinct). FIG. 9 is a schematic diagram showing the line blocks. A hatched portion in FIG. 9 represents coefficients that constitute one line block. As shown in FIG. 9, the line blocks are constituted by coefficients of one line of components at decomposition level 3 (which is the last decomposition level), coefficients of two lines of components at decomposition level 2, and coefficients of four lines of components at decomposition level 1. It is desired that the filter processing be individually performed on a smaller amount of data in order to reduce the amount of data to be stored in the internal memory 311 and the amount of delay time. Accordingly, the wavelet transform section 312 performs wavelet transform processing for each line block.

Figure 10:
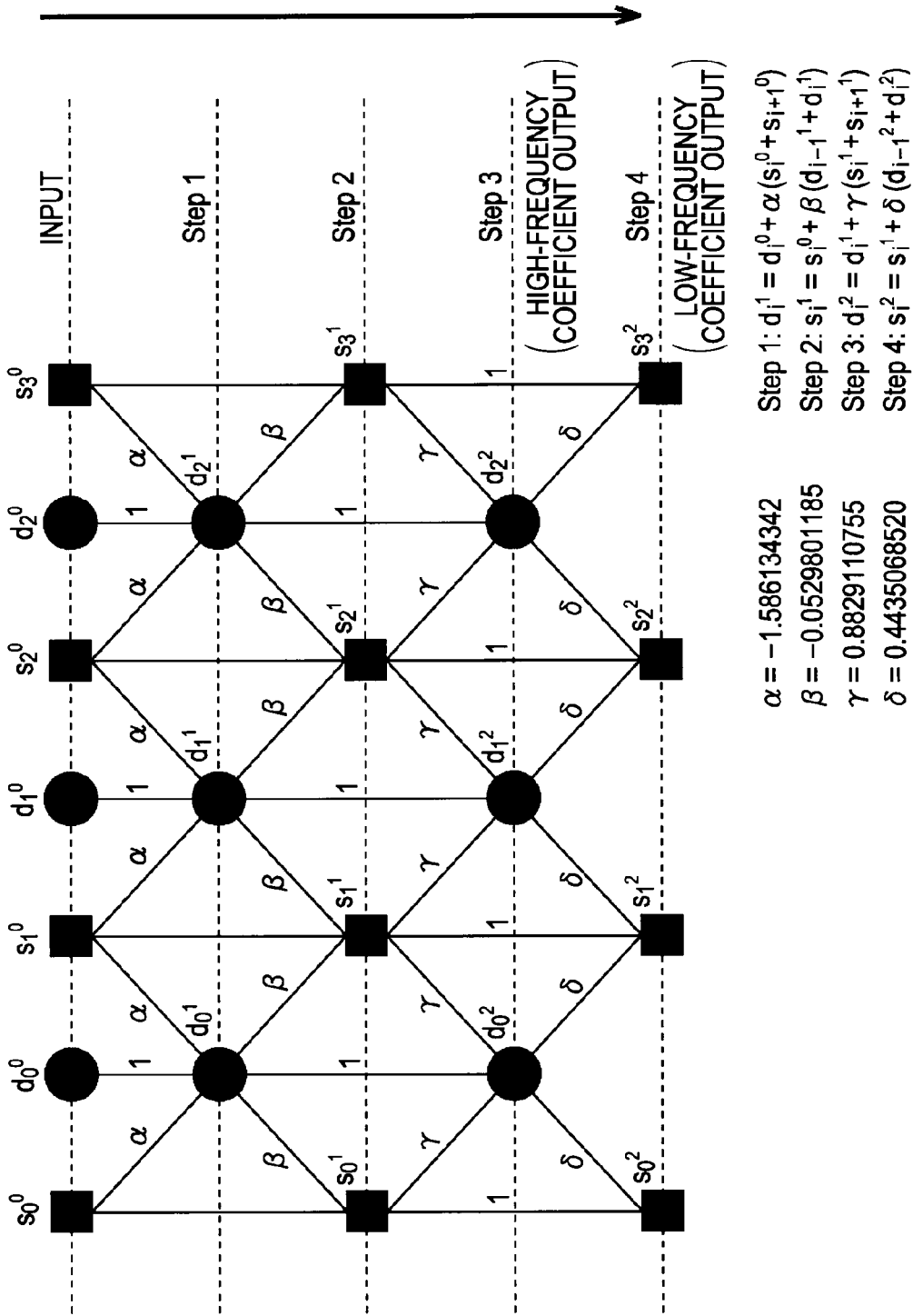
FIG. 10 is a diagram showing an example of a 9/7 filter.

In practice, the horizontal analysis filter section 331 and the vertical analysis filter section 332 perform lifting computation in order to efficiently perform filtering computation. FIG. 10 is a diagram schematically illustrating a Daubechies 9-tap/7-tap filter, which is also employed by JPEG 2000 Part-1. In FIG. 10, one line at the top is an input signal row. Data processing flows from the screen top to the bottom, and high-frequency coefficients are output at Step 3 and low frequency coefficients are output at Step 4 through the following four steps:

Step 1: $d_i^1 = d_i^0 + \alpha(s_i^0 + s_{i+1}^0)$ (1)

Step 2: $s_i^1 = s_i^0 + \beta(d_{i-1}^1 + \beta d_i)$ (2)

Step 3: $d_i^2 = d_i^1 + \gamma(s_i^1 + s_{i+1}^1)$ (3)

Step 4: $s_i^2 = +\delta(d_{i-1}^2 + d_i^2)$ (4)

where α=1.586134342, β=−0.0529801185, γ=0.8829110755, and δ=0.4435068520.

The coefficients obtained during steps 1 to 3 (hereinafter, the coefficients may be referred to as "intermediate coefficients") generally need to be stored from when step 4 is completed until the low frequency coefficients thereof are output, and the intermediate coefficients are recorded in the intermediate calculation buffer 325 shown in FIG. 3. The intermediate coefficients are read from the intermediate calculation buffer 325 during a process of computation in the wavelet transform, as appropriate, and are used for computation in the next step.

Figure 11:
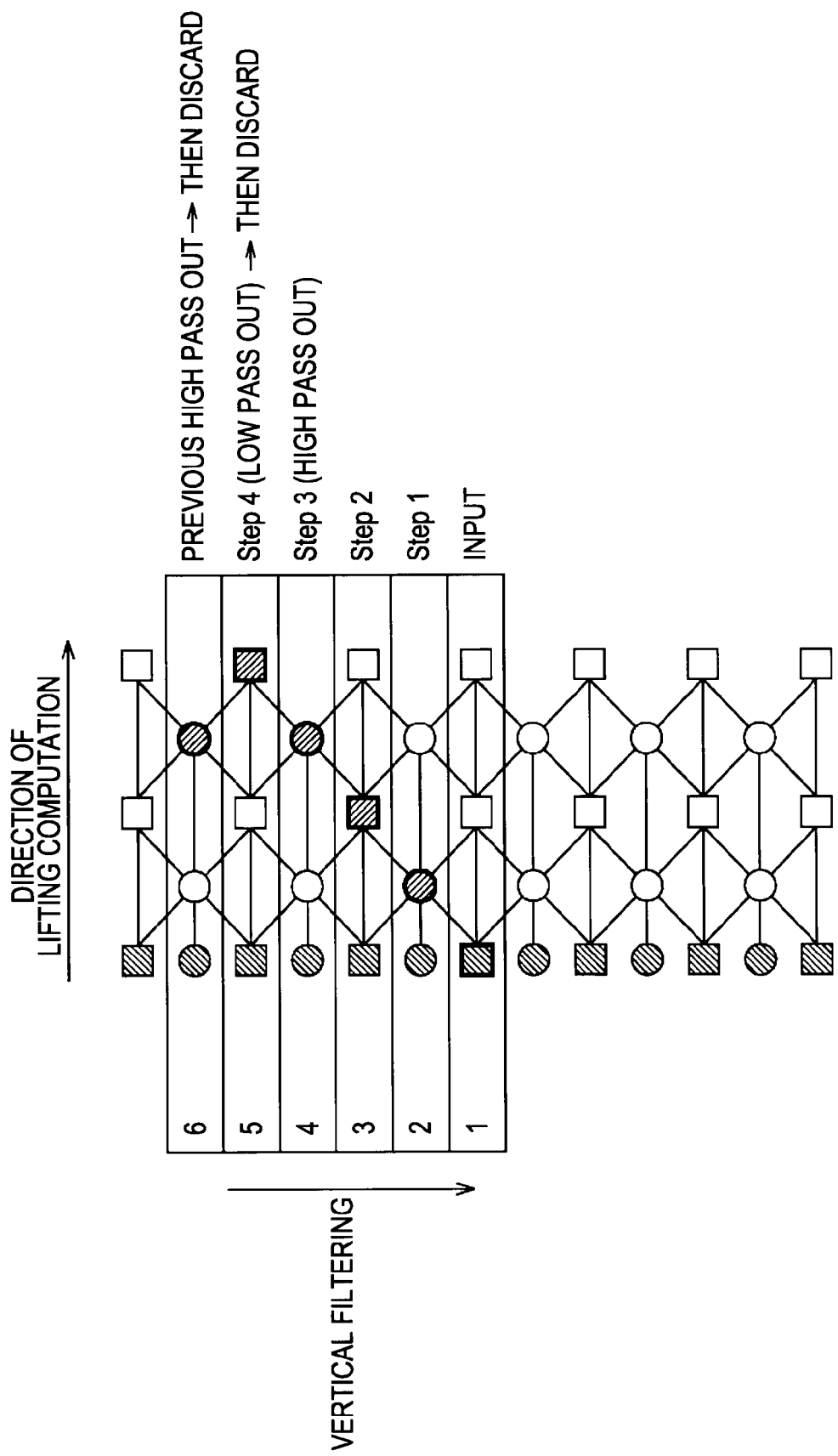
FIG. 11 is a diagram illustrating an example of lifting computation in the analysis filtering.

FIG. 11 specifically shows a process of lifting computation (in the vertical direction) of the 9/7 filter and computation at the intermediate calculation buffer 325. As shown in FIG. 11, when line inputting is performed from the top to the button in the order of line 6, line 5, line 4, line 3, line 2, and line 1, the coefficients of the high frequency components are output at Step 3 and the coefficients of the low frequency components are output at Step 4. At this point, the coefficients of the low frequency components are output only after inputting for line 1 is perfumed, as shown in FIG. 11. One round of such 9/7-filter lifting computation typically requires an input of at least six lines. Coefficients (including the intermediate coefficients) calculated at this time and an input corresponding to two lines are typically required in order to output coefficients of next low frequency components. The horizontal filter processing can also be performed by lifting computation using a 9/7 filter, in the same manner as described above. In this case, the lines described above are replaced with columns and the above description can also be used.

Referring back to FIG. 3, the wavelet transform section 312 has an input controller 322, an intermediate calculation buffer controller 324, and an external-memory input/output controller 381. The input controller 322 controls inputting of data to the filter processing section 323. The intermediate calculation buffer controller 324 controls inputting and outputting of coefficients generated as a result of filter processing performed by the filter processing section 323 and intermediate coefficients generated during the filter processing. The intermediate calculation buffer controller 324 controls storage of data that is to be reused in subsequent filter processing. The external-memory input/output controller 381 controls storage of results of predetermined filter processing. The entropy encoding section 326 generates encoded data by encoding the coefficients obtained as a result of the filter processing and supplied from the filter processing section 323. The output controller 327 controls outputting of the encoded data, generated by the entropy encoding section 326, from the processor 301.

The internal memory 311 temporarily stores image data to be input to the wavelet transform section 312, the coefficient data obtained as a result of the filter processing performed by the filter processing section 323, the intermediate coefficient data obtained during the filter processing, the encoded data generated by the entropy encoding section 326, and so on. In order to store those pieces of data, the internal memory 311 has the input buffer 321, the intermediate calculation buffer 325, an input/output buffer 382, and an output buffer 328. The input buffer 321 stores image data before it is input to the wavelet transform section 312. The input controller 322 controls reading of the input buffer 321. For each decomposition level, the intermediate calculation buffer 325 independently stores, of the coefficient data obtained as a result of the filter processing and the intermediate coefficient data obtained during the filter processing, coefficient data used for subsequent filter processing. That is, the intermediate calculation buffer 325 stores, for each decomposition level, coefficients (i.e., intermediate coefficients) obtained during the process of the computation in the analysis filter processing or LL-component coefficients obtained as a result the computation in the analysis filter processing at each decomposition level that is lower than a first intended decomposition level. The stored coefficients are read and are supplied for subsequent filter processing, as appropriate. The intermediate calculation buffer controller 324 controls inputting/outputting of data to/from the intermediate calculation buffer 325. The intermediate calculation buffer 325 has a small capacity and allows high-speed access, compared to the external memory 383. The input/output buffer 382 stores, of coefficient data that are obtained as a result of the filter processing and are to be used for next filter processing, coefficient data that are to be stored in the external memory 383. The external-memory input/output controller 381 controls inputting/outputting of data to/from the input/output buffer 382. The output buffer 328 stores the encoded data generated by the entropy encoding section 326. The output controller 327 controls inputting/outputting of data to/from the output buffer 328.

The external memory 383 is a storage area provided independently from the processor 301 and corresponds to, for example, the XDR-RAM 203 shown in FIG. 2. The external memory 383 has characteristics in that, compared to the above-described internal memory 311, the circuit scale is small to make it easy to increase the packaging density, the power consumption is low, the operation speed is low, and the reading/writing procedure is complicated. That is, compared to the internal memory 311, the external memory 383 can store a large amount of data, although it operates at low speed.

[Description of Operation]

Operation of the encoder shown in FIG. 3 will now be described. For example, the original image 351 stored in the external memory 383 (such as the XDR-RAM 203) or the HDD 205 is read for each operation of the wavelet transform processing, is supplied to the input buffer 321 through the shared bus 245, as indicated by arrow 361, and is temporarily stored in the input buffer 321. When image data corresponding to a predetermined number of lines (e.g., one line) is stored in the input buffer 321, the input controller 322 reads the image data, as indicated by arrow 362, and supplies the read image data to the filter processing section 323, as indicated by arrow 363.

The horizontal analysis filter section 331 performs horizontal analysis filtering on the input original image 351. The intermediate calculation buffer controller 324 obtains results (coefficients) of the horizontal analysis filtering, as appropriate, as indicated by arrow 364, and causes the coefficients to be stored in the intermediate calculation buffer 325, as indicated by arrow 365. When coefficients of a predetermined number of lines (e.g., six lines) are stored in the intermediate calculation buffer 325, the intermediate calculation buffer controller 324 reads the coefficients, as indicated by arrow 366, and supplies the read coefficients to the filter processing section 323, as indicated by arrow 367. The vertical analysis filter section 332 performs vertical analysis filtering on the supplied coefficients.

Each of the horizontal analysis filtering and the vertical analysis filtering is performed once and, when coefficients of four sub bands of the LL, HL, LH, and HH components are generated, the filter processing section 323 supplies, of the generated coefficients, the coefficients of the HL, LH, and HH components to the entropy encoding section 326, as indicted by arrow 368. The entropy encoding section 326 sequentially encodes the supplied coefficients and supplies the resultant encoded data to the output controller 327, as indicated by arrow 369. The output controller 327 supplies the encoded data to the output buffer 328, as indicated by arrow 370, so that the encoded data is temporarily stored thereby. As indicated by arrow 371, the output controller 327 controls the output buffer 328 to output the encoded data, stored in the output buffer 328, to a section (e.g., the XDR-RAM 203 or the HDD 205) provided outside the processor 301 as an encoded codestream 353 at predetermined timing.

The filter processing section 323 recursively repeats the filter processing on the coefficients of the LL components until an intended decomposition level is reached. Thus, the intermediate calculation buffer controller 324 obtains determined LL-component coefficients from the filter processing section 323, as indicated by arrow 364, and causes the obtained LL-component coefficients to be stored in the intermediate calculation buffer 325, as indicated by arrow 365. Some of the intermediate coefficients generated during lifting computation in the vertical analysis filtering are also used in the vertical analysis filtering to be performed on the next line. Thus, the intermediate calculation buffer controller 324 obtains other determined coefficients (i.e., the intermediate coefficients that are obtained during the lifting computation and that are not any of the coefficients of LL, HL, LH, and HH components) from the filter processing section 323, as indicated by arrow 364, and causes the obtained coefficients to be stored in the intermediate calculation buffer 325, as indicated by arrow 365.

The intermediate calculation buffer controller 324 reads the coefficients stored in the intermediate calculation buffer 325, as appropriate, as indicated by arrow 366, and supplies the read coefficients to the filter processing section 323, as indicated by arrow 367, in order for the filter processing section 323 to perform the filter processing at a next decomposition level. The filter processing section 323 then updates the decomposition level to be processed to a level that is lower by one level, inputs the LL component coefficients read from the middle calculation buffer 325, and performs horizontal analysis filtering and vertical analysis filtering on the LL-component coefficients.—{ }— The filter processing section 323 recursively repeats the filter processing on the coefficients of the LL components at each decomposition level, until the first intended decomposition level is reached. The coefficients of the LL components of the first intended decomposition level are stored in the external memory 383, not in the intermediate calculation buffer 325. When the coefficients of the LL components at the first intended decomposition level are generated, the external-memory input/output controller 381 obtains the LL-component coefficients from the filter processing section 323, as indicated by arrow 391, and causes the obtained LL-component coefficients to be stored in the external memory 383 via the input/output buffer 382, as indicated by arrows 392 and 393.

When the decomposition level to be subjected to the filter processing reaches the first intended decomposition level, the external-memory input/output controller 381 reads the LL-component coefficients, stored in the external memory 383, via the input/output buffer 382, as indicated by arrows 394 and 395, and supplies the read coefficients to the filter processing section 323, as indicated by arrow 396. That, the horizontal analysis filter section 331 performs horizontal analysis filtering on the coefficients read from the external memory 383. As described above, the filter processing section 323 recursively repeats the filter processing on the LL-component coefficients of each decomposition level, until the decomposition level reaches a second intended decomposition level. LL-component coefficients and intermediate coefficients generated by the filter processing are stored in the intermediate calculation buffer 325 under the control of the intermediate calculation buffer controller 324, and are used, as appropriate.

The coefficients of the components of the second intended decomposition level, the coefficients being generated as described above, are supplied to the entropy encoding section 326 for encoding, as indicated by arrow 368. Encoded data generated by the encoding is supplied to the output controller 327, as indicated by arrow 369 and is output, as the encoded codestream 353, to the section (e.g., the XDR-RAM 203 or the HDD 205), provided outside the processor 301, via the output buffer 328, as indicated by arrows 370 and 371.

If all of LL-component coefficients of each decomposition level and all of intermediate coefficients used for next filtering, the coefficients being generated in the wavelet transform processing, are stored in the intermediate calculation buffer 325, coefficients as shown in FIG. 12 are stored therein. That is, the number of vertical lines of the coefficients stored in the intermediate calculation buffer 325 has a fixed value (e.g., six) for each decomposition level, and the horizontal size is reduced by half because of the characteristics of the wavelet transform, as the decomposition level advances by one level. For example, when the original image has a horizontal size of 4096 pixels, the horizontal size at decomposition level 1 is 4096 pixels, the horizontal size at decomposition level 2 is 2048 pixels, and the horizontal size at decomposition level 3 is 1024 pixels. Thus, the intermediate calculation buffer 325 typically requires an amount of memory, as given by:

$$4096 \text{ (pixels)} \times (1+\tfrac{1}{2}+\tfrac{1}{4}+\tfrac{1}{8}) \times 6 \text{ (lines)} \times 4 \text{ (bytes)} = 184 \text{ (Kbytes)} \quad (5)$$

where the second intended decomposition level of the wavelet transform is level 4.

Four bytes (=32 bits) are generally required to ensure the accuracy of wavelet transform coefficients. That is, for example, for 256 Kbytes of the capacity of the internal memory 311, when half the capacity is used by programs and other data and the free space thereof is 128 Kbytes, the use of the method of the related art results in insufficient space in the intermediate calculation buffer 325. In such a case, coefficients corresponding to the shortage in the free space generally need to be stored in the external memory 383. Thus if storage of the coefficients is performed without an appropriate plan, the number of accesses to the external memory 383 increases and the amount of delay time may also increase excessively.

For example, when the large-capacity external memory 383 is used simply by priority, the processing speed may decrease excessively without use of the intermediate calculation buffer 325. Conversely, when it is assumed that the intermediate calculation buffer 325 that allows high-speed writing is used simply by propriety, the external memory 383 is used at a lower level in the decomposition level hierarchy. Consequently, there are possibilities that the number of accesses increases and thus the processing speed decreases excessively.

Accordingly, in the encoder (shown in FIG. 3) according to the embodiment of the present invention, a certain hierarchical decomposition level (the first intended decomposition level) is preset and only the LL component coefficients at the preset first intended decomposition level are stored in the external memory 383. For example, the first intended decomposition level is assumed to be decomposition level 1, and the filter processing is performed once and generated 1LL component coefficients are stored in the external memory 383, as shown in FIG. 13A. Filter processing at a next decomposition level is performed on the 1LL component coefficients read from the external memory 383, as shown in FIG. 13B. Coefficients that are subsequently generated (and that are to be stored) are stored in the intermediate calculation buffer 325.

That is, coefficients up to a decomposition level that is one level higher than the first intended decomposition level are stored in the intermediate calculation buffer 325 and the LL component coefficients of the first intended decomposition level are temporarily saved in the external memory 383. When the filter processing at the decomposition level that is one level higher than the first intended decomposition level is completed, the higher-hierarchical-level coefficients stored in the intermediate calculation buffer 325 become unnecessary. Accordingly, the first-intended-decomposition-level LL component coefficients stored in the external memory 383 are used to start filter processing at the subsequent hierarchical level. In this case, since free space is created in the intermediate calculation buffer 325, coefficients that are subsequently generated can be stored in the intermediate calculation buffer 325. That is, through the use of the external memory 383, the intermediate calculation buffer 325 is used at two different times.

The amount of memory used for the intermediate calculation buffer 325 when this method is used is calculated. The wavelet transform before the first intended decomposition level is referred to as "stage 1" and the wavelet transform after the first intended decomposition level is referred to as "stage 2". The first intended decomposition level may be "decomposition level 1" and the second intended decomposition level may be "decomposition level 3".

$$\text{Stage 1: } 4096(\text{horizontal sizes}) \times 1 \times 6 \text{ (lines)} \times 4 \text{ (bytes)} = 98 \text{ (Kbytes)} \quad (6)$$

$$\text{Stage 2: } 2{,}048(\text{the horizontal size after decomposition is performed once}) \times (1+0.5+0.25) \times 6 \text{ (lines)} \times 4 \text{ (bytes)} = 86 \text{ (Kbytes)} \quad (7)$$

Since the time of stage 1 and the time of stage 2 are different from each other, the capacity of the intermediate calculation buffer 325 may be 98 Kbytes or more. That is, in the entire wavelet transform processing, the intermediate calculation buffer 325 can store coefficients having an amount that exceeds the storage capacity of the intermediate calculation buffer 325.

As a result of control as described above, the intermediate calculation buffer 325 that allows high-speed writing is used more to thereby make it possible to minimize the use of the external memory 383. Thus, it is possible to suppress a processing-time increase caused by use of the external memory 383. That is, the encoder shown in FIG. 3 can more efficiently use the hardware resources and can more easily perform wavelet-transform-based encoding processing at higher speed. In this manner, the encoder shown in FIG. 3 can reduce the amount of processing time of the entire encoding processing and also can suppress an increase in cost.

[Description of Flow of Processing]

An example of a flow of encoding processing as described above will now be described with reference to a flowchart shown in FIG. 14. The encoder shown in FIG. 3 executes this encoding processing for each line block (i.e., for each predetermined number of lines) of an original image 351.

Upon start of the encoding processing, in step S101, the wavelet transform section 312 performs first horizontal analysis filter processing for performing horizontal analysis filtering on the original image 351 input to the input buffer 321. Details of the first horizontal analysis filter processing are described below. When the first horizontal analysis filter processing is completed, in step S102, the wavelet transform section 312 determines whether or not a decomposition level after the processing is the first intended decomposition level. When it is determined that the present decomposition level to be processed is not a level that is one level higher than the first intended decomposition level and no coefficients of the first intended decomposition level are to be generated by the filter processing, the process proceeds to step S103.

In step S103, the wavelet transform section 312, the entropy encoding section 326, and the output controller 327 perform first vertical analysis filter encoding processing for performing vertical analysis filtering on the results of the horizontal analysis filter processing, causing generated LL component coefficients to be stored in the intermediate calculation buffer 325, encoding coefficients of other components, and outputting the coefficients. Details of the first vertical analysis filter encoding processing are described below. Upon completion of the first vertical analysis filter encoding processing, the process proceeds to step S104 in which the wavelet transform section 312 updates the decomposition level to be processed to a decomposition level that is lower by one level and inputs the LL component coefficients stored in the intermediate calculation buffer 325 in the internal memory 311. In step S105, the wavelet transform section 312 performs second horizontal analysis filter processing for performing horizontal analysis filtering at the new decomposition level to be processed. Specifically, the wavelet transform section 312 performs horizontal analysis processing on the LL component coefficients stored in the intermediate calculation buffer 325 during the previous filter processing. Details of the second horizontal analysis filter processing are described below.

Upon completion of the processing in step S105, the process returns to step S102. Thus, the wavelet transform section 312 repeatedly executes the processing in steps S102 to S105 until it is determined in step S102 that the decomposition level after the processing is the first intended decomposition level. When it is determined in step S102 that the present decomposition level to be processed is a level that is one level higher than the first intended decomposition level and coefficients of the first intended decomposition level are to be generated by the filter processing, the process proceeds to step S106.

In step S106, the wavelet transform section 312, the entropy encoding section 326, and the output controller 327 perform second vertical analysis filter encoding processing for performing vertical analysis filtering on the results of the horizontal analysis filter processing, causing generated LL component coefficients of the first intended decomposition level to be stored in the external memory 383, encoding coefficients of other components, and outputting the coefficients. Details of the second vertical analysis filter encoding processing are described below. Steps S101 to S106 up to this point are executed as processing for stage 1 described above. The LL component coefficients of the first intended decomposition level are stored in the external memory 383. The second vertical analysis filter encoding processing is then completed and the process proceeds to step S111.

In step S111, the wavelet transform section 312 updates the decomposition level to be processed to a decomposition level that is lower by one level and inputs the LL component coefficients stored in the external memory 383. In step S112, the wavelet transform section 312 performs third horizontal analysis filter processing for performing horizontal analysis filtering on the first-intended-decomposition level LL component coefficients read from the external memory 383. Details of the third horizontal analysis filter processing are described below.

In step S113, the wavelet transform section 312 determines whether or not a decomposition level after the processing is the second intended decomposition level. When it is determined that the present decomposition level to be processed is not a level that is one level higher than the second intended decomposition level and no coefficients of the second intended decomposition level are to be generated by the filter processing, the process proceeds to step S114. In step S114, the wavelet transform section 312, the entropy encoding section 326, and the output controller 327 perform first vertical analysis filter encoding processing. In step S115, the wavelet transform section 312 updates the decomposition level to be processed to a decomposition level that is lower by one level and inputs the LL component coefficients stored in the intermediate calculation buffer 325 in the internal memory 311. In step S116, the wavelet transform section 312 performs second horizontal analysis filter processing.

Upon completion of the processing in step S116, the process returns to step S113. That is, the wavelet transform section 312 repeatedly executes the processing in steps S113 to S116 until it is determined in step S113 that the decomposition level after the processing is the second intended decomposition level. When it is determined in step S113 that the present decomposition level to be processed is a level that is one level higher than the second intended decomposition level and coefficients of the second intended decomposition level are to be generated by the filter processing, the process proceeds to step S117.

In step S117, the wavelet transform section 312, the entropy encoding section 326, and the output controller 327 perform third vertical analysis filter encoding processing for performing vertical analysis filtering on the results of the horizontal analysis filter processing, encoding generated component coefficients of the second intended decomposition level, and outputting the encoded component coefficients. Details of the third vertical analysis filter encoding processing are described below. Steps S111 to S117 up to this point are executed as processing in stage 2 described above.

Upon completion of the above-described processing in step S117, the encoding processing ends. As described above, the encoding processing is performed in two separate stages, i.e., stages 1 and 2, through the use of the external memory 383. Thus, in the encoder shown in FIG. 3, in the entire encoding processing, information having an amount that exceeds the storage capacity of the intermediate calculation buffer 325 can be stored in the intermediate calculation buffer 325. Thus, it is possible to enhance the efficiency of using the hardware resources.

A detailed example of a flow of the first horizontal analysis filter processing executed in step S101 in FIG. 14 will now be described with reference to a flowchart shown in FIG. 15. Upon start of the first horizontal analysis filter processing, in step S131, the input controller 322 inputs, from the input buffer 321 in the internal memory 311, image data of lines to be processed. In step S132, the intermediate calculation buffer controller 324 reads, from the intermediate calculation buffer 325 in the internal memory 311, other coefficients to be used for the horizontal analysis filtering. When coefficients to be used for the filter processing are obtained in steps S131 and S132, the process proceeds to step S133 in which the horizontal analysis filter section 331 performs horizontal analysis filtering on the obtained coefficients. In step S134, the intermediate calculation buffer controller 324 causes the coefficients obtained as a result of the horizontal analysis filtering (the analysis) to be stored in the intermediate calculation buffer 325 in the internal memory 311. In step S135, the intermediate calculation buffer controller 324 causes other coefficients used for next processing to be stored in the intermediate calculation buffer 325 in the internal memory 311. In step S136, the wavelet transform section 312 determines whether or not all of image data (a line block (e.g., image data of six lines)) stored in the input buffer 321 in the internal memory 311 have been processed. Upon determining that not all of the image data have been processed, the process returns to step S131 in which the wavelet transform section 312 repeats the subsequent processing.

That is, the wavelet transform section 312 performs the horizontal analysis filtering for each line, by repeatedly executing the processing in steps S131 to S136 on the original image 351 for each line block, the original image 351 being stored in the input buffer 321. The processing in steps S131 to S136 may be performed at arbitrary timing. It is, however, desired that the processing be performed each time the image data corresponding to one line is stored in the input buffer 321, in order to further reduce the capacity of the input buffer 321 and to further reduce the amount of encoding processing time. When it is determined in step S136 that all of the image data (the line block) stored in the input buffer 321 in the internal memory 311 have been processed, the first horizontal analysis filter processing (i.e., in step S101 in FIG. 14) ends and the process proceeds to step S102 in FIG. 14.

A detailed example of a flow of the first vertical analysis filter encoding processing executed in steps S103 and S114 in FIG. 14 will now be described with reference to a flowchart shown in FIG. 16. Upon start of the first vertical analysis filter encoding processing, in step S151, the intermediate calculation buffer controller 324 reads, from the intermediate calculation buffer 325 in the internal memory 311, the coefficients obtained as a result of the horizontal analysis filtering at the decomposition level to be processed and corresponding to the number of lines (e.g., six lines) to be processed in each operation of the processing. In step S152, the intermediate calculation buffer controller 324 reads, from the intermediate calculation buffer 325 in the internal memory 311, other coefficients to be used for vertical analysis filtering. In step S153, the vertical analysis filter section 332 performs the vertical analysis filtering on the coefficients read in the processing in steps S151 and S152. In step S154, the intermediate calculation buffer controller 324 causes the LL-component coefficients of the coefficients obtained as a result of the vertical analysis filtering to be stored in the intermediate calculation buffer 325 in the internal memory 311. In step S155, the entropy encoding section 326 performs entropy encoding on, of the coefficients obtained as a result of the vertical analysis filtering, the coefficients of HL components, LH components, and HH components. In step S156, the output controller 327 causes encoded data generated in step S155 to be output, as the encoded codestream 353, from the processor 301 via the output buffer 328. In step S157, the intermediate calculation buffer controller 324 causes coefficients (other coefficients) used for next filter processing to be stored in the intermediate calculation buffer 325 in the internal memory 311.

In step S158, the wavelet transform section 312 determines whether or not all of the coefficients obtained as a result of the horizontal analysis filtering at the decomposition level to be processed and stored in the intermediate calculation buffer 325 in the internal memory 311 have been processed. Upon determining that not all of the coefficients have been processed, the process returns to step S151 in which the wavelet transform section 312 repeats the subsequent processing. That is, the wavelet transform section 312 repeatedly executes the processing in steps S151 to S158 on the coefficients of the decomposition level to be processed, the coefficients corresponding to a predetermined amount (e.g., six lines) and being stored in the intermediate calculation buffer 325. It is, therefore, desired that the processing in steps S151 to S158 be performed as soon as the coefficients resulting from the horizontal analysis filter processing and corresponding to the number of lines to be processed in each operation of the vertical analysis filtering processing are stored in the intermediate calculation buffer 325, in order to further reduce the capacity of the intermediate calculation buffer 325 and to further reduce the amount of encoding processing time.

Figure 14:
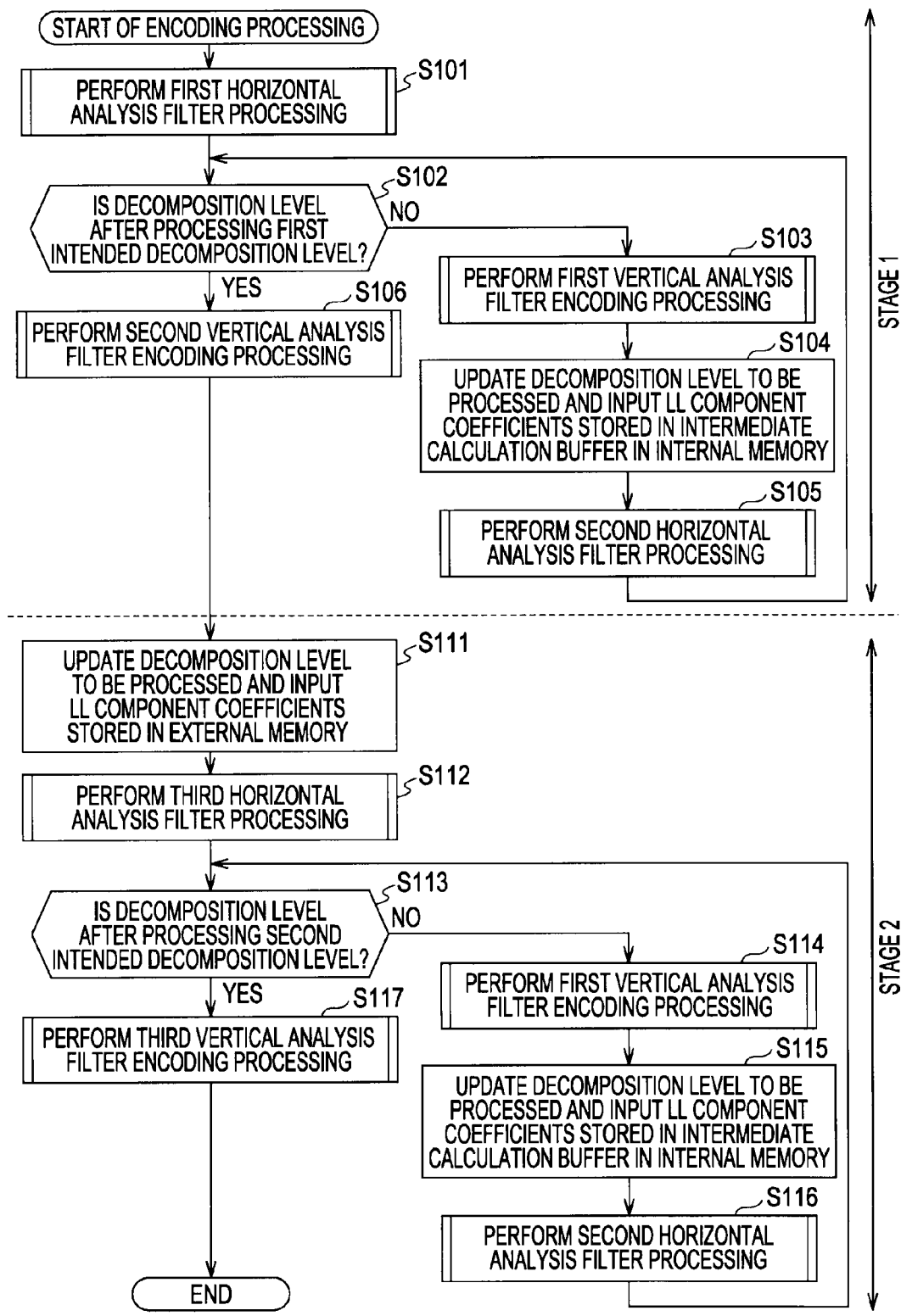
FIG. 14 is a flowchart illustrating an example of a flow of encoding processing.
Figure 15:
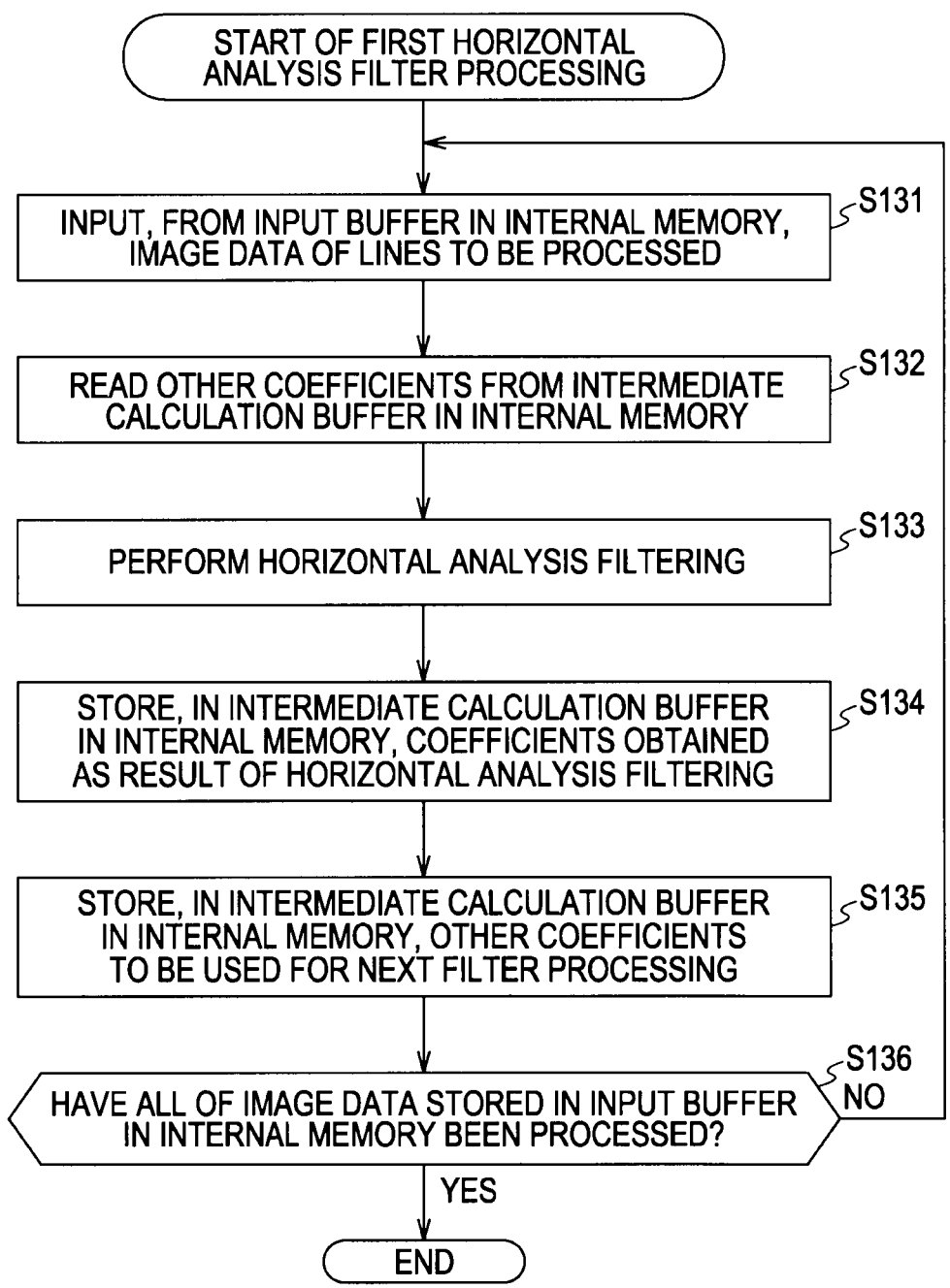
FIG. 15 is a flowchart illustrating an example of a flow of first horizontal analysis filter processing.

When it is determined in step S158 that all of the coefficients obtained as a result of the horizontal analysis filtering at the decomposition level to be processed and stored in the intermediate calculation buffer 325 in the internal memory 311 have been processed, the first vertical analysis filter encoding processing ends and the process proceeds to the next processing in FIG. 14. That is, in the case of the first vertical analysis filter encoding processing executed in step S103 in FIG. 14, the process then proceeds to step S104. In the case of the first vertical analysis filter encoding processing executed in step S114 in FIG. 14, the process then proceeds to step S115.

Figure 17:
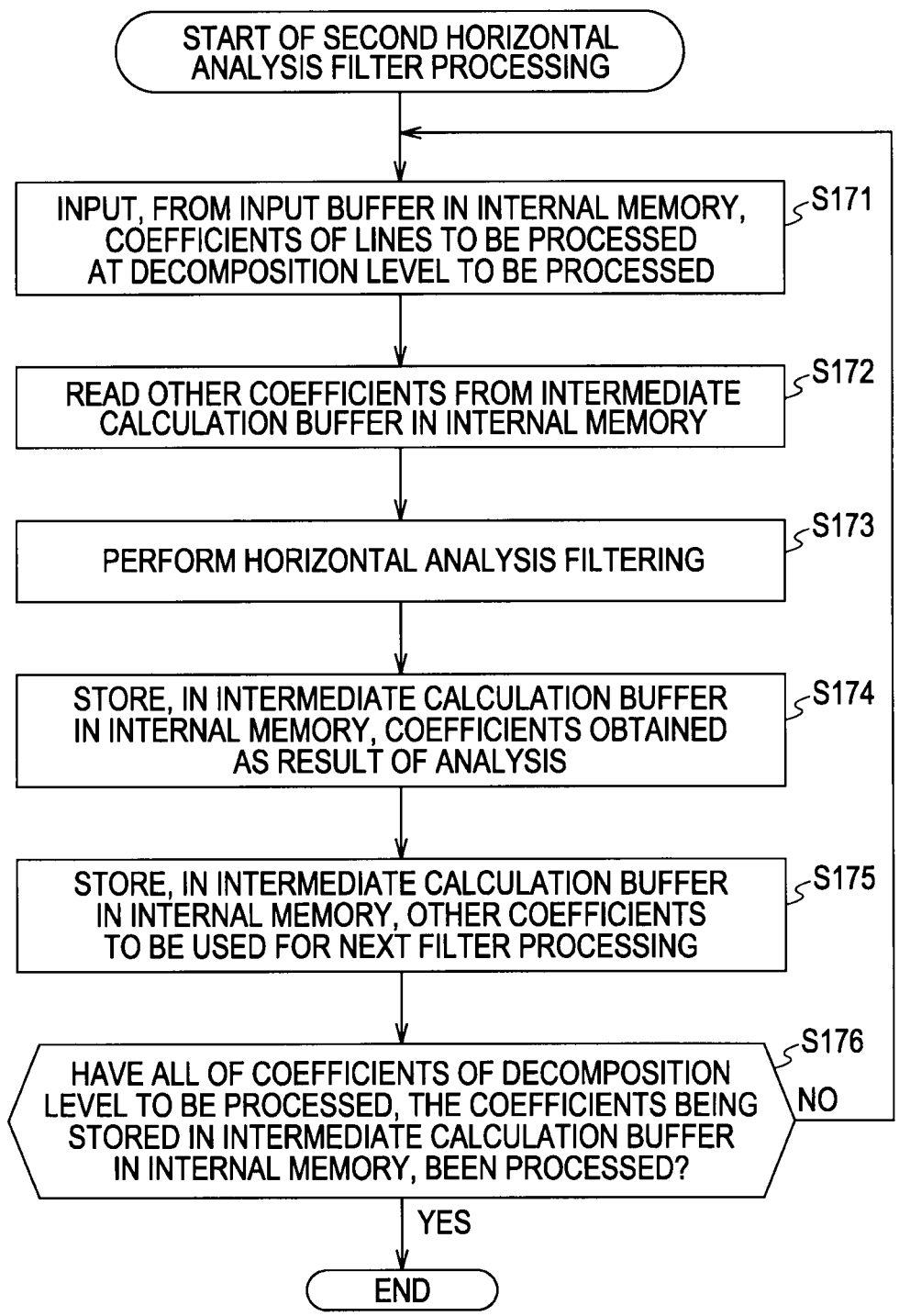
FIG. 17 is a flowchart illustrating an example of a flow of second horizontal analysis filter processing.

A detailed example of a flow of the second horizontal analysis filter processing executed in steps S105 and S116 will now be described with reference to a flowchart shown in FIG. 17. The contents of the second horizontal analysis filter processing are basically the same as those of the first horizontal analysis filter processing. The second horizontal analysis filter processing, however, is performed on the LL component coefficients obtained as a result of the vertical analysis filter processing performed at the decomposition level that is higher by one level, the LL component coefficients being stored in the intermediate calculation buffer 325. Specifically, upon start of the second horizontal analysis filter processing, in step S171, the intermediate calculation buffer controller 324 reads, from the intermediate calculation buffer 325 in the internal memory 311, coefficients of lines to be processed at the decomposition level to be processed and inputs the read coefficients to the filter processing section 323. The processing in steps S172 to S175 is performed in the same manner as the processing in steps S132 to S135 shown in FIG. 15.

The horizontal analysis filtering in step S173, however, is performed on the coefficients read from the intermediate calculation buffer 325 in steps S171 and S172. Since the read coefficients are results of the vertical analysis filtering, the processing in steps S171 to S176 is executed after all of the coefficients of the line block to be processed at the decomposition level to be processed are stored in the intermediate calculation buffer 325.

In step S176, the wavelet transform section 312 determines whether or not all of the coefficients of the line block to be processed at the decomposition level to be processed, the coefficients being stored in the intermediate calculation buffer 325 in the internal memory 311, have been processed. Upon determining that not all of the coefficients have been processed, the process returns to step S171 and the wavelet transform section 312 repeats the subsequent processing. That is, the wavelet transform section 312 performs the horizontal analysis filtering for each line, by repeatedly executing the processing in steps S171 to S176 on the coefficients of the line block to be processed at the decomposition level to be processed, the coefficients being stored in the intermediate calculation buffer 325. When it is determined in step S176 that all of the coefficients of the decomposition level to be processed (i.e., all of the coefficients of the line block to be processed), the coefficients being stored in the intermediate calculation buffer 325, have been processed, the second horizontal analysis filter processing ends and the process proceeds to the next step in FIG. 14. That is, in the case of the second horizontal analysis filter processing executed in step S105 in FIG. 14, the process then proceeds to step S102. In the case of the second horizontal analysis filter processing executed in step S116 in FIG. 14, the process then proceeds to step S113.

A detailed example of a flow of the second vertical analysis filter encoding processing executed in step S106 in FIG. 14 will now be described with reference to a flowchart shown in FIG. 18. The contents of the second vertical analysis filter encoding processing are basically the same as those of the first vertical analysis filter encoding processing. In the second vertical analysis filter encoding processing, however, LL component coefficients generated as a result of the analysis are stored in the external memory 383. Thus, the wavelet transform section 312 performs vertical analysis filtering as in the first vertical analysis filter encoding processing, by performing processing in steps S191 to S193 in FIG. 18 in the same manner as the processing in steps S151 to S153 in FIG. 16.

In step S194, the external-memory input/output controller 381 causes the LL component coefficients obtained as a result of the vertical analysis filtering performed in step S193 to be stored in the input/output buffer 382 in the internal memory 311. In step S195, the external-memory input/output controller 381 writes the LL component coefficients, stored in the input/output buffer 382 in the internal memory 311 in step S194, to the external memory 383 for storage. Coefficients other than the LL component coefficients are processed as in the case of the first vertical analysis filter encoding processing. Thus, the entropy encoding section 326 performs processing in step S196 shown in FIG. 18, in the same manner as the processing in step S155 shown in FIG. 16. The output controller 327 performs processing in step S197 shown in FIG. 18, in the same manner as the processing in step S156 shown in FIG. 16. The intermediate calculation buffer controller 324 performs processing in step S198 shown in FIG. 18, in the same manner as the processing in step S157 shown in FIG. 16.

Figure 16:
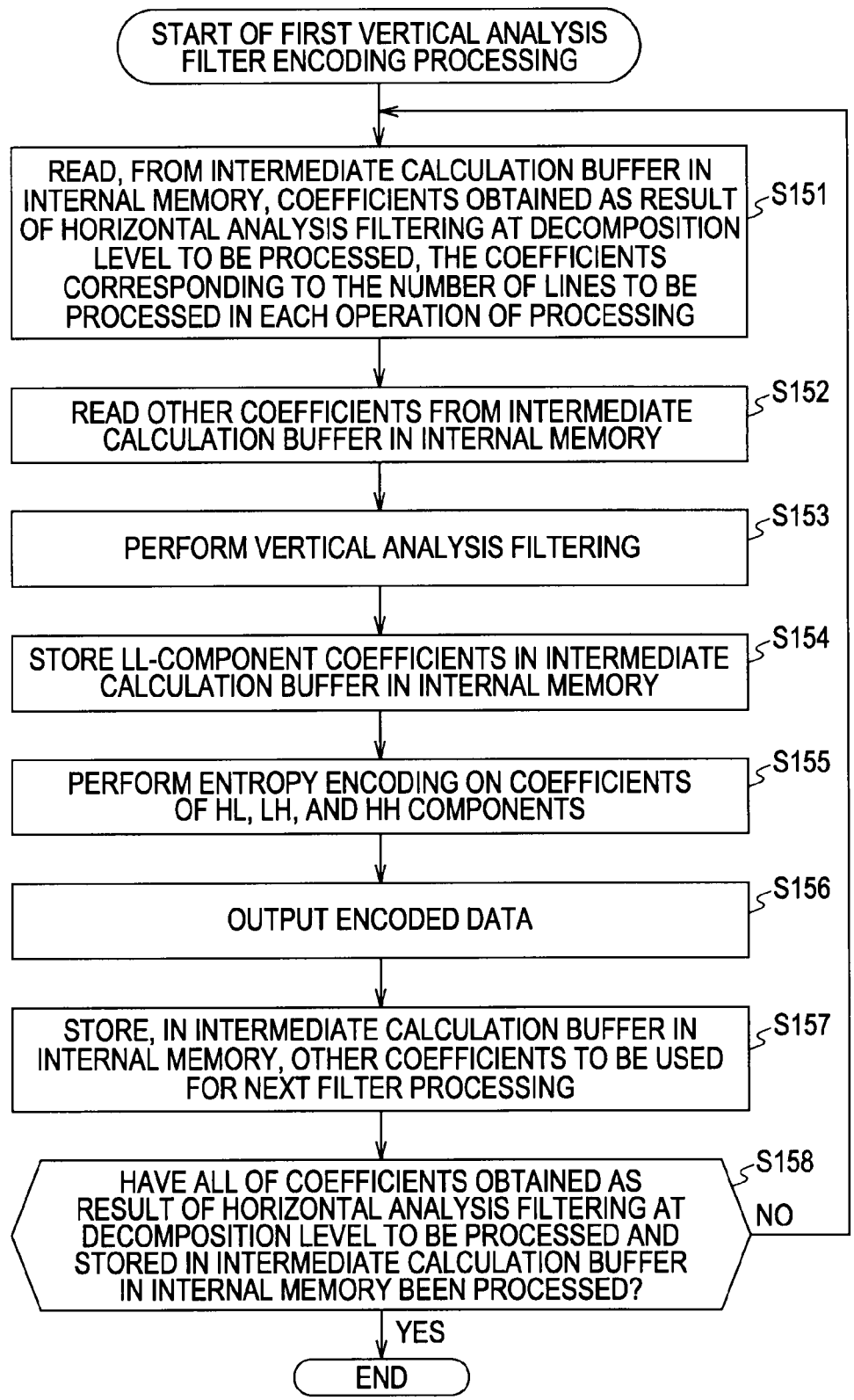
FIG. 16 is a flowchart illustrating an example of a flow of first vertical analysis filter encoding processing.
Figure 18:
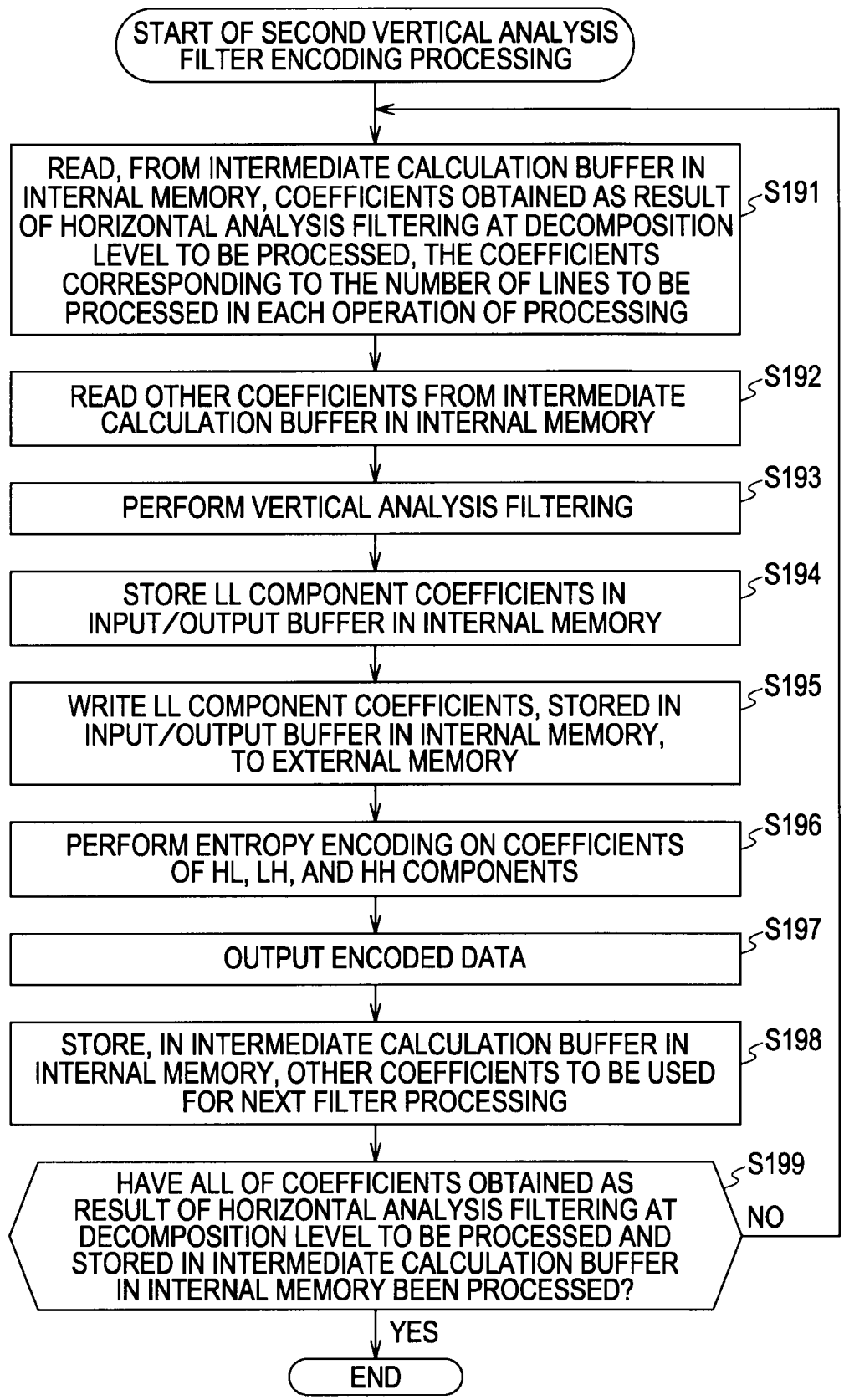
FIG. 18 is a flowchart illustrating an example of a flow of second vertical analysis filter encoding processing.

In step S199 shown in FIG. 18, the wavelet transform section 312 determines whether or not all of the coefficients obtained as a result of the horizontal analysis filtering at the decomposition level to be processed and stored in the intermediate calculation buffer 325 in the internal memory 311 have been processed, as in the case in step S158 shown in FIG. 16. Upon determining that not all of the coefficients have been processed, the process returns to step S191 and the wavelet transform section 312 repeats the subsequent processing. That is, the wavelet transform section 312 repeatedly executes the processing in steps S191 to S199 on the coefficients of the decomposition level to be processed, the coefficients corresponding to a predetermined amount (e.g., six lines) and being stored in the intermediate calculation buffer 325. It is, therefore, desired that the processing in steps S191 to S199 be performed as soon as the horizontal-analysis-processing results corresponding to the number of lines to be processed in each operation of the vertical analysis filtering are stored in the intermediate calculation buffer 325, in order to further reduce the capacity of the intermediate calculation buffer 325 and to further reduce the amount of encoding processing time. When it is determined in step S199 that all of the coefficients obtained as a result of the horizontal analysis filtering at the decomposition level to be processed and stored in the intermediate calculation buffer 325 in the internal memory 311 have been processed, the second vertical analysis filter encoding processing (i.e., in step S106 in FIG. 14) ends and then the process proceeds to step S111.

Figure 19:
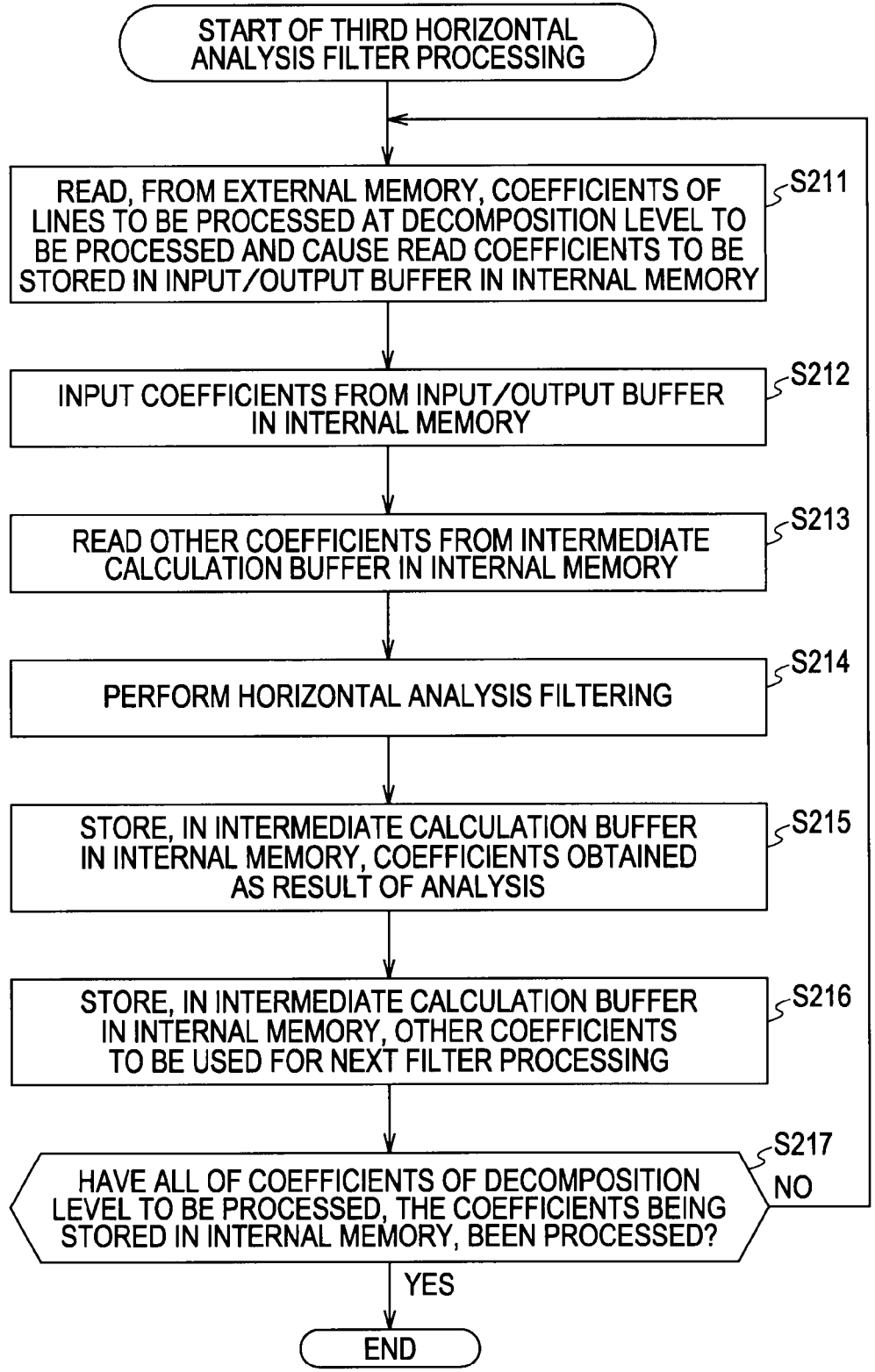
FIG. 19 is a flowchart illustrating an example of a flow of third horizontal analysis filter processing.

A detailed example of a flow of the third horizontal analysis filter processing executed in step S112 shown in FIG. 14 will now be described with reference to a flowchart shown in FIG. 19. The contents of the third horizontal analysis filter processing are basically the same as those of the first horizontal analysis filter processing. The third horizontal analysis filter processing, however, is performed on the LL component coefficients obtained as a result of the vertical analysis filter processing performed at the decomposition level that is higher by one level and stored in the external memory 383. Specifically, upon start of the third horizontal analysis filter processing, in step S211, the external-memory input/output controller 381 reads, from the external memory 383, coefficients of lines to be processed at the decomposition level to be processed and causes the read coefficients to be stored in the input/output buffer 382 in the internal memory 311. In step S212, the external-memory input/output controller 381 reads the coefficients, stored in the input/output buffer 382 in the internal memory 311 in step S211, and inputs the read coefficients to the filter processing section 323. The processing in steps S213 to S216 shown in FIG. 19 is performed in the same manner as the processing in steps S132 to S135 shown in FIG. 15.

The horizontal analysis filtering in step S214, however, is performed on the coefficients read from the external memory 383 in steps S211 and S212 and on the coefficients read from the intermediate calculation buffer 325 in step S213. Since the read coefficients are results of the vertical analysis filtering, the processing in steps S211 to S217 is executed after all of the coefficients of the line block to be processed at the decomposition level to be processed are stored in the external memory 383.

In step S217, the wavelet transform section 312 determines whether or not all of the coefficients of the line block to be processed at the decomposition level to be processed, the coefficients being stored in the external memory 383, have been processed. Upon determining that not all of the coefficients have been processed, the process returns to step S211 and the wavelet transform section 312 repeats the subsequent processing. That is, the wavelet transform section 312 performs horizontal analysis filtering for each line, by repeatedly executing the processing in steps S211 to S217 on the coefficients of the line block to be processed at the decomposition level to be processed, the coefficients being stored in the external memory 383. When it is determined in step S217 that all of the coefficients of the decomposition level to be processed (i.e., the coefficients of the line block to be processed), the coefficients being stored in the external memory 383, have been processed, the third horizontal analysis filter processing (i.e., in step S112 in FIG. 14) and then the process proceeds to step S113.

A detailed example of a flow of the third vertical analysis filter encoding processing executed in step S117 in FIG. 14 will now be described with reference to a flowchart shown in FIG. 20. The contents of the third vertical analysis filter encoding processing are basically the same as those of the first vertical analysis filter encoding processing. In the third vertical analysis filter encoding processing, however, LL component coefficients generated as a result of the analysis are encoded for output, in the same manner as coefficients of other components.

Figure 20:
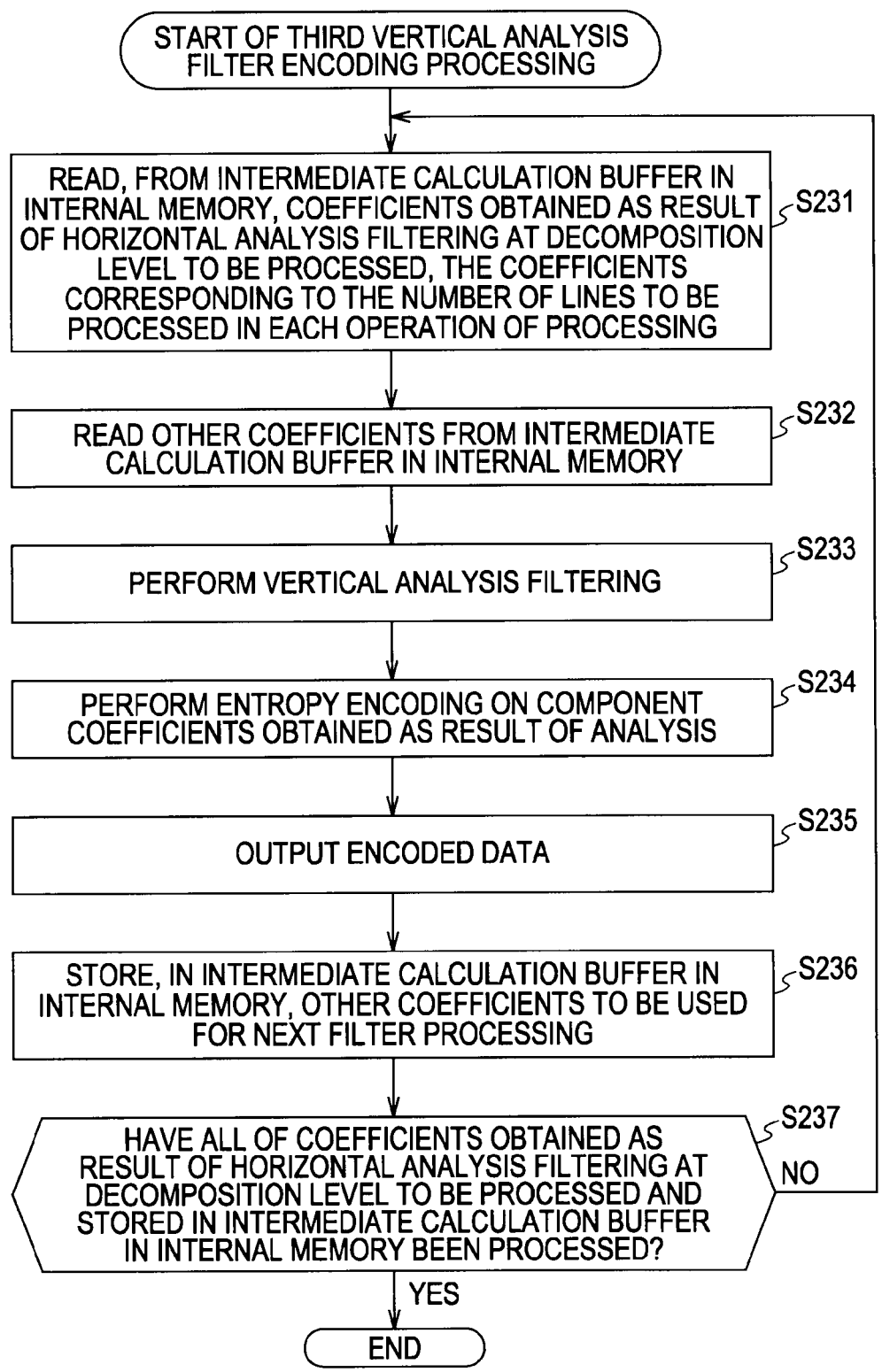
FIG. 20 is a flowchart illustrating an example of a flow of third vertical analysis filter encoding processing.

Thus, the wavelet transform section 312 performs vertical analysis filtering as in the first vertical analysis filter encoding processing, by performing processing in steps S231 to S233 in FIG. 20 in the same manner as the processing in steps S151 to S153 in FIG. 16. In step S234, the entropy encoding section 326 performs entropy encoding on the component coefficients obtained as a result of the analysis. That is, the entropy encoding section 326 encodes all vertical analysis filtering results including the LL-component coefficients. In step S235, the output controller 327 causes the encoded data (including the encoded data corresponding to the LL component coefficients) generated in step S234 to be output, as the encoded codestream 353, to the outside of the processor 301 via the output buffer 328. In step S236, the intermediate calculation buffer controller 324 causes other coefficients used for next filter processing to be stored in the intermediate calculation buffer 325 in the internal memory 311, as in the case in step S157 shown in FIG. 16.

In step S237, the wavelet transform section 312 determines whether or not all of the coefficients obtained as a result of the horizontal analysis filtering at the decomposition level to be processed and stored in the intermediate calculation buffer 325 in the internal memory 311 have been processed, as in the case in step S158 shown in FIG. 16. Upon determining that not all of the coefficients have been processed, the process returns to step S231 and the wavelet transform section 312 repeats the subsequent processing. That is, the wavelet transform section 312 repeatedly executes the processing in steps S231 to S237 on the coefficients of the decomposition level to be processed, the coefficients corresponding to a predetermined amount (e.g., six lines) and being stored in the intermediate calculation buffer 325. It is, therefore, desired that the processing in steps S231 to S237 be performed as soon as the horizontal-analysis-processing results corresponding to the number of lines to be processed in each operation of the vertical analysis filtering processing are stored in the intermediate calculation buffer 325, in order to further reduce the capacity of the intermediate calculation buffer 325 and to further reduce the amount of encoding processing time. When it is determined in step S237 that all of the coefficients obtained as a result of the horizontal analysis filtering at the decomposition level to be processed and stored in the intermediate calculation buffer 325 in the internal memory 311 have been processed, the third vertical analysis filter encoding processing (i.e., in step S117 in FIG. 14) ends, and thus the encoding processing ends.

Through the storage of the coefficients of the first intended decomposition level in the external memory 383, as described above, the filter processing recursively performed at each decomposition level is divided into two stages, i.e., stages 1 and 2. With this arrangement, the intermediate calculation buffer 325 can be used in two separate times, i.e., in stages 1 and 2, and the coefficients corresponding to an amount that is greater than the actual storage capacity of the intermediate calculation buffer 325 can be stored in the intermediate calculation buffer 325. That is, the storage capacity of the intermediate calculation buffer 325 is used in a time-divided manner to thereby make it possible to virtually increase the storage capacity. Thus, it is possible to enhance the efficiency of using the intermediate calculation buffer 325.

The first intended decomposition level may be any hierarchical decomposition level that is higher than the second intended decomposition level, which is the last decomposition level of the wavelet transform processing. It is, however, desired that setting be performed so as to minimize the storage capacity of the intermediate calculation buffer 325 (in the internal memory 311), i.e., so as to minimize a larger one of the capacity used in stage 1 and the capacity used in stage 2.

As described above with reference to FIG. 12, the number of stored coefficients is reduced by half each time the decomposition level decreases by one level. It is, therefore, desired to set the first intended decomposition level to decomposition level 1. For example, in the examples of equations (6) and (7), since the memory capacity used in stage 1 is 98 Kbytes and the memory capacity used in stage 2 is 86 Kbytes, the storage capacity of the intermediate calculation buffer 325 may be 98 Kbytes. For decomposition level 2, the memory capacity used in stage 2 is reduced. However, the memory capacity used in stage 1 is increased and thus the storage capacity used by the intermediate calculation buffer 325 (the internal memory 311) increases. In the examples of equations (6) and (7), even if the available free space of the internal memory 311 is 128 Kbytes, it is possible to appropriately deal with the processing.

For example, multiple decomposition levels may also be set as the first intended decomposition level. For example, in the recursively repeated filter processing, the LL component coefficients may be stored in the external memory 383 multiple times. In this case, however, although there is the possibility of reducing the capacity of the intermediate calculation buffer 325, the number of accesses to the external memory 383 increases and thus the amount of processing time increases. The location in which the LL component coefficients are to be stored may also be switched during the vertical analysis filtering at a certain decomposition level. In such a case, however, although the capacity used in stage 1 and the capacity used in stage 2 can be more evenly allocated, control for the switching is complicated and the load of the encoding processing can increase. There is also a possibility that the amount of encoding processing time increases in proportion to an increase in the amount of unwanted waiting time. In contrast, as described above, when the location in which the LL component coefficients are to be stored is switched for each operation of the filter processing (i.e., for each decomposition level), that is, when the LL component coefficients of the first intended decomposition level are saved in the external memory 383, it is possible to easily control the switching.

3. Third Embodiment

First Configuration of Memory Bank

Since the internal bus in the processor 301 and the external bus have different transfer rates (i.e., the external bus has a lower transfer rate), it is desired that transfer of the coefficients to the external memory 383 (or transfer of the coefficients from the external memory 383) be performed via the input/output buffer 382. In this case, the memory bank configuration for the area included in the input/output buffer 382 and used for writing coefficients to the external memory 383 may have any configuration, and thus may have a one-bank configuration or a two-bank configuration.

Figure 21A:
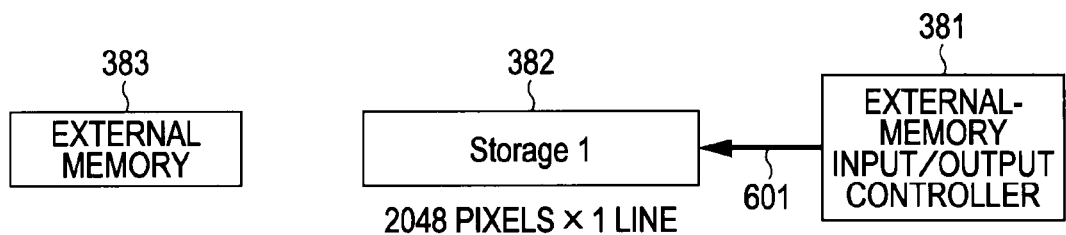
FIGS. 21A, 21B, and 21C are diagrams illustrating a process in which information is written to an external memory when an input/output buffer used for writing information to the external memory has a one-bank configuration.
Figure 21B:
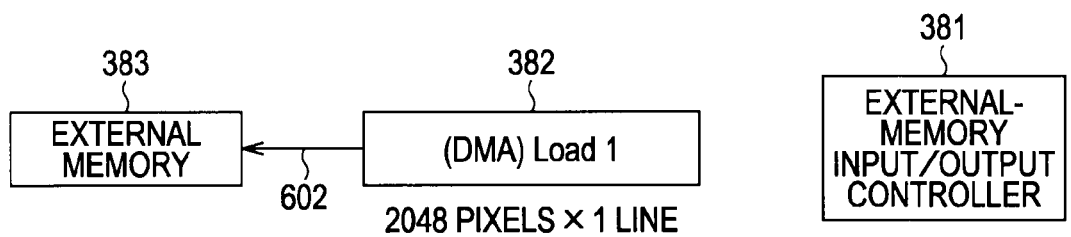
Figure 21C:
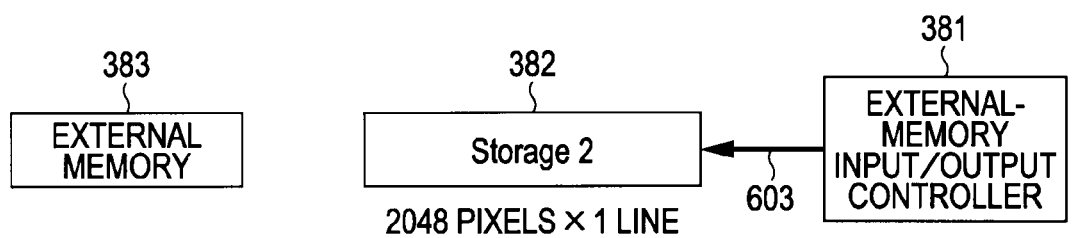

When a one-bank configuration is used as the memory-bank configuration, the memory controller manages the entire area as one area. Thus, control is easy, but in general, data cannot be simultaneously read and written. That is, as indicated by arrow 601 in FIG. 21A, coefficients from the external-memory input/output controller 381 are first stored in the input/output buffer 382 (Storage 1). Upon completion of the storage, the coefficients are read from the input/output buffer 382 (DMA [direct memory access] Load 1) to the external memory 383, as indicated by arrow 602 in FIG. 21B. Upon completion of the reading, new coefficients from the external-memory input/output controller 381 are stored in the input/output buffer 382 (Storage 2), as indicated by arrow 603 in FIG. 21C. As described above, in general, the input/output buffer 382 cannot perform coefficient inputting and outputting in parallel.

Figure 22A:
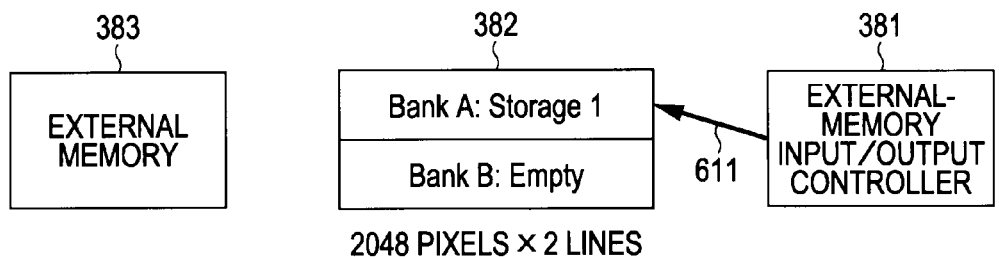
FIGS. 22A, 22B, and 22C are diagrams illustrating a process in which information is written to the external memory when the input/output buffer used for writing information to the external memory has a two-bank configuration.
Figure 22B:
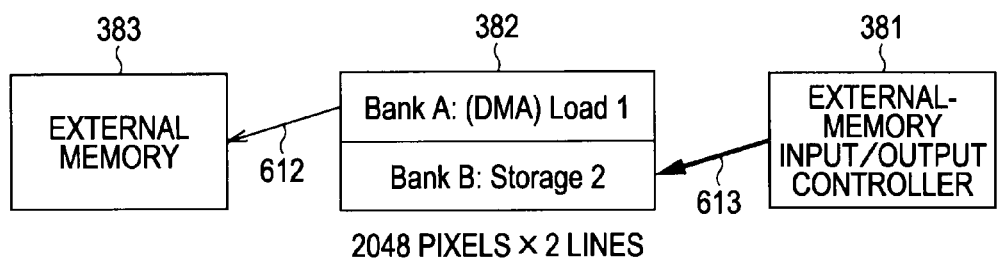
Figure 22C:
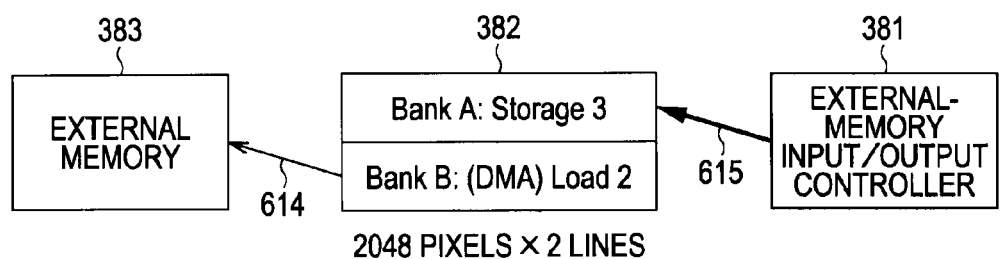

In contrast, when a two-bank configuration is used as the memory-bank configuration, the memory controller manages the entire area as two areas and thus can simultaneously perform data reading and writing. For example, coefficients from the external-memory input/output controller 381 are stored in bank A (Storage 1) in the input/output buffer 382, as indicated by arrow 611 in FIG. 22A. At this point in time, bank B is empty. Upon completion of the storage, the coefficients are read from bank A in the input/output buffer 382 ((DMA) Load 1) to the external memory 383, as indicated by arrow 612 in FIG. 22B. For example, in parallel with the reading processing, coefficients from the external-memory input/output controller 381 are stored in bank B (Storage 2) in the input/output buffer 382, as indicated by arrow 613 in FIG. 22B. Upon completion of the storage and the transfer, the coefficients are read from bank B in the input/output buffer 382 ((DMA) Load 2) to the external memory 383, as indicated by arrow 614 in FIG. 22C. In parallel with the reading processing, coefficients from the external-memory input/output controller 381 are stored in bank A (Storage 3) in the input/output buffer 382, as indicated by arrow 615 in FIG. 22C. That is, it is possible to perform coefficient inputting and outputting in parallel. Thus, as shown in FIG. 23A, when the one-bank configuration is used as the memory bank configuration for the area used for writing coefficients to the external memory 383, the wavelet transform (DWT 1, DWT 2, DWT 3, and DWT 4) and the storage (Storage 1, Storage 2, Storage 3, and Storage 4) of the coefficients into the input/output buffer 382 cannot generally be performed in parallel with the reading (Load 1, Load 2, Load 3, and Load 4) of coefficients from the input/output buffer 382 to the external memory 383. Consequently, the amount of processing time increases.

Figure 23B:
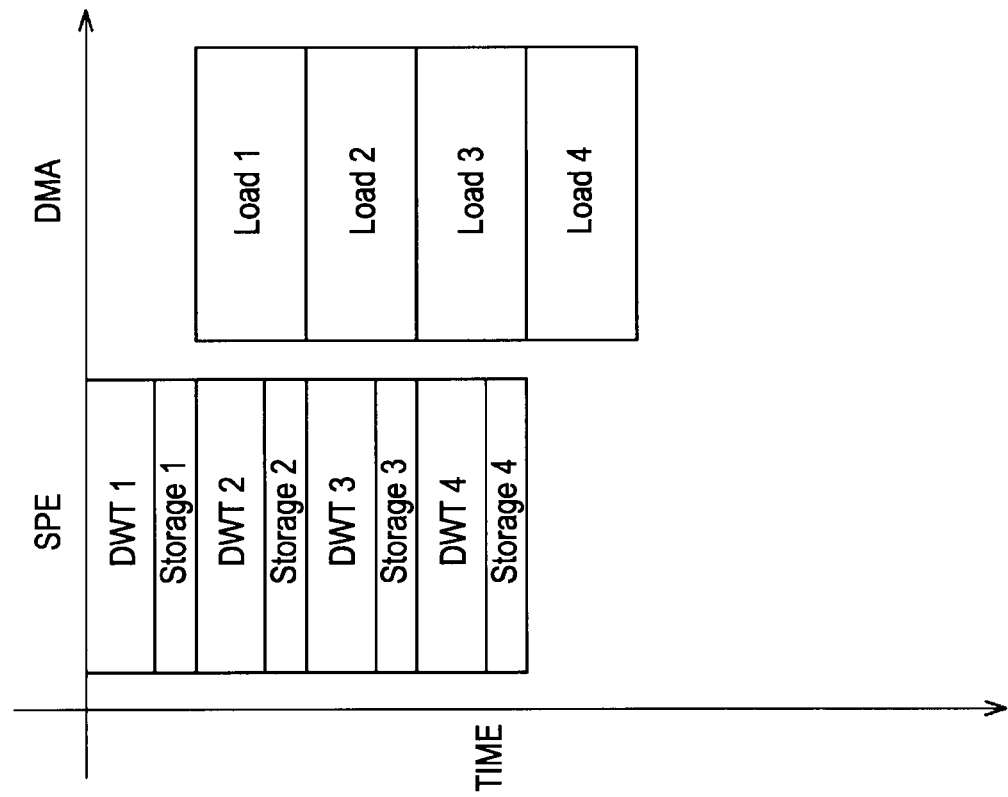
FIGS. 23A and 23B are diagrams showing examples of flows of processing of the different bank configurations of the input/output buffer used for writing information to the external memory.
Figure 23A:
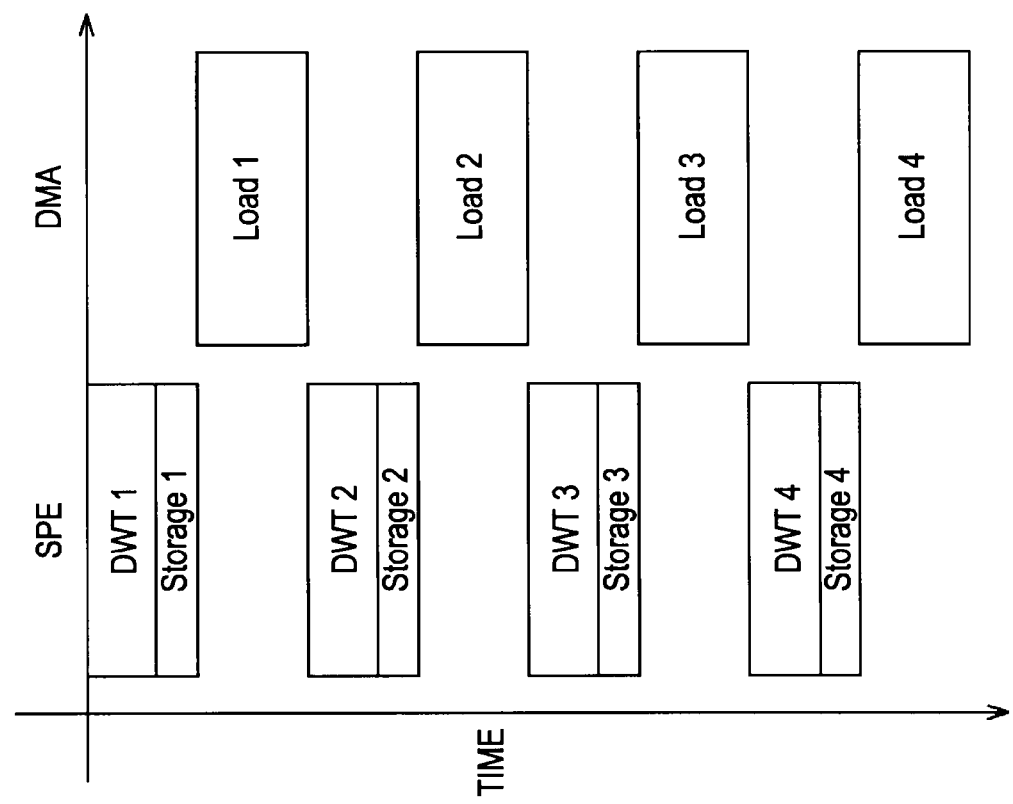

In contrast, as shown in FIG. 23B, when a two-bank configuration is used as the memory bank configuration for the area used for writing coefficients to the external memory 383, the wavelet transform (DWT 1, DWT 2, DWT 3, and DWT 4) and the storage (Storage 1, Storage 2, Storage 3, and Storage 4) of coefficients into the input/output buffer 382 can be performed in parallel with the reading (Load 1, Load 2, Load 3, and Load 4) of coefficients from the input/output buffer 382 to the external memory 383. Thus, compared to the case of the one-bank configuration, the use of the two-bank configuration can reduce the amount of unwanted waiting time and can reduce the amount of processing time.

That is, when the two-bank configuration is used as the memory-bank configuration for the area used for writing coefficients to the external memory 383, the encoder shown in FIG. 3 can enhance the efficiency of using the hardware resources. Needless to say, the number of banks is arbitrary and may be three or more.

[Second Configuration of Memory Bank]

The memory bank configuration of the area included in the input/output buffer 382 and used for reading coefficients from the external memory 383 may also have any configuration, and thus may have a one-bank configuration or a two-bank configuration.

Figure 24A:
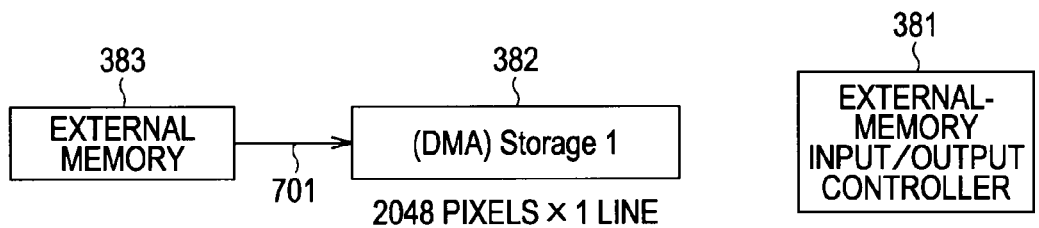
FIGS. 24A, 24B, and 24C are diagrams illustrating a process in which information is read from the external memory when the input/output buffer used for reading information from the external memory has a one-bank configuration.
Figure 24B:
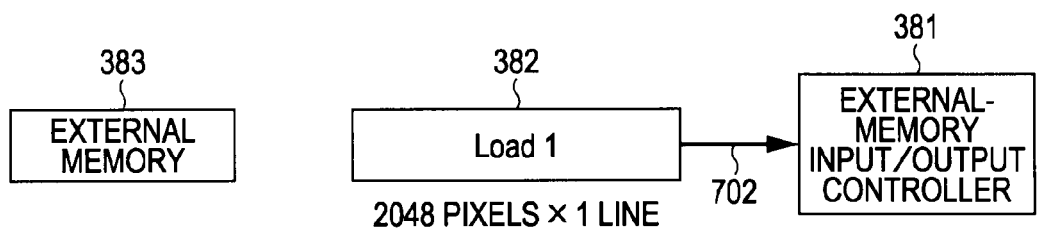
Figure 24C:
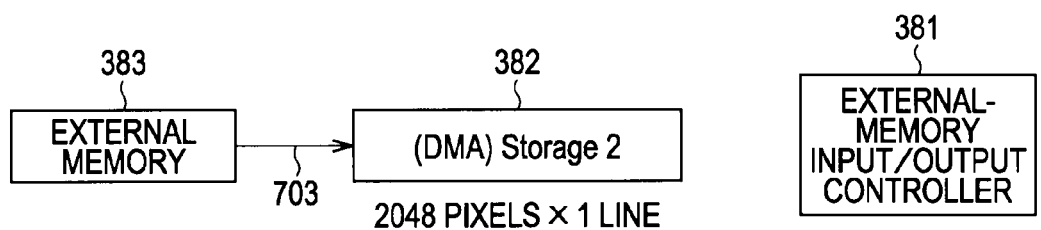

When a one-bank configuration is used as the memory-bank configuration, coefficients from the external memory 383 are first stored in the input/output buffer 382 ((DMA) Storage 1), as indicated by arrow 701 in FIG. 24A. Upon completion of the storage, the coefficients are read from the input/output buffer 382 (Load 1) to the external-memory input/output controller 381, as indicated by arrow 702 in FIG. 24B. Upon completion of the reading, new coefficients from the external memory 383 are stored in the input/output buffer 382 ((DMA) Storage 2), as indicated by arrow 703 in FIG.

24C. As described above, in general, the input/output buffer 382 cannot perform coefficient inputting and outputting in parallel.

Figure 25A:
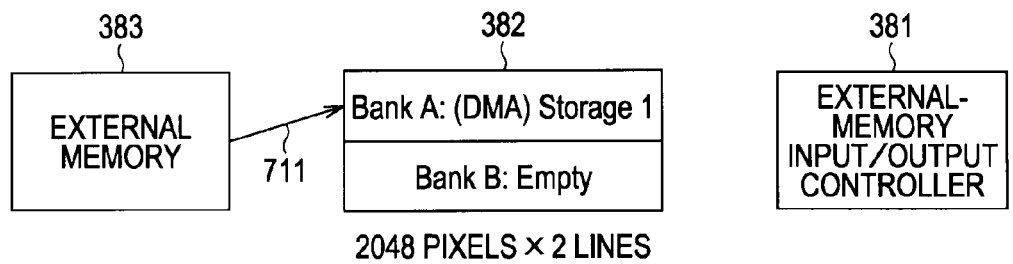
Figure 25B:
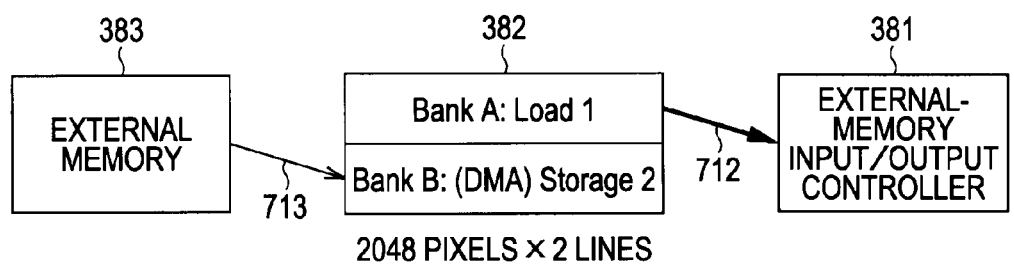
Figure 25C:
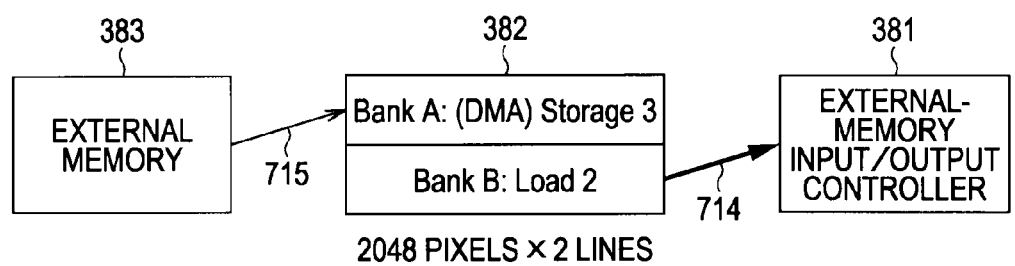

In contrast, when a two-bank configuration is used as the memory-bank configuration, the memory controller manages the entire area as two areas and thus can simultaneously perform data reading and writing. For example, coefficients from the external memory 383 are stored in bank A ((DMA) Storage 1) in the input/output buffer 382, as indicated by arrow 711 in FIG. 25A. At this point in time, bank B is empty. Upon completion of the storage, the coefficients are read from the bank A in the input/output buffer 382 (Load 1) to the external-memory input/output controller 381, as indicated by arrow 712 in FIG. 25B. In parallel with the reading processing, coefficients from the external memory 383 are stored in bank B ((DMA) Storage 2) in the input/output buffer 382, as indicated by arrow 713 in FIG. 25B. Upon completion of the storage and the reading, the coefficients are transferred from bank B in the input/output buffer 382 (Load 2) to the external-memory input/output controller 381, as indicated by arrow 714 in FIG. 25C. In parallel with the transfer processing, coefficients from the external memory 383 are stored in bank A ((DMA) Storage 3) in the input/output buffer 382, as indicated by arrow 715 in FIG. 25C. As described above, the input/output buffer 382 can perform coefficient inputting and outputting in parallel.

Figure 26B:
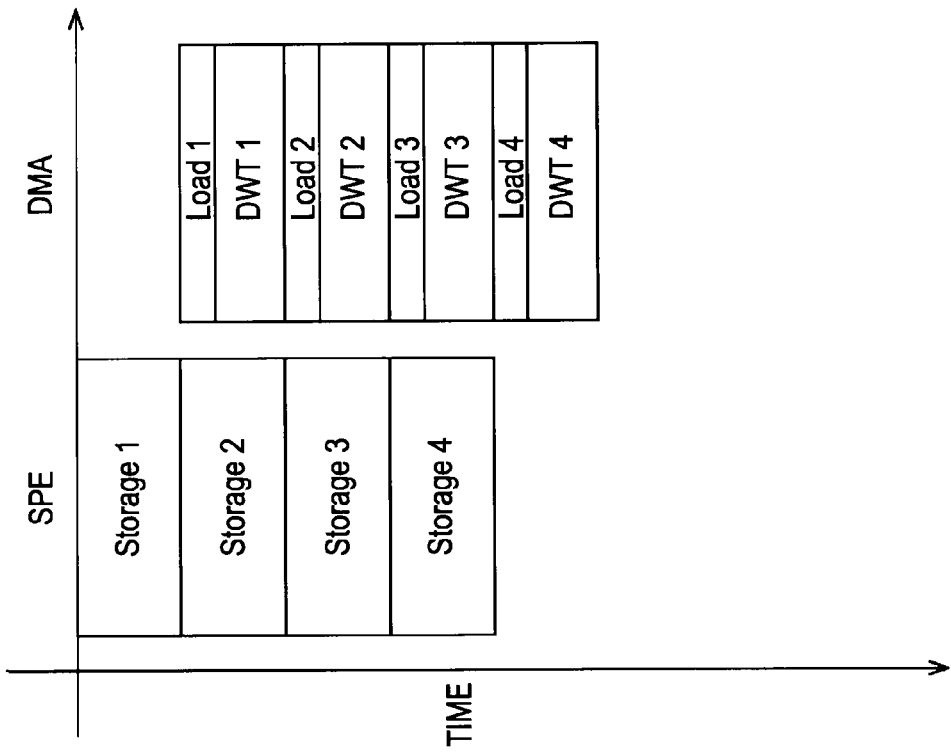
FIGS. 26A and 26B are diagrams showing examples of flows of processing of the different bank configurations of the input/output buffer used for reading information from the external memory.
Figure 26A:
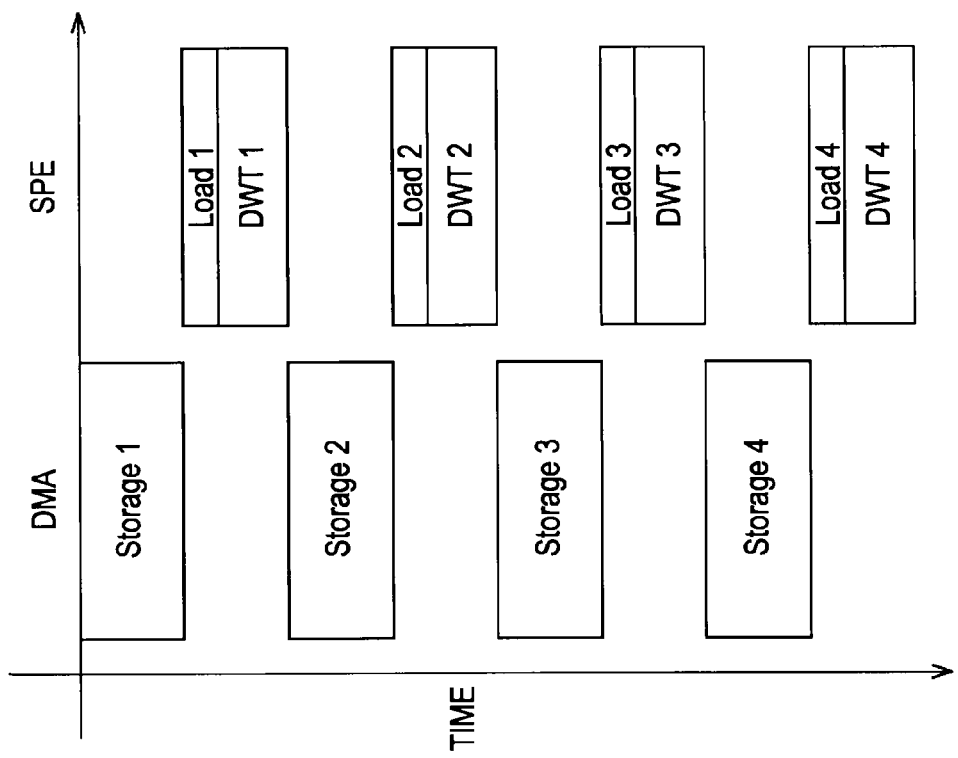

Thus, when the one-bank configuration is used as the memory bank configuration for the area used for reading coefficients from the external memory 383, the storage (Storage 1, Storage 2, Storage 3, and Storage 4) of coefficients from the external memory 383 into the input/output buffer 382 cannot generally be performed in parallel with the reading (Load 1, Load 2, Load 3, and Load 4) of coefficients from the input/output buffer 382 to the external-memory input/output controller 381 and the wavelet transform (DWT 1, DWT 2, DWT 3, and DWT 4), as shown in FIG. 26A. Consequently, the amount of processing time increases.

In contrast, when the two-bank configuration is used as the memory bank configuration for the area used for reading coefficients from the external memory 383, the storage (Storage 1, Storage 2, Storage 3, and Storage 4) of coefficients from the external memory 383 into the input/output buffer 382 can be performed in parallel with the reading (Load 1, Load 2, Load 3, and Load 4) of coefficients from the input/output buffer 382 to the external-memory input/output controller 381 and the wavelet transform (DWT 1, DWT 2, DWT 3, and DWT 4), as shown in FIG. 26B. Thus, compared to the case of the one-bank configuration, the use of the two-bank configuration can reduce the amount of unwanted waiting time and can reduce the amount of processing time. That is, when the two-bank configuration is used as the memory-bank configuration for the area used for reading coefficients from the external memory 383, the encoder shown in FIG. 3 can enhance the efficiency of using the hardware resources. Needless to say, the number of banks is arbitrary and may be three or more.

The encoder shown in FIG. 3 may also be realized by hardware. In such a case, it is also possible to realize an encoder that can use both the internal memory (the intermediate calculation buffer) and the external memory, similarly to the above-described encoder realized by the software program. That is, it is possible to realize an encoder that can enhance the efficiency of using the hardware resources.

4. Fourth Embodiment

Configuration Example of Decoder

Figure 27:
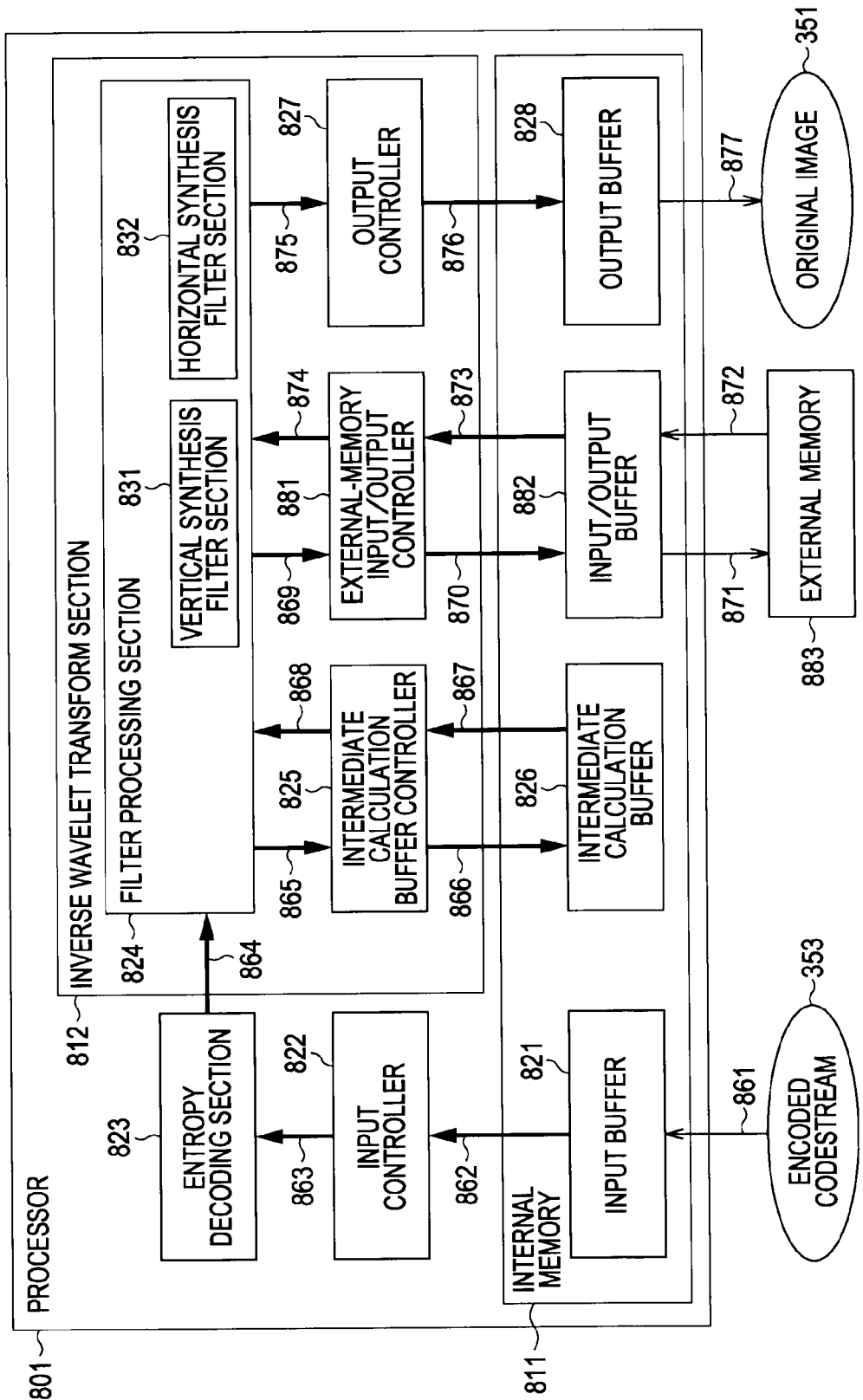
FIG. 27 is a block diagram showing a major configuration example of a decoder according to an embodiment of the present invention.

FIG. 27 is a block diagram showing a configuration example of a decoder (a decoding device) realized by the sub CPU core 242 shown in FIG. 2. The decoder shown in FIG. 27 performs decoding processing corresponding to the encoding processing performed by the encoder described above with reference to FIG. 3. Although details are not given, the decoder is also configured to perform inverse wavelet transform processing in decoding processing by systematically using an external memory, as in the case of the above-described encoder, so as to enhance the efficiency of using an intermediate calculation buffer.

The decoder shown in FIG. 27 is realized through the use of the hardware resources of a processor 801 and an external memory 883. The processor 801 is a single computation processing section that operates interpedently from other sections and corresponds to one of the sub CPU core 242 in the microprocessor 201 shown in FIG. 2. That is, the configuration of the processor 801 is analogous to that of the processor 301 shown in FIG. 3. In other words, the sub CPU core 242 that executes a software program for the encoder corresponds to the processor 301 and the sub CPU core 242 that executes a software program for the decoder corresponds to the processor 801.

As shown in FIG. 27, the processor 801 has an internal memory 811. The internal memory 811 serves as a storage area that is similar to the internal memory 311 shown in FIG. 3. That is, the internal memory 811 has a small capacity and allows high-speed data reading and writing, compared to the external memory 883 (i.e., has a smaller capacity and allows higher speed access than the external memory 883). Although the capacity of the internal memory 811 is arbitrary, a description below is given assuming that it is 256 Kbytes. Needless to say, the manufacturing cost of the processor 801 increases according to an increase in the capacity. A description below is also given of an example in which the free space of the internal memory 811, the free space being usable for data storage, is 128 Kbytes, which is half of the entire capacity.

The processor 801 executes a program stored in the internal memory 811 to realize the functions of an input controller 822, an entropy decoding section 823, and an inverse wavelet transform section 812.

The input controller 822 controls inputting and outputting of an input buffer 821 (described below) to control data inputting to the entropy decoding section 823. The entropy decoding section 823 performs entropy decoding on input data supplied from the input controller 822 (i.e., encoded data supplied from the encoder), the entropy decoding corresponding to the entropy encoding performed by the entropy encoding section 326 shown in FIG. 3, and then supplies the resultant coefficients to the inverse wavelet transform section 812.

The inverse wavelet transform section 812 performs inverse wavelet transform on the coefficients, supplied from the entropy decoding section 823, to generate image data having an intended resolution. The inverse wavelet transform is processing in which filter processing for combining coefficients, decomposed into low frequency components and high frequency components by the wavelet transform processing, is performed in both a horizontal direction and a vertical direction. In the inverse wavelet transform processing, such filter processing is recursively repeated. For example, coefficients obtained by the filter processing at a certain decomposition level are re-subjected, as horizontal and vertical low frequency components (LL components) at a decomposition level that is one level higher than the certain decomposition level, to the filter processing in conjunction with other components at the decomposition level. Such filter processing is repeated until image data having an intended resolution is obtained.

The wavelet transform and the inverse wavelet transform are scalable coefficient transforms, and the number of hierarchical decomposition levels in the wavelet transform processing and the number of hierarchical decomposition levels in the inverse wavelet transform do not necessarily have to match each other. That is, the resolution (the intended resolution) of decoded image data may be lower than the resolution of pre-encoding baseband image data. However, the number of hierarchical decomposition levels in the inverse wavelet transform generally needs to be predetermined in order to systematically use the external memory 883. The number of hierarchical decomposition levels may be predetermined by the decoder or may be specified by the encoder. For convenience of description, a description below is given assuming that the resolution (the intended resolution) of decoded image data and the resolution of pre-encoding baseband image data are equal to each other (i.e., the number of hierarchical decomposition levels in the wavelet transform processing and the number of hierarchical decomposition levels in the inverse wavelet transform processing match each other).

The inverse wavelet transform section 812 has a filter processing section 824 for performing filter processing as described above. The filter processing section 824 has a vertical synthesis filter section 831 and a horizontal synthesis filter section 832. The vertical synthesis filter section 831 performs vertical synthesis filter processing for combining coefficients of low frequency components and high frequency components in the screen vertical direction. The horizontal synthesis filter section 832 performs horizontal synthesis filter processing for combining coefficients of low frequency components and high frequency components in the screen horizontal direction. The vertical synthesis filter processing is performed on input data supplied from, for example, the entropy decoding section 823, and the horizontal synthesis filter processing is performed on the results of the vertical synthesis filter processing. As a result of the vertical synthesis filter processing and the horizontal synthesis filter processing, the coefficients are combined in the screen vertical and horizontal directions, so that coefficients of four types of components, i.e., LL components, HL components, LH components, and HH components, are combined to generate coefficients having one type of components (or baseband image data), as shown in FIG. 30B.

As described above, when the encoder has executed the wavelet transform processing up to decomposition level 3, the synthesis filter processing (the inverse wavelet transform) is executed in the order of decomposition level 3, decomposition level 2, and decomposition level 1. The above-described two types of filter processing are performed in the order of the vertical synthesis filtering and the horizontal synthesis filtering. Alternatively, the filter processing may also be performed in the order of the horizontal synthesis filtering and the vertical synthesis filtering.

The inverse wavelet transform section 812 has an intermediate calculation buffer controller 825, an external-memory input/output controller 881, and an output controller 827. The intermediate calculation buffer controller 825 controls inputting and outputting of the coefficients generated as a result of the synthesis filter processing performed by the filter processing section 824 and the intermediate coefficients generated during the filter processing. The intermediate calculation buffer controller 825 controls storage of data that are reused in subsequent synthesis filter processing. The external-memory input/output controller 881 controls storage of results of the synthesis filter processing at a preset decomposition level. The output controller 827 controls outputting of baseband image data (an original image 351) from the processor 801, the baseband image data resulting from the synthesis filter processing performed by the filter processing section 824.

The internal memory 811 temporarily stores encoded data to be input to the entropy decoding section 823, the coefficient data generated as a result of the filter processing performed by the filter processing section 824, the intermediate coefficient data generated during the filter processing, and so on. In order to store those pieces of data, the internal memory 811 has the input buffer 821, an intermediate calculation buffer 826, an input/output buffer 882, and an output buffer 828. The input buffer 821 stores encoded data (supplied from the encoder) before it is input to the entropy decoding section 823. The input controller 822 controls reading of the input buffer 821. For each decomposition level, the intermediate calculation buffer 826 independently stores, of the coefficient data obtained as a result of the synthesis filter processing and the intermediate coefficient data obtained during the filter processing, coefficient data used for subsequent synthesis filter processing. That is, the intermediate calculation buffer 826 stores, for each decomposition level, coefficients obtained during the process of computation in the synthesis filter processing or LL-component coefficients obtained as a result of the computation in the synthesis filter processing at each decomposition level that is lower than the first intended decomposition level. The stored coefficients are read as appropriate and are supplied for the subsequent filter processing. The intermediate calculation buffer controller 825 controls the inputting/outputting of data to/from the intermediate calculation buffer 826. The intermediate calculation buffer 826 has a small capacity and allows high-speed access, compared to the external memory 883. Of the coefficients obtained as a result of the synthesis filter processing and used for the next synthesis filter processing, the input/output buffer 882 stores coefficient data to be stored in the external memory 883. The external-memory input/output controller 881 controls the inputting/outputting of data to/from the input/output buffer 882. The output buffer 828 stores baseband image data generated in the synthesis filter processing performed by the filter processing section 824. The output controller 827 controls inputting/outputting of data to/from the output buffer 828.

As shown in FIG. 28, the horizontal size for coefficients stored in the internal memory 811 (the intermediate calculation buffer 826) are increased by a factor of 2 in the order of decomposition level 3, decomposition level 2, and decomposition level 1. That is, the amount of coefficients stored for each hierarchical decomposition level is the same as that in the case of the wavelet transform shown in FIG. 12, although the progress direction of the filter processing is opposite (i.e., in the case of the synthesis filter processing, the processing progresses from a lower level to a higher level).

The external memory 883 is a storage area provided independently from the processor 801 and corresponds to, for example, the XDR-RAM 203 shown in FIG. 2. That is, the external memory 883 corresponds to the external memory 383 shown in FIG. 3. For example, when both the encoder and the decoder are realized in the system shown in FIG. 2, i.e., for example, when the encoder is realized by the sub CPU core 242-1 shown in FIG. 2 and the decoder is realized by the sub CPU core 242-2, the encoder and the decoder may use the same external memory. The external memory 883 has characteristics in that, compared to the internal memory 811, the circuit scale is small to make it easy to increase the packaging density, the power consumption is low, the operation speed is low, and the reading/writing procedure is complicated. That is, compared to the internal memory 811, the external memory 883 can store a large amount of data, although it operates at low speed.

[Description of Operation]

Operation of the decoder shown in FIG. 27 will now be described. For example, an encoded codestream 353 stored in the external memory 883 (such as the XDR-RAM 203) or the HDD 205 is read for each operation of the inverse wavelet transform processing, is supplied to the input buffer 821 through the shared bus 245, as indicated by arrow 861, and is temporarily stored in the input buffer 821. When encoded data having a predetermined amount (e.g., an amount corresponding to an amount to be processed in each operation of the inverse wavelet transform processing) is stored in the input buffer 821, the input controller 822 reads the stored encoded data, as indicated by arrow 862, and supplies the read encoded data to the entropy decoding section 823, as indicated by arrow 863. The entropy decoding section 823 decodes the supplied encoded data, and supplies the resultant coefficients of the LL, HL, LH, and HH components to the filter processing section 824 in the inverse wavelet transform section 812, as indicated by arrow 864.

The vertical synthesis filter section 831 in the filter processing section 824 performs vertical synthesis filtering on the input coefficients. The intermediate calculation buffer controller 825 obtains results of the vertical synthesis filtering (i.e., coefficients resulting from combination of vertical high frequency components and vertical low frequency components), as appropriate, as indicated by arrow 865, and causes the results to be stored in the intermediate calculation buffer 826, as indicated by arrow 866. When coefficients of a predetermined number of lines (e.g., six lines) are stored in the intermediate calculation buffer 826, the intermediate calculation buffer controller 825 reads the coefficients, as indicated by arrow 867, and supplies the read coefficients to the filter processing section 824, as indicated by arrow 868. The horizontal synthesis filter section 832 performs horizontal synthesis filtering on the supplied coefficients.

In practice, the vertical synthesis filtering and the horizontal synthesis filtering are performed using lifting computation. For example, as shown in FIG. 29, for a 9/7 filter, buffering for six lines is typically required and line inputting is performed from the screen top to the bottom. Thus, an input for line 1 is the most recent input. In case 1 shown at the left side in FIG. 29, vertical coefficients (○ indicates a low frequency and □ indicates a high frequency) for six lines are arranged from the top and lifting computation is performed from the screen left to the right. Execution of steps 1 to 4 yields coefficients for line 5. Thick-line circles and thick-line squares in FIG. 29 represent actual coefficients within the six lines. Coefficients prior to the coefficients within the six lines are buffered for intermediate calculation and are used for a next computation.

Next, filtering is performed while the lines are shifted in the vertical direction. However, since inputting of one line does not allow for lifting computation, two lines are shifted in the present embodiment. A result of the shifting corresponds to case 2. As in case 1, lifting computation is performed up to Step 3 from the left to the right in the time direction. Step 4 that follows Step 3 uses a coefficient indicated by □ in line 6 and, as the coefficient, the coefficient generated in line 4 in case 1 may be directly used.

In the above-described operation, outputs of steps 4 and 3 in case 2 are used as low frequency components (LL) at a next level. This processing is described with reference to FIG. 28. As shown, for example, outputs of LL components of lines 6 and 5 at decomposition level 3 are input to line 1 at decomposition level 2. Similarly, as shown, outputs of LL components of lines 6 and 5 at decomposition level 2 are input to line 1 at decomposition level 1. That is, the vertical synthesis filter section 831 executes vertical synthesis filtering as soon as a sample of N lines to be used for executing filtering in the vertical direction is prepared. The horizontal synthesis filter section 832 also executes horizontal synthesis filtering as soon as a sample of M columns to be used for executing filtering in the horizontal direction is prepared.

The filter processing section 824 recursively repeats the synthesis filter processing until an intended decomposition level is reached. Thus, the intermediate calculation buffer controller 825 obtains the determined coefficients from the filter processing section 824, as indicated by arrow 865, and causes the obtained coefficients to be stored in the intermediate calculation buffer 826, as indicated by arrow 866. Similarly, the intermediate calculation buffer controller 825 causes some of the intermediate coefficients, generated during the lifting computation in the synthesis filtering, to be stored in the intermediate calculation buffer 826. The intermediate calculation buffer controller 825 reads the coefficients, stored in the intermediate calculation buffer 826, as appropriate, as indicated by arrow 867, and supplies the read coefficients to the filter processing section 824, as indicated by arrow 868, in order for the filter processing section 824 to perform synthesis filter processing at a next (a one-level higher) decomposition level. The filter processing section 824 updates the decomposition level to be processed to a level that is one level higher. The filter processing section 824 then obtains, as LL components, the coefficients read from the intermediate calculation buffer 826 via the intermediate calculation buffer controller 825, obtains coefficients of other components from the entropy decoding section 823, and performs vertical synthesis filtering and horizontal synthesis filtering on the obtained coefficients.

The filter processing section 824 recursively repeats the filter processing on the LL component coefficients of each decomposition level, as described above, until a first intended decomposition level is reached. The coefficients (which are subsequently used as LL components) of the first intended decomposition level are stored in the external memory 883, not the intermediate calculation buffer 826. When the coefficients of the first intended decomposition level is generated, the external-memory input/output controller 881 obtains the coefficients from the filter processing section 824, as indicated by arrow 869, and causes the obtained coefficients to be stored in the external memory 883 via the input/output buffer 882, as indicated by arrows 870 and 871.

When the level to be subjected to the filter processing reaches the first intended decomposition level, the external memory input/output controller 881 reads the coefficients, stored in the external memory 883, via the input/output buffer 882, as indicated by arrows 872 and 873, and supplies the read coefficients to the filter processing section 824, as indicated by arrow 874. The read coefficients are used as LL components. The vertical synthesis filter section 831 performs vertical synthesis filtering by using the LL-component coefficients read from the external memory 883 and other component coefficients and computation intermediate coefficients of the first interned decomposition level, the other components and the computation intermediate coefficients being supplied from the entropy decoding section 823. The horizontal synthesis filtering is performed in the same manner as for the previous hierarchical level. Results of the synthesis filter processing at the first intended decomposition level are stored in the intermediate calculation buffer 826. Thereafter, as described above, the filter processing section 824 recursively repeats the filter processing on the coefficients of each decomposition level, until the decomposition level reaches a second intended decomposition level. LL-component coefficients and intermediate coefficients generated by the filter processing are stored in the intermediate calculation buffer 825 under the control of the intermediate calculation buffer controller 826, and are used, as appropriate. The second-intended-decomposition-level coefficients generated as described above, i.e., baseband image data, are received by the output controller 827, as indicated by arrow 875. The output controller 827 outputs, as the original image 351, the obtained coefficients to the outside of the processor 801 via the output buffer 828, as indicated by arrows 876 and 877.

If all of the coefficients generated by the inverse wavelet transform processing for each decomposition level are stored in the intermediate calculation buffer 826, as in the related art, the amount of data of the coefficients becomes larger than the capacity of the intermediate calculation buffer 826, as in the case of the encoder. That is, in the method of the related art, the capacity of the intermediate calculation buffer 826 is not sufficient. In such a case, coefficients corresponding to the shortage in the free space generally need to be stored in the external memory 883. Thus, if storage of the coefficients is performed without an appropriate plan, the number of accesses to the external memory 883 increases and the amount of delay time may also increase excessively. For example, when the large-capacity external memory 883 is used simply by priority, the processing speed may decrease excessively without use of the intermediate calculation buffer 826. Conversely, when it is assumed that the intermediate calculation buffer 826 that allows high-speed writing is used simply by priority, the external memory 883 is used at a lower level in the decomposition level hierarchy. Thus, there are possibilities that the number of accesses increases and thus the processing speed decreases excessively.

Accordingly, in the decoder (shown in FIG. 27) according to the embodiment of the present invention, a certain hierarchical decomposition level (the first intended decomposition level) is preset and only the LL component coefficients of the preset first intended decomposition level are stored in the external memory 883. For example, when the first intended decomposition level is assumed to be decomposition level 1, synthesis filter processing is repeated until decomposition level 1 is reached, as shown in FIG. 30A. Generated coefficients of decomposition level 1 are stored in the external memory 883. Thereafter, the coefficients are read as LL components (1LL) coefficients of decomposition level 1 and are used for synthesis filter processing for decomposition level 1. That is, coefficients up to a decomposition level that is one level lower than the first intended decomposition level are stored in the intermediate calculation buffer 826 and the LL component coefficients of the first intended decomposition level are temporarily saved in the external memory 883. When the filter processing at the decomposition level that is one level lower than the first intended decomposition level is completed, the upper-hierarchical-level coefficients stored in the intermediate calculation buffer 826 become unnecessary. Accordingly, the first-intended-decomposition-level coefficients stored in the external memory 883 are used to start filter processing at the subsequent hierarchical level. With this arrangement, since free space is created in the intermediate calculation buffer 826, coefficients that are subsequently generated can be stored in the intermediate calculation buffer 826. That is, through the use of the external memory 883, the intermediate calculation buffer 826 is used at two different times.

The wavelet transform before the first intended decomposition level is referred to as "stage 1" and the wavelet transform after the first intended decomposition level is referred to as "stage 2". Since the time of stage 1 and the time of stage 2 are different from each other, the capacity of the intermediate calculation buffer 826 may be 98 Kbytes or more. That is, in the entire wavelet transform processing, the intermediate calculation buffer 826 can store the coefficients having an amount that exceeds the storage capacity of the intermediate calculation buffer 826.

As a result of control as described above, the intermediate calculation buffer 826 that allows high-speed writing is used more to thereby make it possible to minimize the use of the external memory 883. Thus, it is possible to suppress a processing-time increase caused by the use of the external memory 883. That is, the decoder shown in FIG. 27 can more efficiently use the hardware resources and can more easily perform wavelet-transform-based decoding processing at higher speed. As described above, the decoder shown in FIG. 27 can reduce the amount of processing time of the entire decoding processing and also can suppress an increase in cost.

[Description of Flow of Processing]

An example of a flow of decoding processing as described above will now be described with reference to a flowchart shown in FIG. 31. The decoder shown in FIG. 27 executes the decoding processing for the encoded data having a predetermined amount corresponding to a line block in the original image 351.

Upon start of the decoding processing, in step S401, the input controller 822, the entropy decoding section 823, and the inverse wavelet transform section 812 perform first decoding vertical synthesis filter processing for decoding encoded data input to the input buffer 821 and performing vertical synthesis filtering on the resultant coefficients. Details of the first decoding vertical synthesis filter processing are described below. Upon completion of the first decoding vertical synthesis filter processing, in step S402, the inverse wavelet transform section 812 determines whether or not a decomposition level after the processing is the first intended decomposition level. When it is determined that the present decomposition level to be processed is not a level that is one level lower than the first intended decomposition level and no coefficients of the first intended decomposition level are to be generated by the filter processing, the process proceeds to step S403.

In step S403, the inverse wavelet transform section 812 performs first horizontal synthesis filter processing for performing horizontal synthesis filtering on the results of the vertical synthesis filter processing and causing generated coefficients to be stored in the intermediate calculation buffer 826. Details of the first horizontal synthesis filter processing are described below. Upon completion of the first horizontal synthesis filter processing, the process proceeds to step S404.

In step S404, the inverse wavelet transform section 812 updates the decomposition level to be processed to a decomposition level that is higher by one level and inputs, as LL components of the decomposition level to be processed, the coefficients obtained as a result of the synthesis and stored in the intermediate calculation buffer 826 in the internal memory 811. In step S405, the inverse wavelet transform section 812, the entropy decoding section 823, and the input controller 822 decode the encoded data input to the input buffer 821, performs second decoding vertical synthesis filter processing for performing vertical synthesis filtering on the resultant coefficients of HL LH, and HH components at the decomposition level to be processed and the LL components read from the intermediate calculation buffer 826. Details of the second decoding vertical synthesis filter processing are described below.

Upon completion of the processing in step S405, the process returns to step S402. That is, the input controller 822, the entropy decoding section 823, and the inverse wavelet transform section 812 repeatedly execute the processing in steps S402 to S405 until it is determined in step S402 that the decomposition level after the processing is the first intended decomposition level. When it is determined in step S402 that the present decomposition level to be processed is a level that is one level lower than the first intended decomposition level and coefficients of the first intended decomposition level are to be generated by the filter processing, the process proceeds to step S406.

In step S406, the inverse wavelet transform section 812 performs second horizontal synthesis filter processing for performing horizontal synthesis filtering on the results of the vertical synthesis filter processing and causing generated coefficients of the first intended decomposition level to be stored in the external memory 883. Details of the second horizontal synthesis filter processing are described below. Steps S401 to S406 up to this point are executed as processing for stage 1 described above.

The coefficients (LL components) of the first intended decomposition level are stored in the external memory 883, and the second horizontal synthesis filter processing is completed. The process then proceeds to step S411. In step S411, the inverse wavelet transform section 812 updates the decomposition level to be processed to a decomposition level that is higher by one level and inputs, as LL components of the decomposition level to be processed, the coefficients obtained as a result of the synthesis and stored in the external memory 883. In step S412, the inverse wavelet transform section 812, the entropy decoding section 823, and the input controller 822 perform third decoding vertical synthesis filter processing. Details of the third decoding vertical synthesis filter processing are described below.

In step S413, the inverse wavelet transform section 812 determines whether or not a decomposition level after the processing is the second intended decomposition level. When it is determined that the present decomposition level to be processed is not a level that is one level lower than the second intended decomposition level and no coefficients of the second intended decomposition level are to be generated by the filter processing, the process proceeds to step S414.

In step S414, the inverse wavelet transform section 812 performs first horizontal synthesis filter processing on the results of the vertical synthesis filter processing. In step S415, the inverse wavelet transform section 812 updates the decomposition level to be processed to a decomposition level that is higher by one level and inputs, as LL components, the coefficients obtained as a result of the synthesis and stored in the intermediate calculation buffer 826 in the internal memory 811. In step S416, the inverse wavelet transform section 812 performs second decoding vertical synthesis filter processing. Upon completion of the processing in step S416, the process returns to step S413.

When it is determined in step S413 that the decomposition level after the processing reaches the second intended decomposition level, the process proceeds to step S417. In step S417, the inverse wavelet transform section 812 performs third horizontal synthesis filter processing for performing horizontal synthesis filtering on the results of the vertical synthesis filter processing and outputting generated coefficients of the second intended decomposition level. Details of the third horizontal synthesis filter processing are described below. Steps S411 to S417 up to this point are executed as processing for stage 2 described above.

Upon completion of the third horizontal synthesis filer processing in step S417, the decoding processing ends. As described above, the decoding processing is performed in two separate stages, i.e., stages 1 and 2, through the use of the external memory 883. Thus, in the entire decoding processing, the decoder shown in FIG. 27 allows information having an amount that exceeds the actual capacity of the intermediate calculation buffer 826 to be stored therein. Thus, it is possible to enhance the efficiency of using the hardware resources.

A detailed example of a flow of the first decoding vertical synthesis filter processing executed in step S401 in FIG. 31 will now be described with reference to a flowchart shown in FIG. 32.

Upon start of the first decoding vertical synthesis filter processing, in step S431, the input controller 822 inputs encoded data of the component coefficients of the decomposition level to be processed from the input buffer 821 in the internal memory 811, the coefficients corresponding to the number of lines to be processed in each operation of the processing. The input controller 822 then supplies the encoded data to the entropy decoding section 823. In step S432, the entropy decoding section 823 decodes the supplied encoded data.

In step S433, the intermediate calculation buffer controller 825 reads, from the intermediate calculation buffer 826 in the internal memory 311, other coefficients to be used for vertical synthesis filtering. When coefficients to be used for the filter processing are obtained, in step S434, the vertical synthesis filter section 831 performs the vertical synthesis filtering on the coefficients obtained in the processing in steps S432 and S433. In step S435, the intermediate calculation buffer controller 825 causes the coefficients obtained as a result of the vertical synthesis to be stored in the intermediate calculation buffer 826 in the internal memory 811. In step S436, the intermediate calculation buffer controller 825 causes other coefficients to be used for next synthesis filter processing to be stored in the intermediate calculation buffer 826 in the internal memory 811.

In step S437, the inverse wavelet transform section 812 determines whether or not all of the encoded data of the decomposition level to be processed, the encoded data being stored in the input buffer 821 in the internal memory 811, have been processed. Upon determining that not all of the encoded data have been processed, the process returns to step S431 and the inverse wavelet transform section 812 repeats the subsequent processing. That is, the inverse wavelet transform section 812 performs the vertical synthesis filtering for each predetermined amount, by repeatedly executing the processing in steps S431 to S437 on the encoded data of the decomposition level to be processed, the encoded data being stored in the input buffer 821. When it is determined in step S437 that all of the image data (the line block) stored in the input buffer 821 in the internal memory 811 have been processed, the first decoding vertical synthesis filter processing (i.e., in step S401 in FIG. 31) ends and then the process proceeds to step S402.

A detailed example of a flow of the first horizontal synthesis filter processing executed in steps S403 and S414 in FIG. 31 will now be described with reference to a flowchart shown in FIG. 33.

Upon start of the first horizontal synthesis filter processing, in step S451, the intermediate calculation buffer controller 825 reads, from the intermediate calculation buffer 826 in the internal memory 811, the component coefficients obtained as a result of the vertical synthesis filtering at the decomposition level to be processed, the coefficients corresponding to the number of lines (e.g., six lines) to be processed in each operation of the processing. In step S452, the intermediate calculation buffer controller 825 reads, from the intermediate calculation buffer 826 in the internal memory 811, other coefficients to be used for horizontal synthesis filtering. In step S453, the horizontal synthesis filter section 832 performs the horizontal synthesis filtering using the coefficients read in the processing in steps S451 and S452. In step S454, the intermediate calculation buffer controller 825 causes the coefficients obtained as a result of the horizontal synthesis to be stored in the intermediate calculation buffer 826 in the internal memory 811. In step S455, the intermediate calculation buffer controller 825 causes other coefficients to be used for next filter processing to be stored in the intermediate calculation buffer 826 in the internal memory 811.

In step S456, the inverse wavelet transform section 812 determines whether or not all of the coefficients obtained as a result of the vertical synthesis filtering at the decomposition level to be processed and stored in the intermediate calculation buffer 826 in the internal memory 811 have been processed. Upon determining that not all of the coefficients have been processed, the process returns to step S451 and the inverse wavelet transform section 812 repeats the subsequent processing.

That is, the inverse wavelet transform section 812 repeatedly executes the processing in steps S451 to S456 on the coefficients of the decomposition level to be processed, the coefficients having a predetermined amount and being stored in the intermediate calculation buffer 826.

Figure 31:
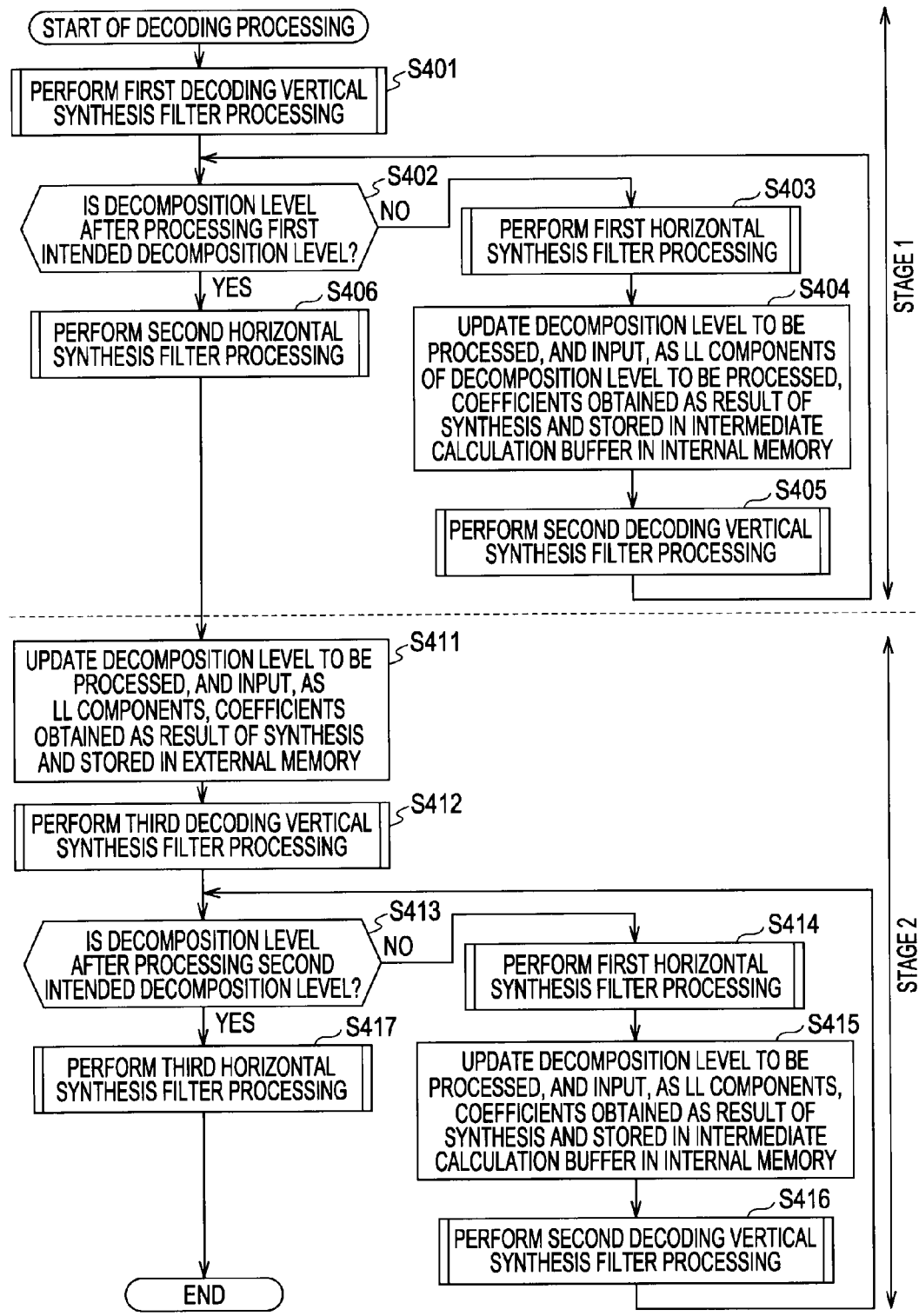
FIG. 31 is a flowchart illustrating an example of a flow of decoding processing.

When it is determined in step S456 that all of the coefficients obtained as a result of the vertical synthesis filtering at the decomposition level to be processed and stored in the intermediate calculation buffer 826 in the internal memory 811 have been processed, the first horizontal synthesis filter processing ends and the process proceeds to the next processing in FIG. 31. In the case of the first horizontal synthesis filter processing executed in step S403 in FIG. 31, the process then proceeds to step S404. In the case of the first horizontal synthesis filter processing executed in step S414 in FIG. 31, the process then proceeds to step S415.

Figure 34:
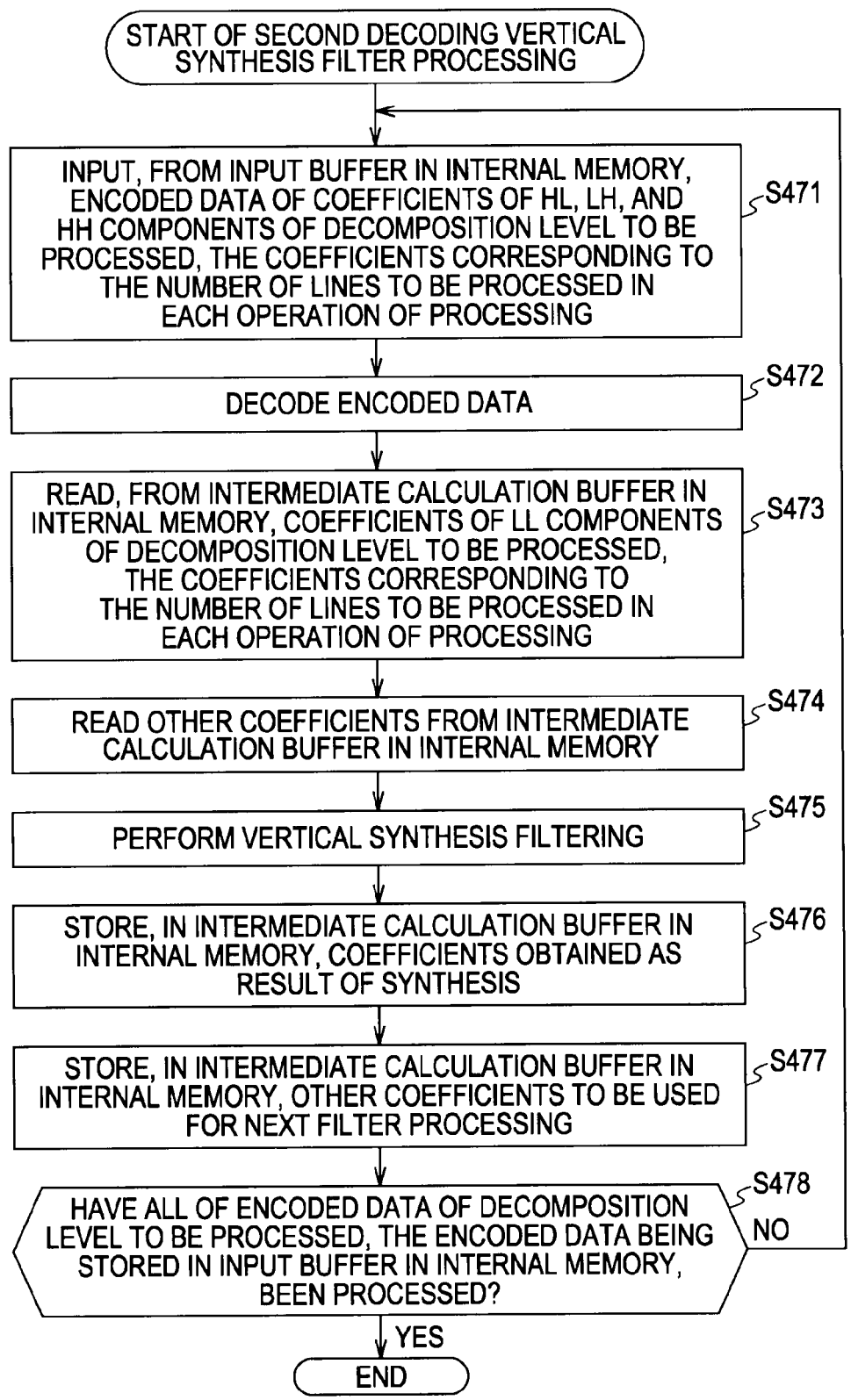
FIG. 34 is a flowchart illustrating an example of a flow of second decoding vertical synthesis filter processing.

A detailed example of a flow of the second decoding vertical synthesis filter processing executed in steps S405 and S416 in FIG. 31 will now be described with reference to a flowchart shown in FIG. 34. The contents of the second decoding vertical synthesis filter processing are basically the same as those of the first decoding vertical synthesis filter processing. In the second decoding vertical synthesis filter processing, however, vertical synthesis filter processing is performed using, as LL components, the results determined in the synthesis at the decomposition level that is higher by one level and stored in the intermediate calculation buffer 826.

Specifically, upon start of the second decoding vertical synthesis filter processing, in step S471, the input controller 822 inputs, from the input buffer 821 in the internal memory 811, encoded data of the coefficients of the HL, LH, and HH components of the decomposition level to be processed, the coefficients corresponding to the number of lines for each operation of the processing, and supplies the encoded data to the entropy decoding section 823. In step S472, the entropy decoding section 823 decodes the supplied encoded data. In step S473, the intermediate calculation buffer controller 825 reads the coefficients of the LL components of the decomposition level to be processed from the intermediate calculation buffer 826 in the internal memory 311, the coefficients corresponding to the number of lines to be processed in each operation of the processing.

Figure 32:
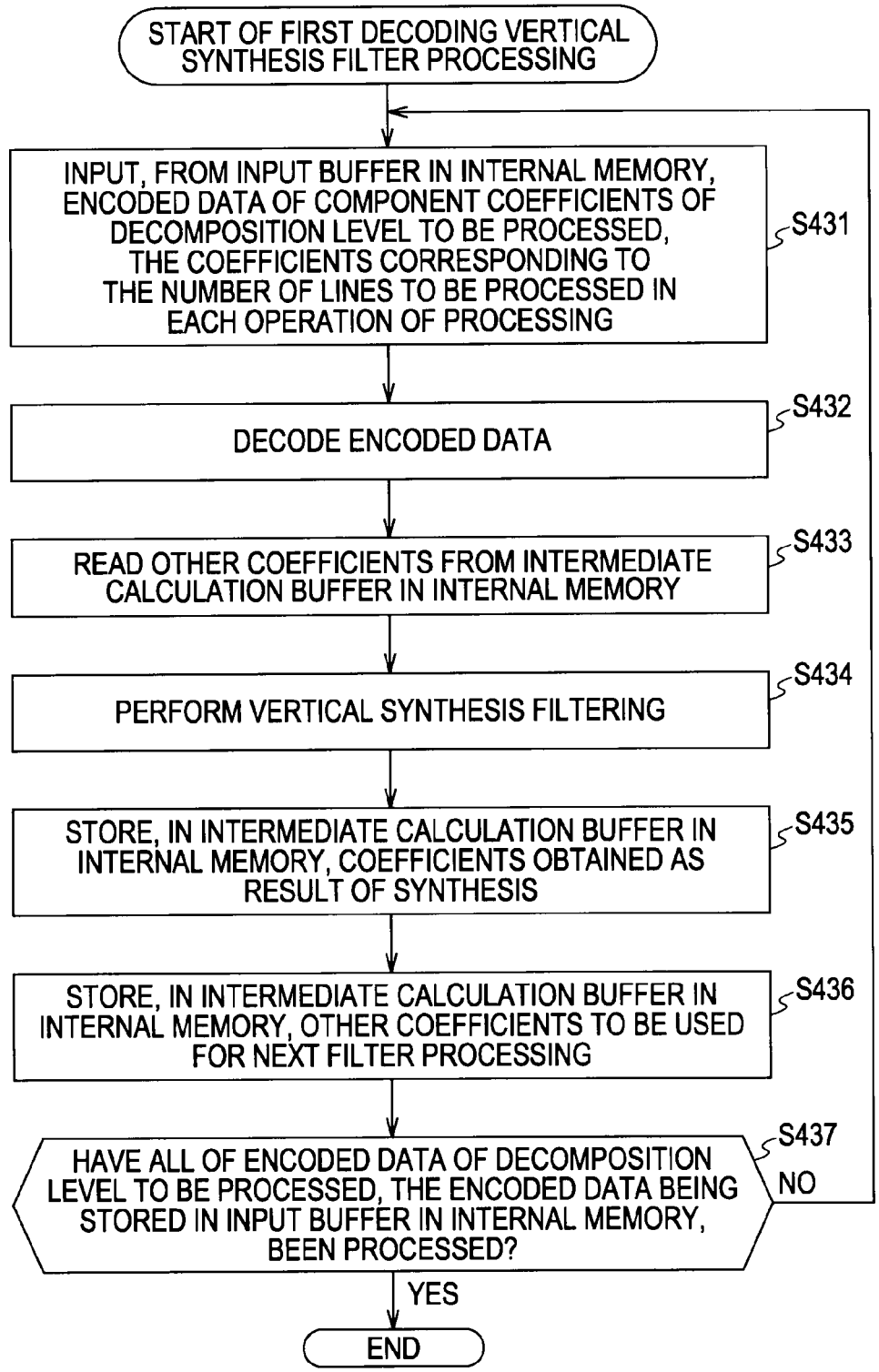
FIG. 32 is a flowchart illustrating an example of a flow of first decoding vertical synthesis filter processing.

The processing in steps S474 to S478 is executed in the same manner as the processing in steps S433 to S437 shown in FIG. 32. When it is determined in step S478 that all of the image data (for the line block) stored in the input buffer 821 in the internal memory 811 have been processed, the second decoding vertical synthesis filter processing ends and the process proceeds to the next processing in FIG. 31. In the case of the second decoding vertical synthesis filter processing executed in step S405 in FIG. 31, the process then proceeds to step S402. In the case of the second decoding vertical synthesis filter processing executed in step S416 in FIG. 31, the process then proceeds to step S413.

Figure 35:
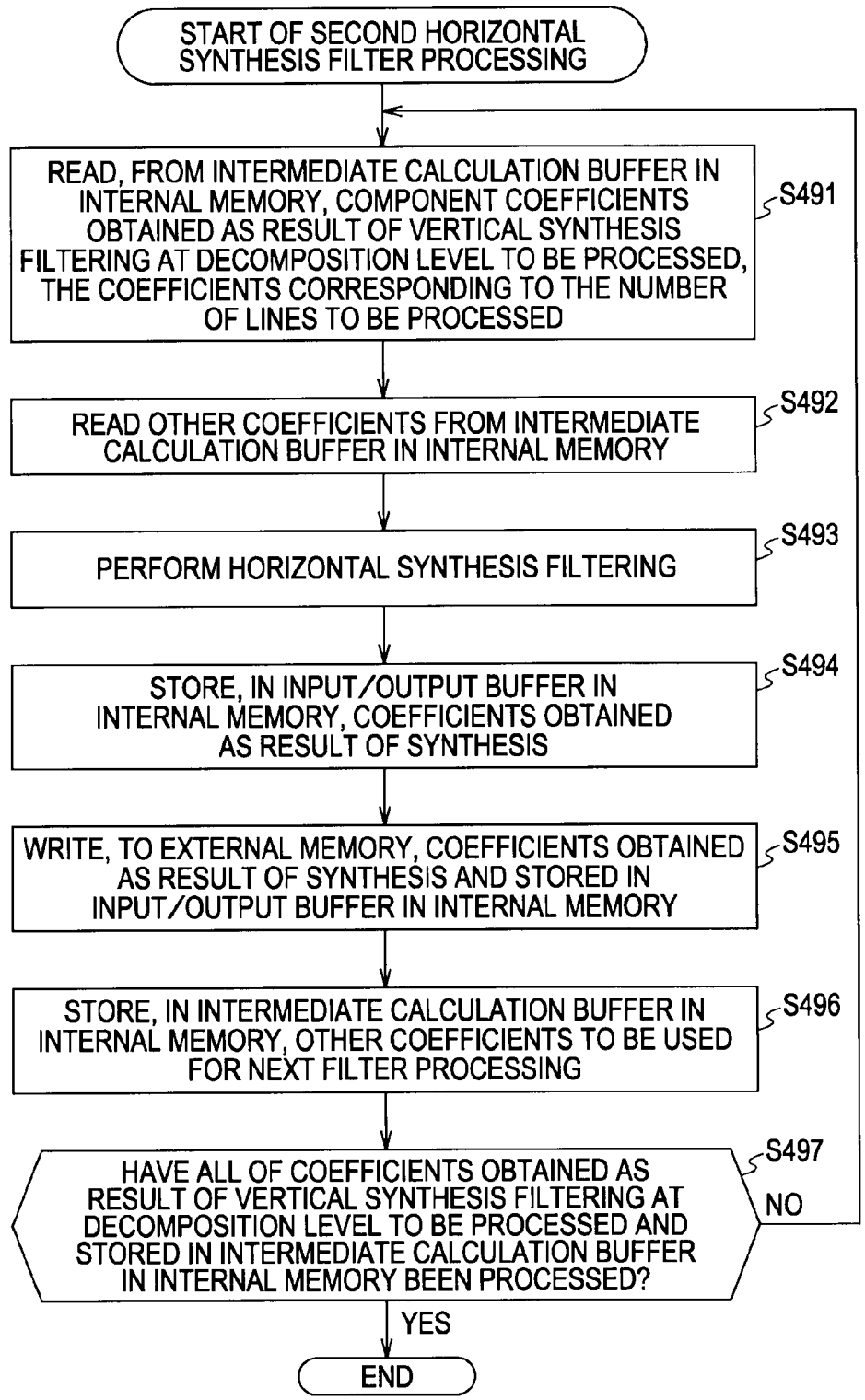
FIG. 35 is a flowchart illustrating an example of a flow of second horizontal synthesis filter processing.

A detailed example of a flow of the second horizontal synthesis filter processing executed in step S406 in FIG. 31 will now be described with reference to a flowchart shown in FIG. 35. The contents of the second horizontal synthesis filter processing are basically the same as those of the first horizontal synthesis filter processing. In the second horizontal synthesis filter processing, however, determined synthesis results are stored in the external memory 883.

Figure 33:
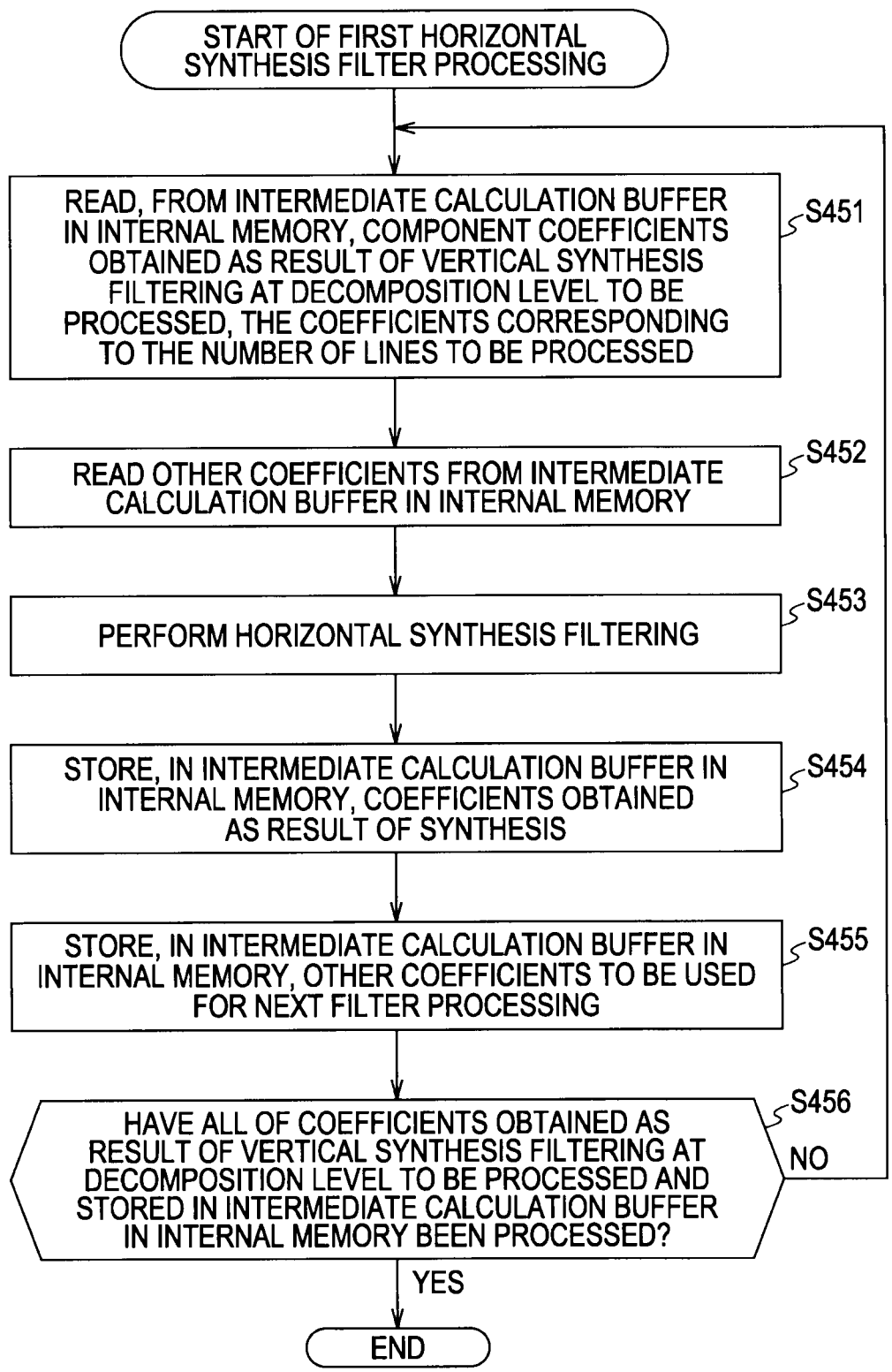
FIG. 33 is a flowchart illustrating an example of a flow of first horizontal synthesis filter processing.

Specifically, upon start of the second horizontal synthesis filter processing, the intermediate calculation buffer controller 825 and the horizontal synthesis filter section 832 perform horizontal synthesis filtering by executing processing in steps S491 to S493 in the same manner as the processing in steps S451 to S453 shown in FIG. 33. In step S494, the external-memory input/output controller 881 causes coefficients generated as a result of the synthesis in the horizontal synthesis filtering performed in step S493 to be stored in the input/output buffer 882 in the internal memory 811. In step S495, the external-memory input/output controller 881 writes the coefficients, obtained as a result of the synthesis and stored in the input/output buffer 882 in step S494, to the external memory 883.

The processing in steps S496 and S497 are performed in the same manner as the processing in steps S455 and S456 shown in FIG. 33. When it is determined in step S497 that all of the coefficients obtained as a result of the vertical synthesis filtering at the decomposition level to be processed and are stored in the intermediate calculation buffer 826 in the internal memory 811 have been processed, the second horizontal synthesis filter processing (i.e., in step S406 in FIG. 31) ends and then the process proceeds to step S411.

Figure 36:
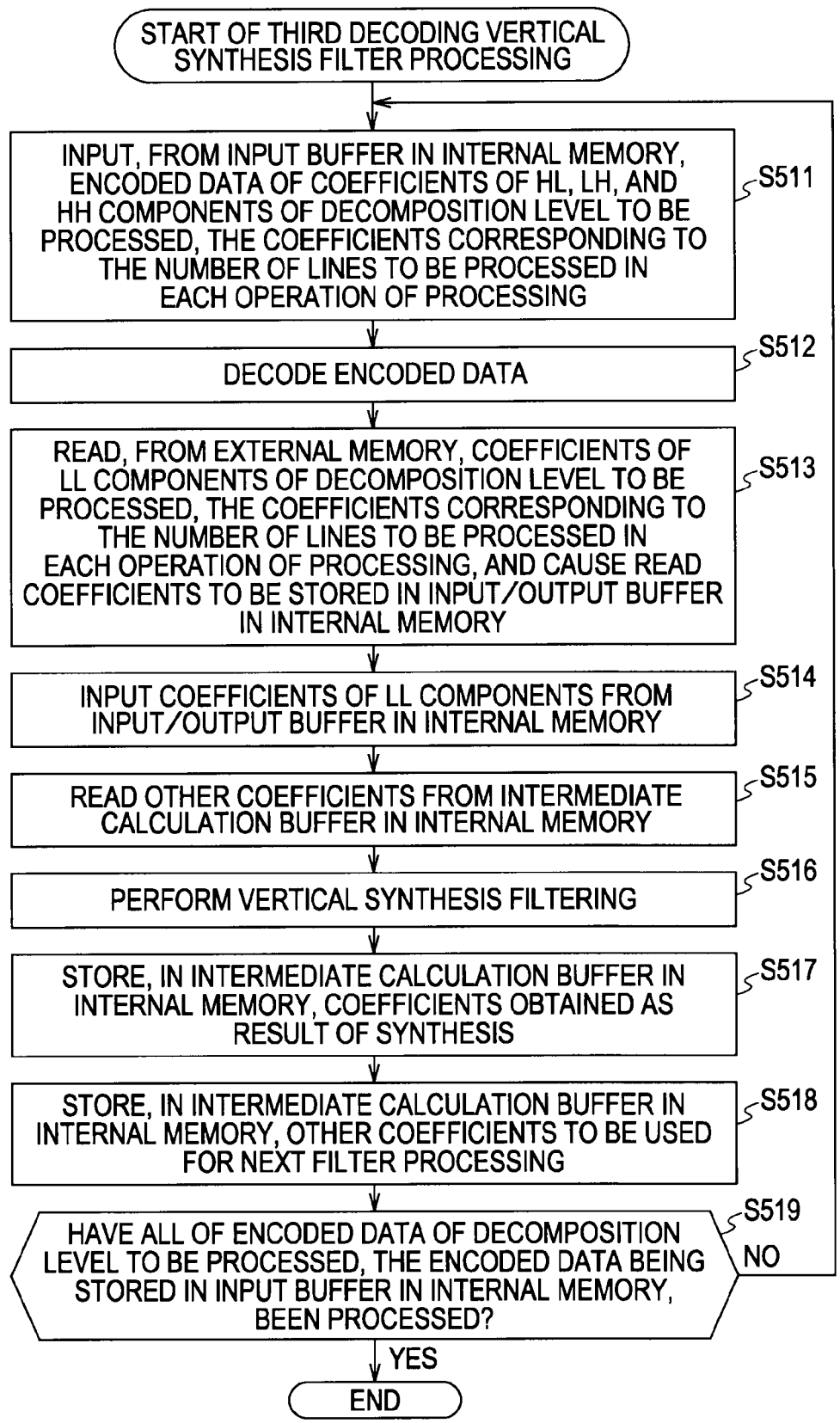
FIG. 36 is a flowchart illustrating an example of a flow of third decoding vertical synthesis filter processing.

A detailed example of a flow of the third decoding vertical synthesis filter processing executed in step S412 in FIG. 31 will now be described with reference to a flowchart shown in FIG. 36. The contents of the third decoding vertical synthesis filter processing are basically the same as those of the first decoding vertical synthesis filter processing. In the third decoding vertical synthesis filter processing, however, vertical synthesis filter processing is performed using, as LL components, synthesis results determined at the decomposition level that is higher by one level and are stored in the external memory 883.

Specifically, upon start of the third decoding vertical synthesis filter processing, in step S511, the input controller 822 inputs, from the input buffer 821 in the internal memory 811, encoded data of the coefficients of the HL, LH, and HH components at the decomposition level to be processed, the coefficients corresponding to the number of lines to be processed in each operation of the processing, and supplies the encoded data to the entropy decoding section 823. In step S512, the entropy decoding section 823 decodes the supplied encoded data. In step S513, the external-memory input/output controller 881 reads, from the external memory 883, coefficients of the LL components of the decomposition level to be processed, the coefficients corresponding to the number of lines to be processed in each operation of the processing, and causes the read coefficients to be stored in the input/output buffer 882 in the internal memory 811. In step S514, the external-memory input/output controller 881 reads the LL-component coefficients, stored in the input/output buffer 882 in the internal memory 811 in step S513, and inputs the read coefficients to the filter processing section 824.

The processing in steps S515 to S519 is executed in the same manner as the processing in steps S433 and S437 shown in FIG. 32. When it is determined in step S519 that all of the encoded data of the decomposition level to be processed, the encoded data being stored in the input buffer 821 in the internal memory 811, have been processed, the third decoding vertical synthesis filter processing (i.e., in step S412 in FIG. 31) ends and then the process proceeds to step S413.

A detailed example of a flow of the third horizontal synthesis filter processing executed in step S417 in FIG. 31 will now be described with reference to a flowchart shown in FIG. 37. The contents of the third horizontal synthesis filter processing are basically the same as those of the first horizontal synthesis filter processing. In the third horizontal synthesis filter processing, however, generated synthesis results are output to the outside of the processor 801.

Specifically, upon start of the third horizontal synthesis filter processing, the intermediate calculation buffer controller 825 and the horizontal synthesis filter section 832 perform horizontal synthesis filtering by executing processing in steps in steps S531 to S533 in the same manner as the processing in steps S451 to S453 shown in FIG. 33. In step S534, the output controller 827 causes the coefficients (baseband image data) generated as a result of the synthesis in the processing in step S533 to be output to the outside of the processor 801 via the output buffer 828. The processing in steps S535 and S536 is performed in the same manner as the processing in steps S455 and S456 shown in FIG. 33.

When it is determined in step S536 that all of the coefficients generated as a result of the vertical synthesis filtering at the decomposition level to be processed and are stored in the intermediate calculation buffer 826 in the internal memory 811 have been processed, the third horizontal synthesis filter processing in step S417 shown in FIG. 31 ends and thus the decoding processing ends.

Through the storage of the coefficients of the first intended decomposition level in the external memory 883, as described above, the filter processing recursively performed at each decomposition level is divided into two stages, i.e., stages 1 and 2. With this arrangement, the intermediate calculation buffer 826 can be used in two separate stages, i.e., stages 1 and 2, and the coefficients having an amount that is greater than the actual storage capacity of the intermediate calculation buffer 826 can be stored in the intermediate calculation buffer 826. That is, the storage capacity of the intermediate calculation buffer 826 is used in a time-divided manner to thereby make it possible to virtually increase the storage capacity. Thus, it is possible to enhance the efficiency of using the intermediate calculation buffer 826.

The first intended decomposition level may be any decomposition level that is a higher hierarchical level than the second intended decomposition level, which is the last decomposition level of the wavelet transform processing. It is, however, desired that setting be performed so as to minimize the storage capacity of the intermediate calculation buffer 826 (in the internal memory 811), i.e., so as to minimize a larger one of the capacity used in stage 1 and the capacity used in stage 2. As shown in FIG. 28, the number of stored coefficients is reduced by half each time the decomposition level decreases. It is, therefore, desired to set the first intended decomposition level to decomposition level 1.

For example, multiple decomposition levels may also be set as the first intended decomposition level. The location in which the LL component coefficients are to be stored may also be switched during the horizontal synthesis filtering at a certain decomposition level. That is, these settings are analogous to those of the encoding processing. In the decoder shown in FIG. 27, the input/output buffer 882 may have a one-bank memory configuration or a two-bank memory configuration. As in the case of the encoding processing, the use of the two-bank configuration allows inputting/outputting of data to/from the input/output buffer 882 to be performed in parallel with the inverse wavelet transform processing. Thus, it is possible to enhance the efficiency of using the hardware resources.

As described in the case of the encoder, the input/output buffer 882 in the case of the decoder may also have a multiple-memory-bank configuration. The use of two memory banks or more for the input/output buffer 882 allows reading/writing of information from/to the external memory 883 to be performed in parallel with the inverse wavelet transform processing.

As described above, the encoder shown in FIG. 3 and the decoder shown in FIG. 27 are realized by, for example, the information processing apparatus 101 in the information processing system 100 shown in FIG. 2. In such a case in which the microprocessor 201 has multiple sub CPU cores 242, the encoder shown n FIG. 3 or the decoder shown in FIG. 27 may be realized by some or all of the sub CPU cores 242. That is, for example, the microprocessor 201 may realize one or multiple encoders, one or multiple decoders, or both an encoder and a decoder.

Since the encoder shown in FIG. 3 and the decoder shown in FIG. 27 according to the embodiments of the present invention can enhance the efficiency of using the hardware resources by systematically using multiple storage areas, and the encoder and the decoder can be realized using an information processing apparatus having multiple storage areas and can also be realized by an apparatus other than the information processing apparatus 101 shown in FIG. 2. For example, the encoder and the decoder can also be realized by a personal computer having one single-core processor. Needless to say, the individual hardware configurations may be any configurations in which the hardware has multiple storage areas. For example, the processor may be a multi-core processor and the number of processors may be arbitrary.

Although a case in which the internal memory and the external memory are used as the storage areas has been described in FIGS. 3 and 27, any storage areas may be used. For example, when the information processing apparatus 101 shown in FIG. 2 is used, each of the external memories and the internal memories for the encoder and the decoder may be realized by any storage area, such as the internal memory of each sub CPU core 242, the XDR-RAM 203, the HDD 205, the internal memory of the GPU 202, the internal memory of the main CPU core 241, or the internal memory of another sub CPU core 242. Each of the external memories and the internal memories may be realized with multiple storage areas.

According to the present invention, it is possible to realize an encoder and a decoder that systematically use multiple storage areas. Thus, greater advantages according to the present invention can be provided when it is applied to an information processing apparatus that has difficulty in storing all coefficients to be stored during wavelet transform or inverse wavelet transform, due to a limited capacity in a storage area mainly used, and that allows storage of all the coefficients by using another storage area. In addition, according to the present invention, it is possible to realize an encoder or a decoder that more efficiently uses the main storage area. Thus, greater advantages according to the present invention can be provided when it is applied to an information processing apparatus in which the access speed (information reading/writing speed) of the main storage area is higher than another storage area.

The access speed of the storage area may also be dependent on the characteristics of the storage area or may be dependent on the characteristics of a bus to which the storage area is connected. For example, the access speed of the storage area may also be due to a statistical difference in access speed between a dedicated memory connected through a dedicated bus and a shared memory or the like connected through a shared bus.

In particular, when the internal memory and the external memory described above with reference to FIG. 3 or 27 are used, the present invention makes it possible to perform more appropriate control for accessing the individual storage areas. The encoding processing and the decoding processing may be executed in arbitrary manners. When wavelet transform or inverse wavelet transform as described above is employed to perform the encoding processing or decoding processing for each predetermined number of lines, the present invention makes it possible to more appropriately perform control for accessing the individual storage areas, as described above with reference to the flowcharts, and makes it possible to further enhance the efficiency of using hardware resources.

While the above description has been given in the context of an encoder and a decoder, the present invention is intended to enhance the efficiency of using hardware resources in the processing of wavelet transform and inverse wavelet transform. Thus, the entropy encoding section 326 and the entropy decoding section 823 may be eliminated. For example, in the case of the encoder shown in FIG. 3, the entropy encoding section 326 may be realized by another processor and the output controller 327 may supply an output of the filter processing section 323 to yet another processor, provided outside the processor 301, via the output buffer 328. Similarly, for example, in the case of the decoder shown in FIG. 27, the entropy decoding section 823 may be realized by another processor and the input controller 822 may obtain an output of the entropy decoding section 823 from outside of the processor 801 via the input buffer 821.

When the above-described series of processing is executed by software, a program included in the software is installed through a network or from a storage medium. For example, the storage medium may be not only the removable medium 111 (on which the program is recorded) that is distributed to a user to supply the program, independently from the main unit of the apparatus, as shown in FIG. 2, but also the hard disk or the memory (in which the program is recorded) included in the HDD 205 or the storage device 103 to be distributed to a user in a state in which it is preinstalled in the main unit of the apparatus. Examples of the removable medium 111 includes a magnetic disk (including a flexible disk), an optical disk (including a CD-ROM [Compact Disc-Read Only Memory], DVD [Digital Versatile Disc], and a magneto-optical disc (including an MD [Mini Disc]), or semiconductor memory.

Herein, the steps describing the program recorded in/on the storage medium not only include processing that is time-sequentially performed according to the described sequence, but also include processing that is concurrently or individually executed without being necessarily time-sequentially processed.

Needless to say, the above-described series of processing can be realized by executing software using general-purpose hardware and also can be realized by dedicated hardware.

The term "system" as used herein refers to an entirety constituted by multiple devices (apparatuses).

The element described above as a single device (or a single processing section) may be divided to configure multiple devices (or processing sections). Conversely, the elements described above as multiple devices (or processing sections) may be integrated together to configure a single device (or a single processing section). Needless to say, an element other than those described above may also be added to the above-described individual devices or processing sections. In addition, when the configuration and the operation of the entire system are substantially the same, the configuration of one device (or processing section) may be incorporated into the configuration of another device (or processing section). That is, the embodiments of the present invention are not limited to the above-described particular embodiments, and various changes and modifications can be made thereto without departing from the spirit and scope of the present invention.

The present application contains subject matter related to that disclosed in Japanese Priority Patent Application JP 2008-312180 filed in the Japan Patent Office on Dec. 8, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   a first memory and a second storage memory, the first memory having a smaller capacity and allowing higher speed access than the second memory;
   a third memory that has a two bank configuration and that allows higher speed access than the second memory;
   filtering circuitry configured to recursively repeat analysis filter processing, the analysis filter processing being processing in which analysis filtering for decomposing frequency components of image signals into low frequency components and high frequency components is performed in both a horizontal direction and a vertical direction, on horizontal and vertical low frequency component coefficients obtained as a result of the analysis filter processing, until a predetermined decomposition level is reached;
   first controlling circuitry configured to cause coefficients obtained during a process of computation in the analysis filter processing and, except for a preset decomposition level, horizontal and vertical low frequency component coefficients obtained as a result of the computation in the analysis filter processing to be stored in the first memory independently for each decomposition level, to read the coefficients stored in the first memory, as appropriate, and to supply the read coefficients for the analysis filter processing; and
   second controlling circuitry configured to cause the horizontal and vertical low frequency component coefficients of the preset decomposition level, the coefficients being obtained as a result of the computation in the analysis filter processing, to be stored in the second memory, to read the coefficients stored in the second memory, as appropriate, and to supply the read coefficients for the analysis filter processing, wherein the second controlling circuitry is configured to write the coefficients, read from the second memory, alternately to memory banks in the third memory, and in parallel with the writing of the coefficients to one of the memory banks, the second controlling circuitry is configured to read the coefficients stored in the other memory bank and to supply the read coefficients for the analysis filter processing.

2. The information processing apparatus according to claim 1, wherein the preset decomposition level is a decomposition level one;

the second controlling circuitry is further configured to cause the horizontal and vertical low frequency component coefficients, obtained as a result of the computation in the analysis filter processing performed on baseband image signals, to be stored in the second memory; and the first controlling circuitry is further configured to cause the coefficients, obtained during the process of the computation in the analysis filter processing, and the horizontal and vertical low frequency component coefficients, obtained as a result of the computation in the analysis filter processing at a decomposition level that is lower than the decomposition level one, to be stored in the first memory.

3. The information processing apparatus according to claim 1, wherein the filtering circuitry is further configured to perform, as the analysis filter processing, the analysis filtering in the vertical direction as soon as coefficients of lines that allow the analysis filtering in the vertical direction are prepared and to perform the analysis filtering in the horizontal direction as soon as coefficients of columns that allow the analysis filtering in the horizontal direction are prepared.

4. The information processing apparatus according to claim 1, wherein the filtering circuitry is further configured to execute the analysis filter processing by lifting computation using a predetermined filter.

5. The information processing apparatus according to claim 1, wherein the filtering circuitry is further configured to execute the analysis filtering in the vertical direction after executing the analysis filtering in the horizontal direction.

6. The information processing apparatus according to claim 1, wherein the filtering circuitry is further configured to execute the analysis filtering in the horizontal direction after executing the analysis filtering in the vertical direction.

7. The information processing apparatus according to claim 1, further comprising:

encoding circuitry configured to encode the coefficients of the frequency components, the coefficients obtained as a result of the computation in the analysis filter processing performed by the filtering circuitry.

8. An information processing method for an information processing apparatus having a first memory and a second memory, the first memory having a smaller capacity and allowing higher speed access than the second memory, and having a third memory that has a two bank configuration and that allows higher speed access than the second memory, the information processing method comprising the steps of:

recursively repeating, using first filtering circuitry, analysis filter processing, the analysis filter processing being processing in which analysis filtering for decomposing frequency components of image signals into low frequency components and high frequency components is performed in both a horizontal direction and a vertical direction, on horizontal and vertical low frequency component coefficients obtained as a result of the analysis filter processing, until a predetermined decomposition level is reached;

causing, using first controlling circuitry, coefficients obtained during a process of computation in the analysis filter processing and, except for a preset decomposition level, horizontal and vertical low frequency component coefficients obtained as a result of the computation in the analysis filter processing to be stored in the first memory independently for each decomposition level, reading the coefficients stored in the first memory, as appropriate, and supplying the read coefficients for the analysis filter processing;

causing, using second controlling circuitry, the horizontal and vertical low frequency component coefficients of the preset decomposition level, the coefficients being obtained as a result of the computation in the analysis filter processing, to be stored in the second memory;

reading, using the second controlling circuitry, the coefficients stored in the second memory, as appropriate, and supplying the read coefficients for the analysis filter processing; and writing, using the second controlling circuitry, the coefficients, read from the second memory, alternately to memory banks in the third memory, and in parallel with the writing of the coefficients to one of the memory banks, reading the coefficients stored in the other memory bank and supplying the read coefficients for the analysis filter processing.

9. An information processing apparatus, comprising:

a first memory and a second memory, the first memory having a smaller capacity and allowing higher speed access than the second memory;

a third memory that has a two bank configuration and that allows higher speed access than the second memory;

filtering circuitry configured to recursively repeat analysis filter processing, the analysis filter processing being processing in which analysis filtering for decomposing frequency components of image signals into low frequency components and high frequency components is performed in both a horizontal direction and a vertical direction, on horizontal and vertical low frequency component coefficients obtained as a result of the analysis filter processing, until a predetermined decomposition level is reached;

first controlling circuitry configured to cause coefficients obtained during a process of computation in the analysis filter processing and, except for a preset decomposition level, horizontal and vertical low frequency component coefficients obtained as a result of the computation in the analysis filter processing to be stored in the first memory independently for each decomposition level, to read the coefficients stored in the first memory, as appropriate, and to supply the read coefficients for the analysis filter processing; and second controlling circuitry configured to cause the horizontal and vertical low frequency component coefficients of the preset decomposition level, the coefficients being obtained as a result of the computation in the analysis filter processing, to be stored in the second memory, to read the coefficients stored in the second memory, as appropriate, and to supply the read coefficients for the analysis filter processing, wherein the second controlling circuitry is configured to write the horizontal and vertical low frequency component coefficients of the preset decomposition level, the coefficients being obtained as a result of the computation in the analysis filter processing, alternately to memory banks in the third memory, and in parallel with the writing of the coefficients to one of the memory banks, the second controlling circuitry is configured to read the coefficients stored in the other memory bank and to cause the read coefficients to be stored in the second memory.

10. The information processing apparatus according to claim 9, wherein the preset decomposition level is a decomposition level one;
the second controlling circuitry is further configured to cause the horizontal and vertical low frequency component coefficients, obtained as a result of the computation in the analysis filter processing performed on baseband image signals, to be stored in the second memory; and
the first controlling circuitry is further configured to cause the coefficients, obtained during the process of the computation in the analysis filter processing, and the horizontal and vertical low frequency component coefficients, obtained as a result of the computation in the analysis filter processing at a decomposition level that is lower than the decomposition level one, to be stored in the first memory.

11. The information processing apparatus according to claim 9, wherein the filtering circuitry is further configured to perform, as the analysis filter processing, the analysis filtering in the vertical direction as soon as coefficients of lines that allow the analysis filtering in the vertical direction are prepared and to perform the analysis filtering in the horizontal direction as soon as coefficients of columns that allow the analysis filtering in the horizontal direction are prepared.

12. The information processing apparatus according to claim 9, wherein the filtering circuitry is further configured to execute the analysis filter processing by lifting computation using a predetermined filter.

13. The information processing apparatus according to claim 9, wherein the filtering circuitry is further configured to execute the analysis filtering in the vertical direction after executing the analysis filtering in the horizontal direction.

14. The information processing apparatus according to claim 9, wherein the filtering circuitry is further configured to execute the analysis filtering in the horizontal direction after executing the analysis filtering in the vertical direction.

15. The information processing apparatus according to claim 9, further comprising:
encoding circuitry configured to encode the coefficients of the frequency components, the coefficients obtained as a result of the computation in the analysis filter processing performed by the filtering circuitry.

16. An information processing method for an information processing apparatus having a first memory and a second memory, the first memory having a smaller capacity and allowing higher speed access than the second memory, and having a third memory that has a two bank configuration and that allows higher speed access than the second memory, the information processing method comprising the steps of:
recursively repeating, using a first filtering section, analysis filter processing, the analysis filter processing being processing in which analysis filtering for decomposing frequency components of image signals into low frequency components and high frequency components is performed in both a horizontal direction and a vertical direction, on horizontal and vertical low frequency component coefficients obtained as a result of the analysis filter processing, until a predetermined decomposition level is reached;
causing, using a first controlling section, coefficients obtained during a process of computation in the analysis filter processing and, except for a preset decomposition level, horizontal and vertical low frequency component coefficients obtained as a result of the computation in the analysis filter processing to be stored in the first memory independently for each decomposition level, reading the coefficients stored in the first memory, as appropriate, and supplying the read coefficients for the analysis filter processing;
causing, using a second controlling section, the horizontal and vertical low frequency component coefficients of the preset decomposition level, the coefficients being obtained as a result of the computation in the analysis filter processing, to be stored in the second memory;
reading, using the second controlling section, the coefficients stored in the second memory, as appropriate, and supplying the read coefficients for the analysis filter processing; and
writing, using the second controlling section, the horizontal and vertical low frequency component coefficients of the preset decomposition level, the coefficients being obtained as a result of the computation in the analysis filter processing, alternately to memory banks in the third memory, and in parallel with the writing of the coefficients to one of the memory banks, reading the coefficients stored in the other memory bank and causing the read coefficients to be stored in the second memory.

* * * * *